(12) United States Patent
Yanai

(10) Patent No.: US 11,275,271 B2
(45) Date of Patent: Mar. 15, 2022

(54) DISPLAY COMPRISING A TRANSPARENT SCREEN HAVING A CHOLESTERIC LIQUID CRYSTAL LAYER EXHIBITING SELECTIVE REFLECTIVITY ATTACHED TO A LIGHT GUIDE PLATE

(71) Applicant: FUJIFILM Corporation, Tokyo (JP)

(72) Inventor: Yujiro Yanai, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/219,185

(22) Filed: Mar. 31, 2021

(65) Prior Publication Data
US 2021/0255497 A1 Aug. 19, 2021

Related U.S. Application Data

(63) Continuation of application No. PCT/JP2019/037235, filed on Sep. 24, 2019.

(30) Foreign Application Priority Data

Oct. 1, 2018 (JP) .............................. JP2018-186658
Mar. 28, 2019 (JP) .............................. JP2019-063145

(51) Int. Cl.
*G02F 1/1335* (2006.01)
*G02F 1/137* (2006.01)

(52) U.S. Cl.
CPC .... *G02F 1/133627* (2021.01); *G02F 1/13718* (2013.01); *G02F 1/133504* (2013.01);
(Continued)

(58) Field of Classification Search
CPC .......... G02F 1/13718; G02F 1/133524; G02F 1/13756; G02F 1/133627; G02F 2201/343;
(Continued)

(56) References Cited

U.S. PATENT DOCUMENTS 5,453,877 A 9/1995 Gerbe et al.
6,128,054 A * 10/2000 Schwarzenberger ........................
G02F 1/13336
348/E5.144
(Continued)

FOREIGN PATENT DOCUMENTS

CN 106143317 A * 11/2016 ............. B60R 1/088
CN 106200085 A * 12/2016 ............. G02F 1/141
(Continued)

OTHER PUBLICATIONS

International Preliminary Report on Patentability and Written Opinion of the International Searching Authority (Forms PCT/IB/326, PCT/IB/373 and PCT/ISA/237) for corresponding International Application No. PCT/JP2019/037235, dated Apr. 15, 2021, with English translation.
(Continued)

*Primary Examiner* — Paul C Lee
(74) *Attorney, Agent, or Firm* — Birch, Stewart, Kolasch & Birch, LLP

(57) ABSTRACT

Provided is a display capable of displaying augmented reality (AR) in which background visibility is maintained and a hotspot is not visible. The display includes, at least: a transparent screen; a projection device for projecting a projection image on the transparent screen; and a sheet-shaped light guide plate for guiding the projection image, in which the projection device is disposed so that light of the projection image is incident from an end portion of the light guide plate, and the transparent screen is attached to at least one of main surfaces of the light guide plate.

14 Claims, 18 Drawing Sheets

(52) U.S. Cl.
CPC .... *G02F 1/133524* (2013.01); *G02F 1/13756* (2021.01); *G02F 2201/343* (2013.01)

(58) Field of Classification Search
CPC ..... G02F 2203/05; G02F 2001/133543; G02F 1/133543; G02F 2001/13756; G09G 2300/0486
See application file for complete search history.

(56) References Cited

U.S. PATENT DOCUMENTS

| | | | | |
|---|---|---|---|---|
| 6,381,068 | B1* | 4/2002 | Harada | G02B 5/0236 359/443 |
| 7,949,214 | B2 | 5/2011 | DeJong | |
| 2007/0139766 | A1* | 6/2007 | Radcliffe | G02F 1/13471 359/459 |
| 2007/0146357 | A1* | 6/2007 | Hsu | G02F 1/13318 345/207 |
| 2008/0180643 | A1* | 7/2008 | Endo | G03B 21/10 353/38 |
| 2013/0033895 | A1* | 2/2013 | Brown | G02B 6/0011 362/606 |
| 2016/0085070 | A1* | 3/2016 | Seder | G06K 9/00845 359/631 |
| 2016/0091651 | A1* | 3/2016 | Chiu | G02B 6/0026 349/65 |
| 2016/0231568 | A1 | 8/2016 | Saarikko et al. | |
| 2017/0372668 | A1* | 12/2017 | Yashiki | G09G 3/20 |
| 2018/0164480 | A1 | 6/2018 | Yoshida | |
| 2018/0321577 | A1 | 11/2018 | Yanai et al. | |
| 2019/0094432 | A1 | 3/2019 | Yanai et al. | |

FOREIGN PATENT DOCUMENTS

| | | |
|---|---|---|
| EP | 0 296 710 A2 | 12/1988 |
| JP | 64-35478 A | 2/1989 |
| JP | 2-297516 A | 12/1990 |
| JP | 6-138446 A | 5/1994 |
| JP | 2008-64911 A | 3/2008 |
| JP | 5752834 B1 | 7/2015 |
| JP | 2015-194641 A | 11/2015 |
| JP | 2016-126326 A | 7/2016 |
| JP | 2018-180122 A | 11/2018 |
| WO | WO 2016/194961 A1 | 12/2016 |
| WO | WO 2017/030176 A1 | 2/2017 |
| WO | WO 2017/110629 A1 | 6/2017 |
| WO | WO 2017/204103 A1 | 11/2017 |
| WO | WO 2018/012469 A1 | 1/2018 |
| WO | WO 2018/199092 A1 | 11/2018 |

OTHER PUBLICATIONS

International Search Report (Form PCT/ISA/210) for corresponding International Application No. PCT/JP2019/037235, dated Dec. 17, 2019, with English translation.
Chinese Office Action and Search Report for corresponding Chinese Application No. 201980064648.6, dated Oct. 9, 2021, with an English translation.

* cited by examiner

DISPLAY COMPRISING A TRANSPARENT SCREEN HAVING A CHOLESTERIC LIQUID CRYSTAL LAYER EXHIBITING SELECTIVE REFLECTIVITY ATTACHED TO A LIGHT GUIDE PLATE

CROSS-REFERENCE TO RELATED APPLICATIONS

This application is a Continuation of PCT International Application No. PCT/JP2019/037235 filed on Sep. 24, 2019, which claims priority under 35 U.S.C. § 119(a) to Japanese Patent Application No. 2018-186658 filed on Oct. 1, 2018 and Japanese Patent Application No. 2019-063145 filed on Mar. 28, 2019. Each of the above applications is hereby expressly incorporated by reference, in its entirety, into the present application.

BACKGROUND OF THE INVENTION

1. Field of the Invention

The present invention relates to a display.

2. Description of the Related Art

In recent years, augmented reality (AR) displays which project an image on the background have appeared. Most of these displays are wearable displays, and only the person wearing the display can see the image (US2016/0231568A). In addition, the visible range of the image is limited because the visual angle (field of view: FOV) is narrow.

On the other hand, examples of a display in which the same AR image can be viewed by a large number of people include a display using a transparent screen (JP5752834B). For example, by attaching a transparent screen to glass or the like and projecting an image on the transparent screen with a projector, it is possible to superimpose the background and the image and observe them on a large screen. However, since projector light transmitted by light projected through the transparent screen, and/or transmitting screen surface-reflected light in which projected light is reflected on the surface of the transparent screen is very dazzling to the person and/or observer behind the screen (so-called hotspot), there is a problem that the installation location is restricted.

By using a transparent display (JP2015-194641A) such as a transparent liquid crystal display (LCD) and a transparent organic light emitting diode (OLED) instead of such a transparent screen, it is possible to display the image without the hotspot. However, from the reason of its low transmittance, difficulty in integrating with glass due to the need of wiring, destruction by impact, and extremely heavy weight, the transparent display may not be suitable as the AR display.

SUMMARY OF THE INVENTION

In view of the above-described circumstances, an object of the present invention is to provide a display capable of displaying augmented reality (AR) in which background visibility is maintained and a hotspot is not visible.

The present inventors have found that the above-described objects can be achieved by the following configurations.

[1] A display comprising, at least:
a transparent screen;
a projection device for projecting a projection image on the transparent screen; and
a sheet-shaped light guide plate for guiding the projection image,
in which the projection device is disposed so that light of the projection image is incident from an end portion of the light guide plate, and
the transparent screen is attached to at least one of main surfaces of the light guide plate.

[2] The display according to [1], further comprising:
a light absorbing layer disposed at an end portion of the light guide plate, which is opposite to the end portion where the light of the projection image is incident.

[3] The display according to [1] or [2],
in which a bisector of an angle between an incoming ray from at least one direction onto the transparent screen and a specularly reflected ray of the incoming ray is inclined by 5° or more with respect to a normal direction to a plane in the transparent screen, where the incoming ray is specularly reflected.

[4] The display according to any one of [1] to [3],
in which the transparent screen has light diffusivity.

[5] The display according to any one of [1] to [4],
in which the transparent screen has a cholesteric liquid crystal layer exhibiting selective reflectivity.

[6] The display according to [5],
in which the cholesteric liquid crystal layer is a layer formed of a liquid crystal compound,
at least one main plane of a pair of main planes of the cholesteric liquid crystal layer has a liquid crystal alignment pattern in which an orientation of a molecular axis of the liquid crystal compound changes consecutively while rotating over at least one direction in the plane, and
an array direction of a bright portion and a dark portion, which is derived from a cholesteric liquid crystalline phase observed by a scanning electron microscope in a cross section perpendicular to the main plane of the cholesteric liquid crystal layer, is inclined with respect to the main plane of the cholesteric liquid crystal layer.

[7] The display according to [6],
in which, in the cholesteric liquid crystal layer, the molecular axis of the liquid crystal compound is inclined with respect to the main plane of the cholesteric liquid crystal layer.

[8] The display according to [6] or [7],
in which, in the cholesteric liquid crystal layer, shapes of the bright portion and the dark portion derived from the cholesteric liquid crystalline phase are wavy, and
the cholesteric liquid crystal layer exhibits light diffusivity.

[9] The display according to any one of [1] to [8],
in which the transparent screen includes
a transparent base material having a linear Fresnel lens-shaped uneven surface,
a reflector disposed on an inclined surface of the linear Fresnel lens-shaped uneven surface of the transparent base material, and
a resin layer covering a surface of the reflector opposite to the inclined surface, and
a surface of the transparent screen is flat.

According to the present invention, it is possible to obtain a display capable of displaying augmented reality (AR) in which background visibility is maintained and a hotspot is not visible.

DESCRIPTION OF THE PREFERRED EMBODIMENTS

Hereinafter, the present invention will be described in detail. In the present specification, a numerical range represented using "to" means a range including numerical values described before and after the preposition "to" as a lower limit value and an upper limit value.

In addition, in the present specification, "(meth)acrylate" is a notation representing both acrylate and methacrylate, "(meth)acryloyl group" is a notation representing both acryloyl group and methacryloyl group, and "(meth)acryl" is a notation representing both acryl and methacryl.

In the present specification, "same" includes an error range generally accepted in the technical field. In addition, in the present specification, "same" with regard to an angle means that, unless otherwise specified, the difference from the exact angle is within a range of less than 5 degrees. The difference from the exact angle is preferably less than 4 degrees and more preferably less than 3 degrees.

[Display]

A display according to an embodiment of the present invention is a display including, at least a transparent screen, a projection device for projecting a projection image on the transparent screen, and, a sheet-shaped light guide plate for guiding the projection image, in which the projection device is disposed so that light of the projection image is incident from an end portion of the light guide plate, and the transparent screen is attached to at least one of main surfaces of the light guide plate.

In the display according to the embodiment of the present invention, it is preferable that the transparent screen is attached to a rear surface of the sheet-shaped light guide plate in a case of being viewed from a viewer side of the projection image.

Preferred examples of an application of the present invention include, but are not limited to, window displays of public facilities and vehicles. Specifically, the present invention is especially suitable as an application used in public places, such as store windows and vehicle (car, bus, and train) windows, where there are an unspecified number of viewers and the existence of hotspot is not preferred.

Figure 1:
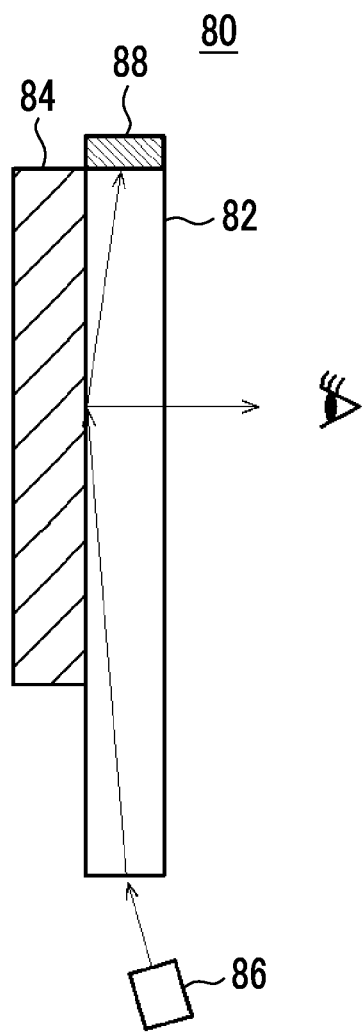
FIG. 1 is a schematic view showing an example of a display according to an embodiment of the present invention.

FIG. 1 schematically shows an example of the display according to the embodiment of the present invention.

A display 80 shown in FIG. 1 includes a light guide plate 82, a transparent screen 84, a projection device 86, and a light absorbing layer 88. The transparent screen 84 is laminated on one main surface of the light guide plate 82. The projection device 86 is disposed so that light of the projection image is incident on the light guide plate 82 from an end face of the light guide plate 82. The light absorbing layer 88 is laminated on an end face (hereinafter, also referred to as a termination surface) of the light guide plate 82 opposite to the end face (hereinafter, also referred to as an incident end face) on which the light of the projection image is incident.

As shown by arrows in FIG. 1, in the display 80, the light of the projection image is emitted from the projection device 86, and the light of the projection image is incident on the light guide plate 82 from the incident end portion of the light guide plate 82. The light incident on the light guide plate 82 travels in the light guide plate 82, and is incident on the transparent screen 84. The transparent screen 84 reflects at least a part of the incidence light to other main surface direction (hereinafter, also referred to as a front direction) of the light guide plate 82. The light which is reflected by the transparent screen 84 and travels in the front direction is emitted from the light guide plate 82. In this way, in the display 80, the projection image emitted by the projection device 86 is projected on the transparent screen 84 to be displayed. Here, since the light guide plate 82 and the transparent screen 84 have transparency, the observer can observe the background of the back side (transparent screen 84 side) of the display 80 and the projection image in an overlapping state. That is, the display 80 is capable of displaying augmented reality (AR). In addition, in the display 80, since the projection image is projected on the transparent screen 84 to be displayed, the projection image can be viewed by a plurality of people.

In addition, since the display 80 does not project the light (projection image) directly from the projection device onto the transparent screen, it is possible to prevent the projected light from being reflected on the surface of the transparent screen to generate the hotspot.

In addition, among the light guided in the light guide plate 82, light not reflected to the front direction by the transparent screen 84 is guided in the light guide plate 82 as it is, reaches the termination surface, and is emitted to the outside. The light emitted from the termination surface is to be the hotspot, but is not emitted toward the front direction (direction in which the observer is) of the display or a back direction of the display. Therefore, the light emitted from the termination surface is not visible to the observer or the person behind the display.

Although the light of the projection image is indicated by an arrow in FIG. 1, the light emitted from the projection device 86 may be planar. The planar light is propagated in the light guide plate 82 reflected by the transparent screen 84 while maintaining the positional relationship.

Here, the display 80 shown in FIG. 1 includes a light absorbing layer 88 as a preferred aspect. The light absorbing layer 88 is laminated on a termination surface of the light guide plate 82 opposite to the incident end face. In the configuration including the light absorbing layer 88, since the light absorbing layer 88 absorbs light reaching the termination surface, no hotspot is generated. Therefore, the display according to the embodiment of the present invention preferably includes the light absorbing layer.

In the example shown in FIG. 1, the projection device 86 is configured to be disposed so that light of the projection image is incident from the end face of the light guide plate 82. However, the configuration of the projection device 86 is not limited thereto.

Figure 2:
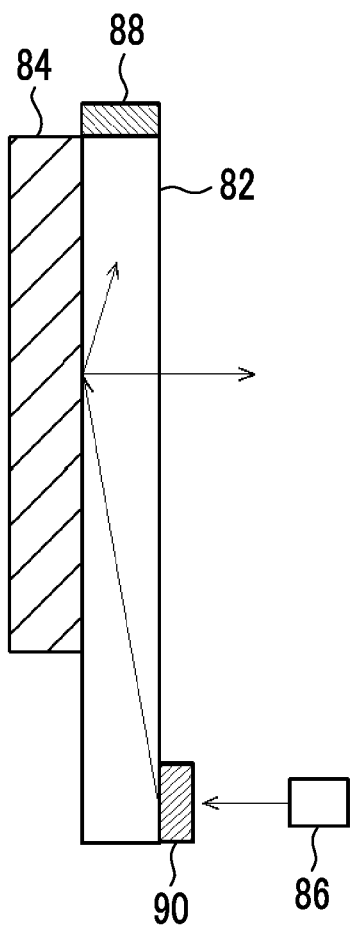
FIG. 2 is a schematic view showing another example of the display according to the embodiment of the present invention.

For example, as in an example shown in FIG. 2, the display may be configured to include a transmission diffraction element 90 at the end portion of the main surface on a front side of the light guide plate 82, and the projection device 86 may be configured to be disposed so that the light of the projection image is incident from the front side of the light guide plate 82 through the transmission diffraction element 90. The transmission diffraction element 90 diffracts and transmits the incidence light. In the example shown in FIG. 2, the transmission diffraction element 90 diffracts light incident from a direction perpendicular to the main surface of the light guide plate 82 to a direction (surface direction) parallel to the main surface of the light guide plate 82.

Figure 3:
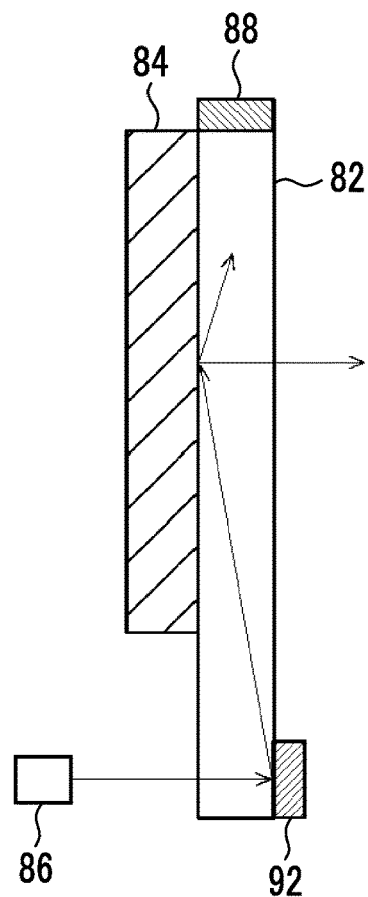
FIG. 3 is a schematic view showing still another example of the display according to the embodiment of the present invention.

Alternatively, as in an example shown in FIG. 3, the display may be configured to include a reflection diffraction element 92 at the end portion of the main surface on the front side of the light guide plate 82, and the projection device 86 may be configured to be disposed so that the light of the projection image is incident from a back side of the light guide plate 82 toward the reflection diffraction element 92. The reflection diffraction element 92 diffracts and reflects the incidence light. In the example shown in FIG. 3, the reflection diffraction element 92 diffracts light incident from a direction perpendicular to the main surface of the light guide plate 82 to a direction (surface direction) parallel to the main surface of the light guide plate 82.

In the examples shown in FIGS. 2 and 3, the transmission diffraction element 90 and the reflection diffraction element 92 are each configured to be disposed on the main surface on the front side of the light guide plate 82, but the configurations of the transmission diffraction element 90 and the reflection diffraction element 92 are not limited thereto. The transmission diffraction element 90 and the reflection diffraction element 92 may be configured to be disposed on the main surface on the back side of the light guide plate 82. In a case where the transmission diffraction element 90 is disposed on the back side of the light guide plate 82, the projection device 86 may be disposed on the back side of the light guide plate 82. In addition, in a case where the reflection diffraction element 92 is disposed on the back side of the light guide plate 82, the projection device 86 may be disposed on the front side of the light guide plate 82.

In addition, in the example shown in FIG. 1, the display 80 is configured to emit the light of the projection image to the direction perpendicular to the main surface of the light guide plate 82, but the configuration of the display 80 is not limited thereto. The display 80 may be configured to emit the light of the projection image to an oblique direction with respect to the main surface of the light guide plate 82.

Figure 4:
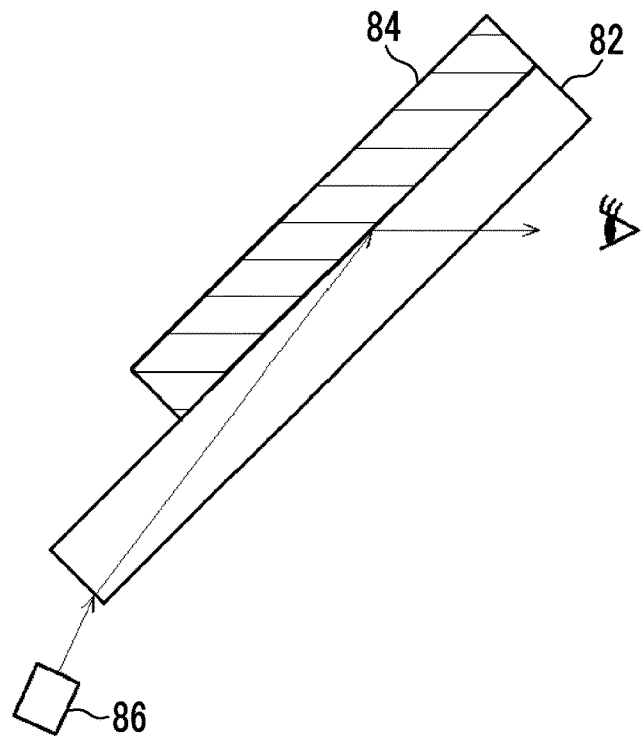
FIG. 4 is a schematic view showing still another example of the display according to the embodiment of the present invention.

For example, in a case where the display according to the embodiment of the present invention is used as a front window of an automobile capable of AR display, as shown in FIG. 4, it is preferable that the light of the projection image is emitted to an oblique direction with respect to the main surface of the light guide plate 82 in accordance with the inclination of the front window, and the light of the projection image is emitted to a direction of the driver's seat of the automobile (direction visible to the driver).

<Projection Device>

The display according to the embodiment of the present invention includes a projection device for projecting an image on the transparent screen. The projection device can be obtained by using a known technique, but it is preferable that the projection device is small in size for being incorporated in the display, and any device which emits visible light is sufficient. In a case where the transparent screen selectively reflects circular polarization (either right-handed circular polarization or left-handed circular polarization), the projection device preferably emits circular polarization suitable for the reflection. Specific examples thereof include commercially available small projectors.

<Light Guide Plate>

The display according to the embodiment of the present invention includes at least a sheet-shaped light guide plate for guiding the projection image, in which the projection device is disposed so that light of the projection image is incident from an end portion of the light guide plate, and the transparent screen is attached to at least one of main surfaces of the light guide plate.

As the sheet-shaped light guide plate which guides the image projected by the projection device to the transparent screen, a known plate can be used, and examples thereof include an acrylic plate formed of a transparent acrylic resin and a glass plate.

Figure 5:
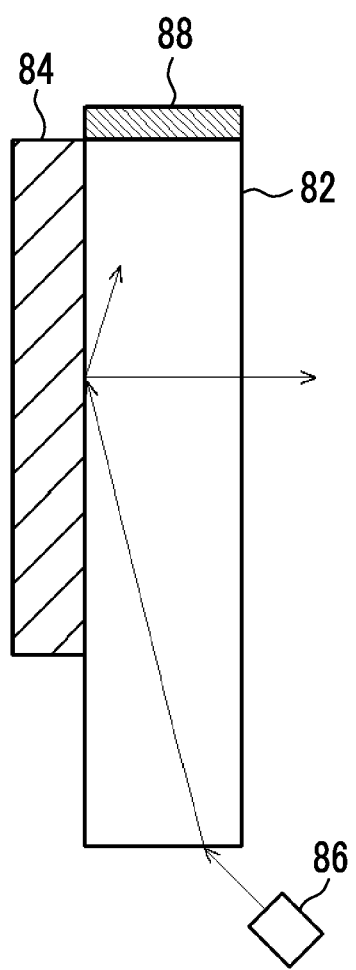
FIG. 5 is a view for explaining a relationship between a thickness of a light guide plate and an incidence angle of a projection image.
Figure 6:
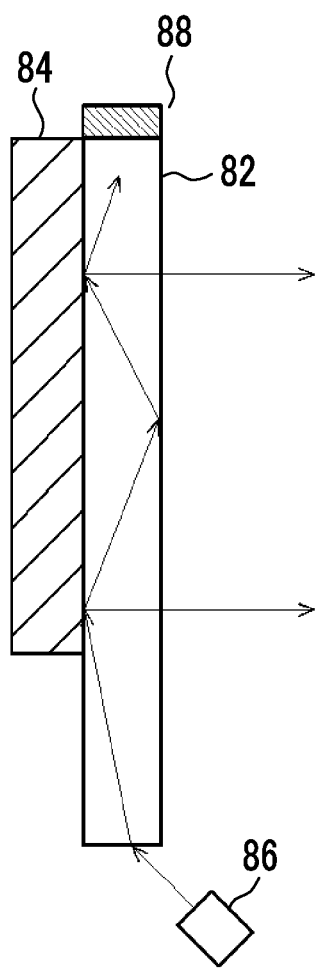
FIG. 6 is a view for explaining the relationship between the thickness of the light guide plate and the incidence angle of the projection image.

In addition, the thickness of the light guide plate is not particularly limited, but is preferably 10 mm or less in consideration of practicality. However, in this case, since the number of reflections inside the light guide plate is very large, the reflected light on the transparent screen increases, and the same image is displayed with a slight deviation. That is, multiple images are displayed. Specifically, it will be described with reference to FIGS. 5 and 6. FIGS. 5 and 6 have the same configuration, except that the thickness of the light guide plate 82 is different. In FIGS. 5 and 6, the angle (incidence angle) of the light incident on the incident end face of the light guide plate 82 from the projection device 86 is the same. At this incidence angle, as shown in FIG. 5, in a case where the light guide plate 82 is thick, the light which guides the inside of the light guide plate 82 can be appropriately emitted. On the other hand, as shown in FIG. 6, in a case where the light guide plate 82 is thin, since the number of reflections of light at an interface of the light guide plate 82 increases at the same incidence angle as in FIG. 5, light is emitted from a plurality of positions, and multiple images are generated.

In order to solve this problem, it is preferable that the incident angle of the projection image is substantially horizontal with respect to a normal line of the end face of the light guide plate. That is, it is necessary to make the angle (incidence angle) of the light incident on the incident end face of the light guide plate 82 from the projection device 86 smaller. Specifically, the angle between the normal line of the end face of the light guide plate and the center of the incidence light is preferably 1 to 0.1 degrees, more preferably 0.6 to 0.1 degrees, and still more preferably 0.3 to 0.1 degrees. This reduces the number of reflections inside the light guide plate and eliminates the multiple images.

<Diffraction Element>

The transmission diffraction element and the reflection diffraction element are not particularly limited, and a surface relief type diffraction element (for example, a diffraction element described in US2016/0231568A (FIG. 5C)), a polarized diffraction element (for example, a diffraction element described in JP2008-532085A), and the like can be used. It is sufficient that the angle of the light of the projection image inside the light guide plate after passing through the diffraction element is set so as to be substantially equal to the angle inside the light guide plate in a case where the light is incident from the end face in the above-described preferred range.

<Light Absorbing Layer>

The light absorbing layer absorbs at least a part of the light of the projection image guided in the light guide plate. By including the light absorbing layer, it is possible to prevent the light of the projection image from being emitted from other sides than the front side of the light guide plate and prevent the generation of hotspot.

As the light absorbing layer, a material which absorbs light in a predetermined wavelength range may be used. Alternatively, the light absorbing layer may be configured to contain a light absorbing material in a resin.

For example, in a case where the light to be absorbed is visible light, a colored (particularly, black) resin material, paper, an inorganic material, or the like can be used as the absorbing layer.

The light absorbing material is not limited, and a known light absorbing material can be used depending on the wavelength range to be absorbed. For example, in a case where the light to be absorbed is visible light, known light absorbers, for example, an inorganic pigment such as carbon black and iron black, an organic pigment such as an insoluble azo pigment, a dye such as azo and anthraquinone, and the like can be used.

<Transparent Screen>

In the present invention, the transparent screen has transparency so that the viewer can view the background, and is attached to at least one main surface of the sheet-shaped light guide plate.

It is preferable that the transparent screen is configured to have a transparent light-reflecting member on the base material.

In the present invention, it is preferable that the transparent light-reflecting member preferably included in the transparent screen has a flat surface having no uneven shape on the surface, particularly has a cholesteric liquid crystal layer (including the inclined cholesteric liquid crystal layer described later) exhibiting selective reflectivity, selectively reflects any one of right-handed or left-handed circular polarization, and particularly has each selective reflection wavelength of a blue region (B), a green region (G), and a red region (R). That is, it is preferable to have a cholesteric liquid crystal layer having wavelength selective reflectivity in the blue region, a cholesteric liquid crystal layer having wavelength selective reflectivity in the green region, and a cholesteric liquid crystal layer having wavelength selective reflectivity in the red region.

The transparent screen reflects the light of the projection image guided through the light guide plate to display the projection image.

Here, the transparent screen is configured to reflect the light of the projection image at an angle different from the incidence angle, that is, to have different reflection anisotropies between the incidence angle and the reflection angle, or is configured to have diffuse reflectivity in which the incidence light is diffused. As a result, the light of the projection image guided through the light guide plate is emitted in the front direction of the light guide plate (display).

[Transparent Screen Having Reflection Anisotropy]

In the transparent screen having reflection anisotropy, in order to reflect the image obliquely projected to the front direction toward the viewer, it is preferable that the above-described transparent screen exhibits reflection anisotropy in which an angle between a normal line of a surface where incoming ray is specularly reflected and a normal line of a surface of the transparent screen is inclined by 5° or more, it is more preferable that the above-described transparent screen exhibits reflection anisotropy in which an angle between a normal line of a surface where incoming ray is specularly reflected and a normal line of a surface of the transparent screen is inclined by 15° to 75°, and it is more preferable that the above-described transparent screen exhibits reflection anisotropy in which an angle between a normal line of a surface where incoming ray is specularly reflected and a normal line of a surface of the transparent screen is inclined by 30° to 60°.

Hereinafter, in the transparent screen, the angle between the normal line of the plane (reflecting plane) where incoming ray is specularly reflected and the normal line of the surface of the transparent screen is also referred to as an "inclination angle of the reflecting plane".

Here, as described above, in a case where the thickness of the light guide plate is reduced, in order to suppress the multiple images, it is necessary to make the angle (incidence angle) of the light incident on the incident end face of the light guide plate from the projection device smaller. In a case where the incidence angle of light from the projection device to the light guide plate is reduced, in the transparent screen, it is necessary to change the traveling direction of the light more significantly. From this point, it is preferable that, in the transparent screen, the angle between the normal line of the plane (reflecting plane) where incoming ray is specularly reflected and the normal line of the surface of the transparent screen is 45° or more.

As the transparent screen having reflection anisotropy, it is preferable to use a transparent screen (hereinafter, referred to as an inclined cholesteric-type transparent screen) having, as the light-reflecting member, a cholesteric liquid crystal layer in which the helical axis is inclined evenly in at least one direction, a sheet-shaped transparent screen (hereinafter, referred to as a linear Fresnel lens-type transparent screen) which has a linear Fresnel lens-shaped uneven surface and has a reflector on an inclined surface of the linear Fresnel lens, and in which a surface of the reflector opposite to the inclined surface is covered with a resin and is flattened, or the like.

In addition, it is preferable that the transparent light-reflecting member exhibits diffuse reflectivity in order to further widen the visual angle of the viewer, or to ensure visibility of a large number of people. As a method for realizing diffuse reflectivity, a method of using a cholesteric liquid crystal layer in which the helical axis is not uniform in the plane of the light-reflecting member, a method of blending light-scattering particles in the light-reflecting member, or the like can be used.

As a cholesteric liquid crystal layer preferably used in the transparent light-reflecting member described above, it is most preferable that the helical axis thereof is inclined evenly at least one direction and fluctuates within a certain range.

Hereinafter, specific examples of the transparent screen having reflection anisotropy will be described in detail.

(Linear Fresnel Lens-Type Transparent Screen)

Figure 7:
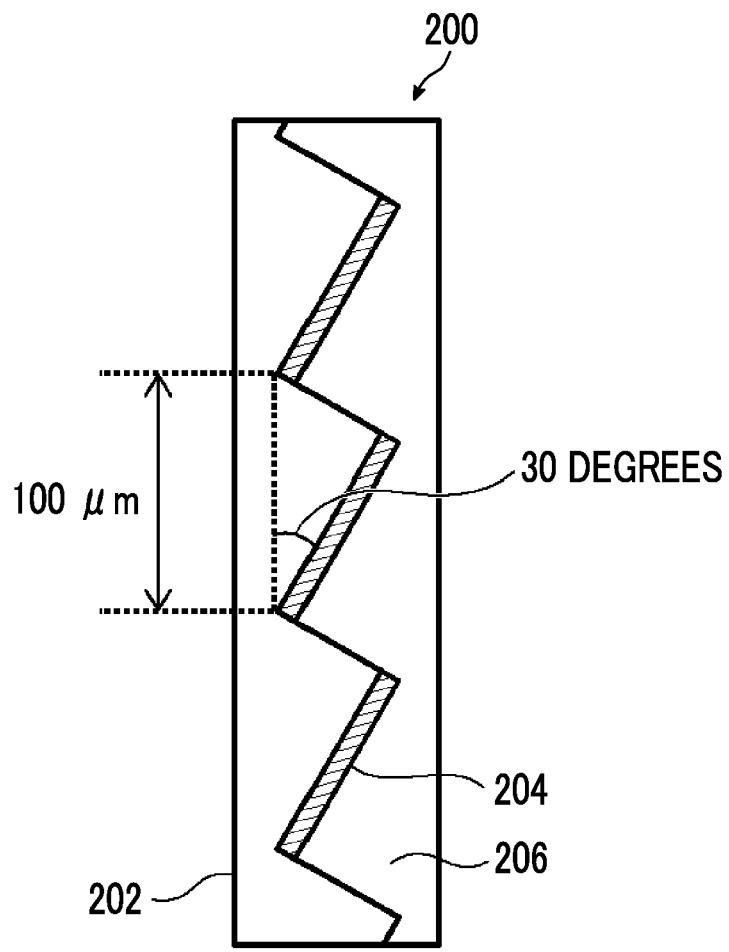
FIG. 7 is a schematic view showing an example of a transparent screen used in the present invention.

FIG. 7 is a view schematically showing an example of the transparent screen used in the display according to the embodiment of the present invention.

A transparent screen 200 shown in FIG. 7 includes a transparent base material 202, a reflector 204, and a resin layer 206.

The transparent base material 202 is a transparent member having a linear Fresnel lens-shaped uneven surface. The material of the transparent base material 202 is not particularly limited as long as it has transparency, and examples thereof include resins such as acrylic resin, and glass.

The surface (surface opposite to the reflector 204) of the transparent base material 202 is flat.

The reflector 204 is a member having transparency and light reflectivity to at least a part of light. The reflector 204 is disposed on the inclined surface of the uneven surface of the transparent base material 202.

As the reflector 204, a dielectric multilayer film, a metallic thin film, or a cholesteric liquid crystal layer which reflects right-handed or left-handed circular polarization of light having a predetermined wavelength and transmits light having other wavelength range and the other circular polarization, that is, which has wavelength-selective reflectivity and circular polarization-selective reflectivity is suitably used.

As is well known, the cholesteric liquid crystal layer is a layer obtained by immobilizing a cholesteric liquid crystalline phase formed by cholesteric alignment of a liquid crystal compound. In the cholesteric liquid crystal layer of the present invention, it is sufficient that the optical properties of the cholesteric liquid crystalline phase are retained in the layer, and the liquid crystal compound in the layer may not exhibit liquid crystallinity. The same applies to the inclined cholesteric liquid crystal layer described later.

Figure 8:
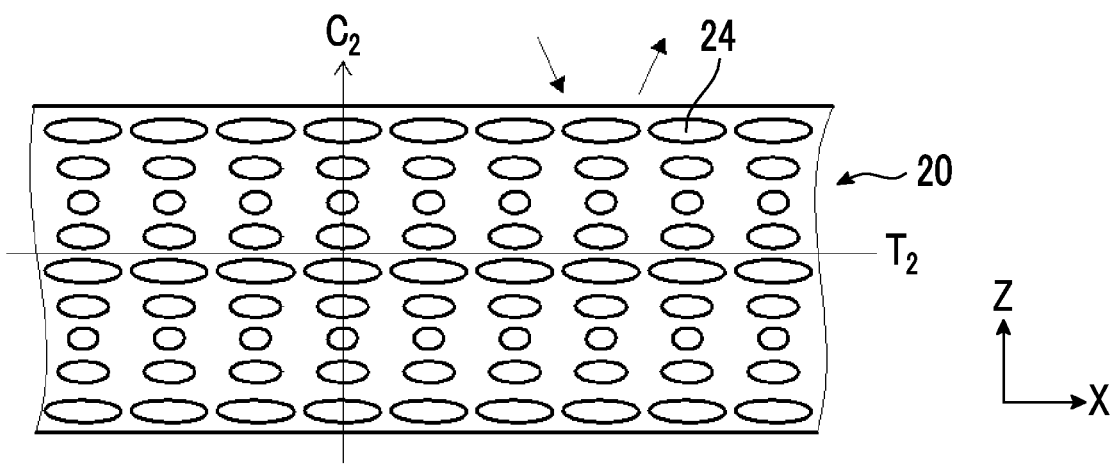
FIG. 8 is a schematic view of an X-Z plane of a cholesteric liquid crystal layer 20.

In a cholesteric liquid crystal layer 20 shown in FIG. 8, a helical axis $C_2$ derived from the cholesteric liquid crystalline phase is perpendicular to a main plane of the cholesteric liquid crystal layer 20, and a reflecting plane $T_2$ is a plane parallel to the main plane.

Figure 9:
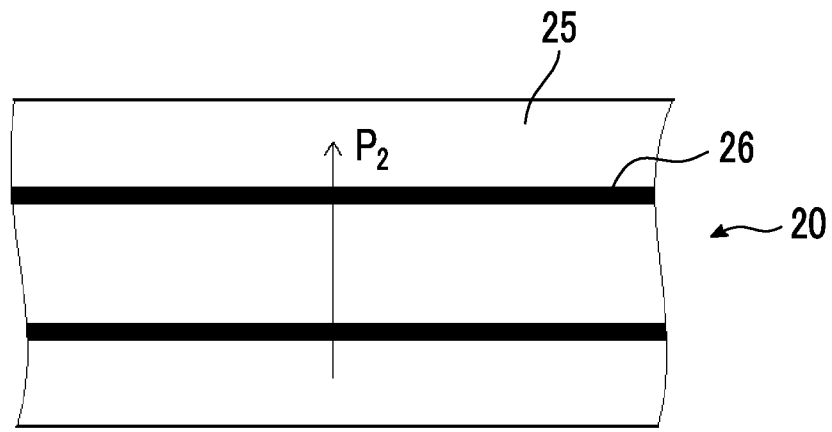
FIG. 9 is a schematic view of the X-Z plane of the cholesteric liquid crystal layer 20 in a case of being observed with a scanning electron microscope (SEM).

As shown in FIG. 9, in a case where an X-Z plane of the cholesteric liquid crystal layer 20 is observed with a scanning electron microscope (SEM), an array direction $P_2$ in which a bright portion 25 and a dark portion 26 are arrayed alternately is perpendicular to the main plane.

Since the cholesteric liquid crystalline phase shown in FIG. 9 has specular reflectivity, for example, in a case where light is incident on the cholesteric liquid crystal layer 20 from an oblique direction, the light is reflected diagonally at the same reflection angle as the incidence angle (see arrows in FIG. 8).

The resin layer 206 is a transparent layer which covers the surface of the reflector 204 opposite to the transparent base material 202 and covers the surface of the transparent base material 202. The material of the resin layer 206 is not particularly limited as long as it has transparency, and examples thereof include resins such as acrylic resin.

The surface (surface opposite to the reflector 204) of the resin layer 206 is flat.

In the transparent screen 200 having such a configuration, since the reflector 204 is inclined with respect to the main surface of the transparent screen 200, the inclination angle of the reflecting plane can be set to 5° or more. That is, by appropriately setting the angle of the inclined surface of the transparent base material 202, on which the reflector 204 is disposed, it is possible to appropriately set the inclination angle of the reflecting plane of the transparent screen 200.

In FIG. 7, the angle of the inclined surface of the transparent base material 202 with respect to the surface thereof is described as 30° and the pitch of the unevenness of the uneven surface is described as 100 μm, but these numerical values represent an angle and a pitch in Example 2 and the transparent screen 200 in the present invention is not limited thereto.

(Inclined Cholesteric-Type Transparent Screen)

The inclined cholesteric liquid crystal layer included in the inclined cholesteric-type transparent screen will be described with reference to FIGS. 10 to 12.

<<Liquid Crystal Alignment Pattern>>

Figure 10:
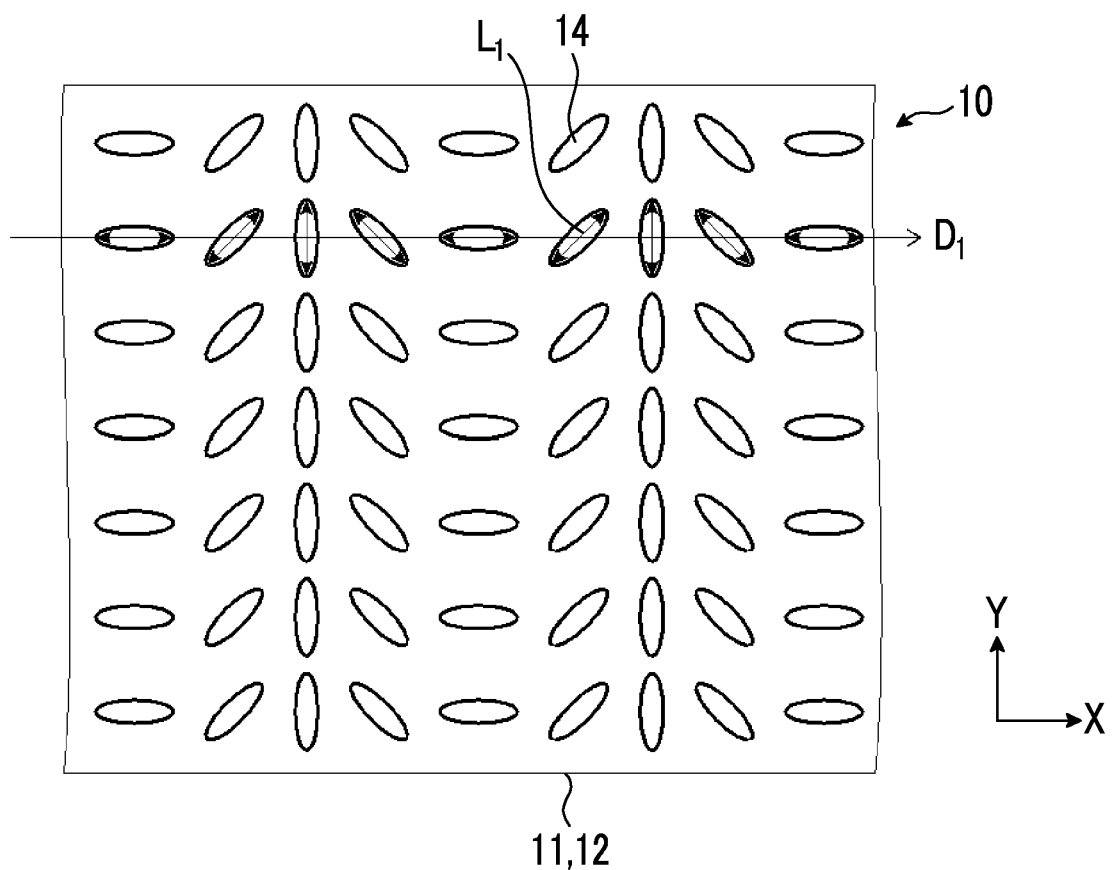
FIG. 10 is a schematic view of an X-Y plane of an inclined cholesteric liquid crystal layer 10.
Figure 11:
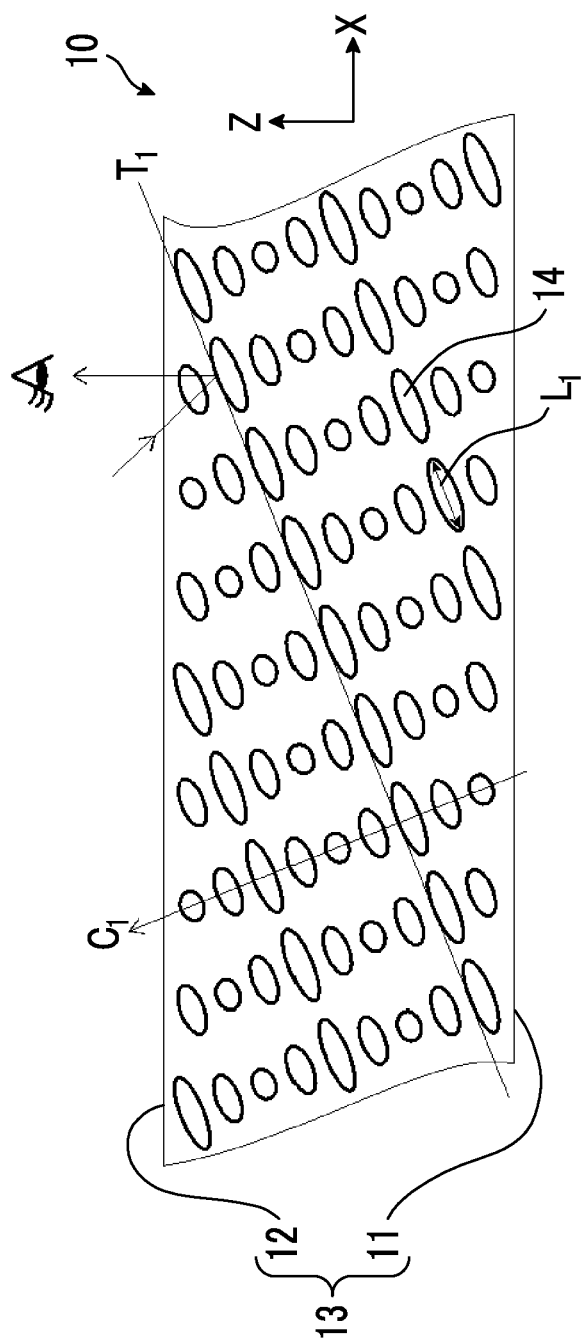
FIG. 11 is a schematic view of an X-Z plane of the inclined cholesteric liquid crystal layer 10.

FIGS. 10 and 11 show a schematic view conceptually showing the alignment state of the liquid crystal compound in the inclined cholesteric liquid crystal layer.

FIG. 10 is a schematic view showing, in an inclined cholesteric liquid crystal layer 10 having a main plane 13 of a pair of a main plane 11 and a main plane 12, an in-plane alignment state of the liquid crystal compound in the main plane 11 and the main plane 12. In addition, FIG. 11 is a schematic cross-sectional view showing a state of the cholesteric liquid crystalline phase in the cross section perpendicular to the main plane 11 and the main plane 12. In the following, the main plane 11 and main plane 12 of the inclined cholesteric liquid crystal layer 10 will be described as an X-Y plane, and a cross section perpendicular to the X-Y plane will be described as an X-Z plane. That is, FIG. 10 corresponds to a schematic view of the X-Y plane of the inclined cholesteric liquid crystal layer 10, and FIG. 11 corresponds to a schematic view of the X-Z plane of the inclined cholesteric liquid crystal layer 10.

Hereinafter, an aspect in which a rod-like liquid crystal compound is used as the liquid crystal compound will be described as an example.

As shown in FIG. 10, in the X-Y plane of the inclined cholesteric liquid crystal layer 10, a liquid crystal compound 14 is arrayed along a plurality of array axes $D_1$ parallel to each X-Y plane, and in each of the array axes $D_1$, an orientation of a molecular axis $L_1$ of the liquid crystal compound 14 has a liquid crystal alignment pattern which changes consecutively while rotating over one direction in the plane along the array axis $D_1$. Here, for convenience of description, it is assumed that the array axis $D_1$ is aligned in the X direction. In addition, in the Y direction, the liquid crystal compounds 14 having the same orientation of the molecular axis $L_1$ are aligned at regular intervals.

The "orientation of a molecular axis $L_1$ of the liquid crystal compound 14 has a liquid crystal alignment pattern which changes consecutively while rotating over one direction in the plane along the array axis $D_1$" means that the angle between the molecular axis $L_1$ of the liquid crystal compound 14 and the array axis $D_1$ is different depending on the position in the array axis $D_1$ direction, and the angle between the molecular axis $L_1$ and the array axis $D_1$ gradually changes from $\theta_1$ to $\theta_1+180°$ or $\theta_1-180°$ along the array axis $D_1$. That is, as shown in FIG. 10, in the plurality of liquid crystal compounds 14 arrayed along the array axis $D_1$, the molecular axis $L_1$ changes while rotating along the array axis $D_1$ by a constant angle.

In addition, in the present specification, in a case where the liquid crystal compound 14 is a rod-like liquid crystal compound, the molecular axis $L_1$ of the liquid crystal compound 14 means a molecular major axis of the rod-like liquid crystal compound. On the other hand, in a case where the liquid crystal compound 14 is a disk-like liquid crystal compound, the molecular axis $L_1$ of the liquid crystal compound 14 means an axis parallel to the normal direction to the disk-like liquid crystal compound with respect to a disk plane.

FIG. 11 shows a schematic view of the X-Z plane of the inclined cholesteric liquid crystal layer 10.

In the X-Z plane of the inclined cholesteric liquid crystal layer 10 shown in FIG. 11, the molecular axis $L_1$ of the liquid crystal compound 14 is inclined and aligned with respect to the main plane 11 and main plane 12 (X-Y plane).

An average angle (average tilt angle) $\theta_3$ between the molecular axis $L_1$ of the liquid crystal compound 14 and the main plane 11 and main plane 12 (X-Y plane) is preferably 5° to 45° and more preferably 12° to 22°. The angle $\theta_3$ can be measured by observing the X-Z plane of the inclined cholesteric liquid crystal layer 10 with a polarizing microscope. Among these, in the X-Z plane of the inclined cholesteric liquid crystal layer 10, it is preferable that the molecular axis $L_1$ of the liquid crystal compound 14 is inclined and aligned in the same direction with respect to the main plane 11 and main plane 12 (X-Y plane).

The above-described average angle is a value obtained by measuring, in the polarizing microscope observation of the cross section of the cholesteric liquid crystal layer, the angle between the molecular axis $L_1$ of the liquid crystal compound 14 and the main plane 11 and main plane 12 at any five or more points, and arithmetically averaging these values.

Since the molecular axis $L_1$ is aligned as described above, as shown in FIG. 11, in the inclined cholesteric liquid crystal layer 10, a helical axis $C_1$ derived from the cholesteric liquid crystalline phase is inclined at a predetermined angle with respect to the main plane 11 and main plane 12 (X-Y plane). That is, a reflecting plane $T_1$ (plane on which a liquid crystal compound that is orthogonal to the helical axis $C_1$ and has the same azimuthal angle exists) of the inclined cholesteric liquid crystal layer 10 is inclined in a substantially constant direction with respect to the main plane 11 and main plane 12 (X-Y plane).

The "liquid crystal molecules having the same azimuthal angle" refer to liquid crystal molecules having the same alignment direction of the molecular axes in a case of being projected onto the main plane 11 and main plane 12 (X-Y plane).

Figure 12:
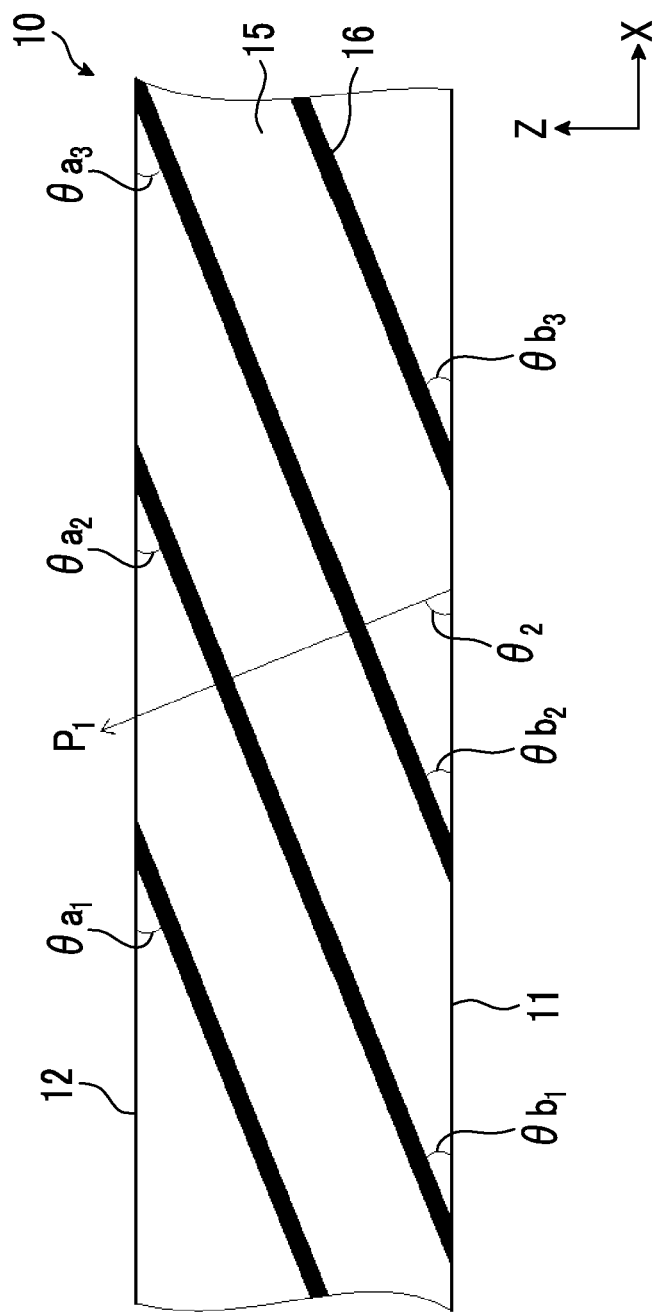
FIG. 12 is a schematic view of the X-Z plane of the inclined cholesteric liquid crystal layer 10 in a case of being observed with a scanning electron microscope (SEM).

In a case where the X-Z plane of the inclined cholesteric liquid crystal layer 10 shown in FIG. 11 is observed with SEM, it is observed that a streak pattern that an array direction $P_1$ in which a bright portion 15 and a dark portion 16 are arrayed alternately as shown in FIG. 12 is inclined at a predetermined angle $\theta_2$ with respect to the main plane 11 and main plane 12 (X-Y plane). In FIG. 12, two bright portions 15 and two dark portions 16 correspond to one pitch of the helix (one winding number of the helix).

In the inclined cholesteric liquid crystal layer 10, the molecular axis $L_1$ of the liquid crystal compound 14 is substantially orthogonal to the array direction $P_1$ in which a bright portion 15 and a dark portion 16 are arrayed alternately.

The angle between the molecular axis $L_1$ and the array direction $P_1$ is preferably 80° to 90° and more preferably 85° to 90°.

Hereinafter, the reason why the reflection anisotropy of the inclined cholesteric liquid crystal layer 10 can be obtained will be described.

<<Reflection Anisotropy>>

Since the reflecting plane $T_1$ is inclined in a predetermined direction with respect to the main plane 11 and the main plane 12 (X-Y plane), the inclined cholesteric liquid crystal layer 10 shown in FIGS. 10 and 11 has reflected light anisotropy. For example, in a case where light is incident on the inclined cholesteric liquid crystal layer 10 from an oblique direction, the light is reflected by the reflecting plane $T_1$ in the normal direction to the main plane 11 and main plane 12 (X-Y plane) (see arrows in FIG. 11).

<<Cholesteric Liquid Crystalline Phase>>

It is known that the cholesteric liquid crystalline phase exhibits selective reflectivity at a specific wavelength. The center wavelength $\lambda$ of selective reflection (selective reflection center wavelength) depends on a pitch P (=helical period) of a helical structure in the cholesteric liquid crystalline phase and satisfies a relationship of $\lambda=n \times P$ with an average refractive index n of the cholesteric liquid crystalline phase. Therefore, the selective reflection center wavelength can be adjusted by adjusting the pitch of the helical structure. The pitch of the cholesteric liquid crystalline phase depends on the type of chiral agent used together with the liquid crystal compound, or the concentration thereof added in a case of forming an optically anisotropic layer, a desired pitch can be obtained by adjusting these.

Regarding the adjustment of the pitch, detailed description can be found in FUJIFILM Research Report No. 50 (2005), pp. 60 to 63. Regarding a method for measuring a sense and the pitch of the helix, it is possible to use the method described on page 46 of "Liquid Crystal Chemical Experiment Introduction" edited by Japan Liquid Crystal Society, published by Sigma Corporation in 2007, and page 196 of "Liquid Crystal Handbook" Liquid Crystal Handbook Editing Committee, Maruzen Publishing Co., Ltd.

The cholesteric liquid crystalline phase exhibits selective reflectivity with respect to left-handed or right-handed circular polarization at a specific wavelength. Whether or not the reflected light is right-handed circular polarization or left-handed circular polarization is determined depending on a helically twisted direction (sense) of the cholesteric liquid crystalline phase. Regarding the selective reflection of the circular polarization by the cholesteric liquid crystalline phase, in a case where the helically twisted direction of the cholesteric liquid crystalline phase is right-handed, right-handed circular polarization is reflected, and in a case where the helically twisted direction of the cholesteric liquid crystalline phase is left-handed, left-handed circular polarization is reflected.

The direction of revolution of the cholesteric liquid crystalline phase can be adjusted by the type of liquid crystal compound forming the optically anisotropic layer and/or the type of chiral agent added.

In addition, a half-width $\Delta\lambda$ (nm) of a selective reflection range (circular polarization reflection range) where selective reflection is exhibited depends on a refractive index $\Delta n$ of the cholesteric liquid crystalline phase and the helical pitch P and complies with a relationship of $\Delta\lambda = \Delta n \times P$. Therefore, the width of the selective reflection range can be controlled by adjusting $\Delta n$. $\Delta n$ can be adjusted by the type of liquid crystal compound forming an (inclined) cholesteric liquid crystal layer and mixing ratio thereof, and the temperature during immobilizing the alignment.

The half-width of the reflection wavelength range is adjusted according to the use of the (inclined) cholesteric liquid crystal layer, and for example, may be 10 to 500 nm, preferably 20 to 300 nm, and more preferably 30 to 100 nm.

Figure 14:
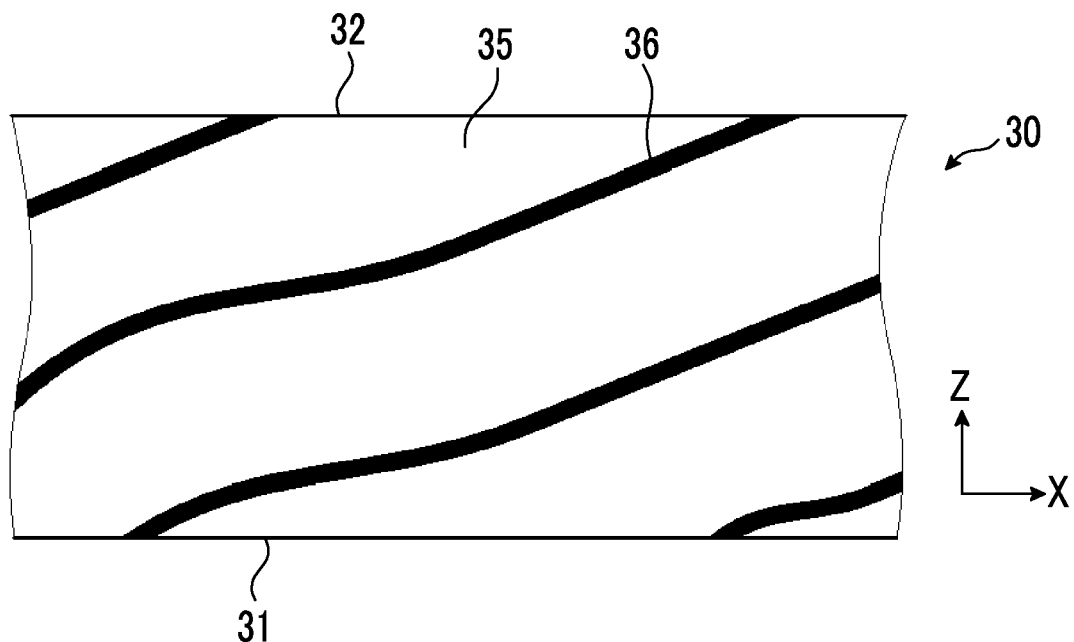
FIG. 14 is a schematic view of an X-Z plane of the inclined cholesteric liquid crystal layer 30 in a case of being observed with SEM.

Here, in the example shown in FIG. 12, the inclined cholesteric liquid crystal layer 10 has a configuration in which the bright portion 15 and the dark portion 16 are linear, but the present invention is not limited thereto. As an inclined cholesteric liquid crystal layer 30 shown in FIG. 14, the shape of the bright-dark line consisting of a bright portion 35 and a dark portion 36 derived from the cholesteric liquid crystalline phase, which is observed in the X-Z plane with SEM, may be wavy (flapping structure).

As described above, in the cholesteric liquid crystal layer, a surface parallel to the bright portion and the dark portion is the reflecting plane. Therefore, in a case where the shape of the bright portion and the dark portion derived from the cholesteric liquid crystalline phase is wavy, the reflecting plane of the inclined cholesteric liquid crystal layer is wavy. Accordingly, the reflection angle of the reflected light on the inclined cholesteric liquid crystal layer 30 varies depending on the position, and as a result, light diffusivity is obtained.

In the inclined cholesteric liquid crystal layer 30, the "shape of the bright-dark line consisting of a bright portion 35 and a dark portion 36 derived from the cholesteric liquid crystalline phase is wavy (flapping structure)" means a layer having a structure in which the angle between the helical axis and the surface of the inclined cholesteric liquid crystal layer changes periodically. In other words, the inclined cholesteric liquid crystal layer 30 is a layer in which the angle between a normal line of the line formed by the dark portion in the cross-sectional view observed by SEM and the surface of the cholesteric liquid crystal layer changes periodically.

The flapping structure preferably has the following configuration.

A point where one end portion of the dark portion intersects the main plane or side plane of the cholesteric liquid crystal layer is defined as a1, a point where the other end portion of the dark portion intersects the main plane or side plane of the cholesteric liquid crystal layer is defined as a2, and a line segment consisting of the points a1 and a2 is defined as a reference line. In the flapping structure, in a case where the angle between the tangential line at a certain point in the dark portion and this reference line is defined as the inclination angle of the dark portion, the amount of fluctuation of the inclination angle in the line formed by the dark portion is 5° or more.

Figure 13:
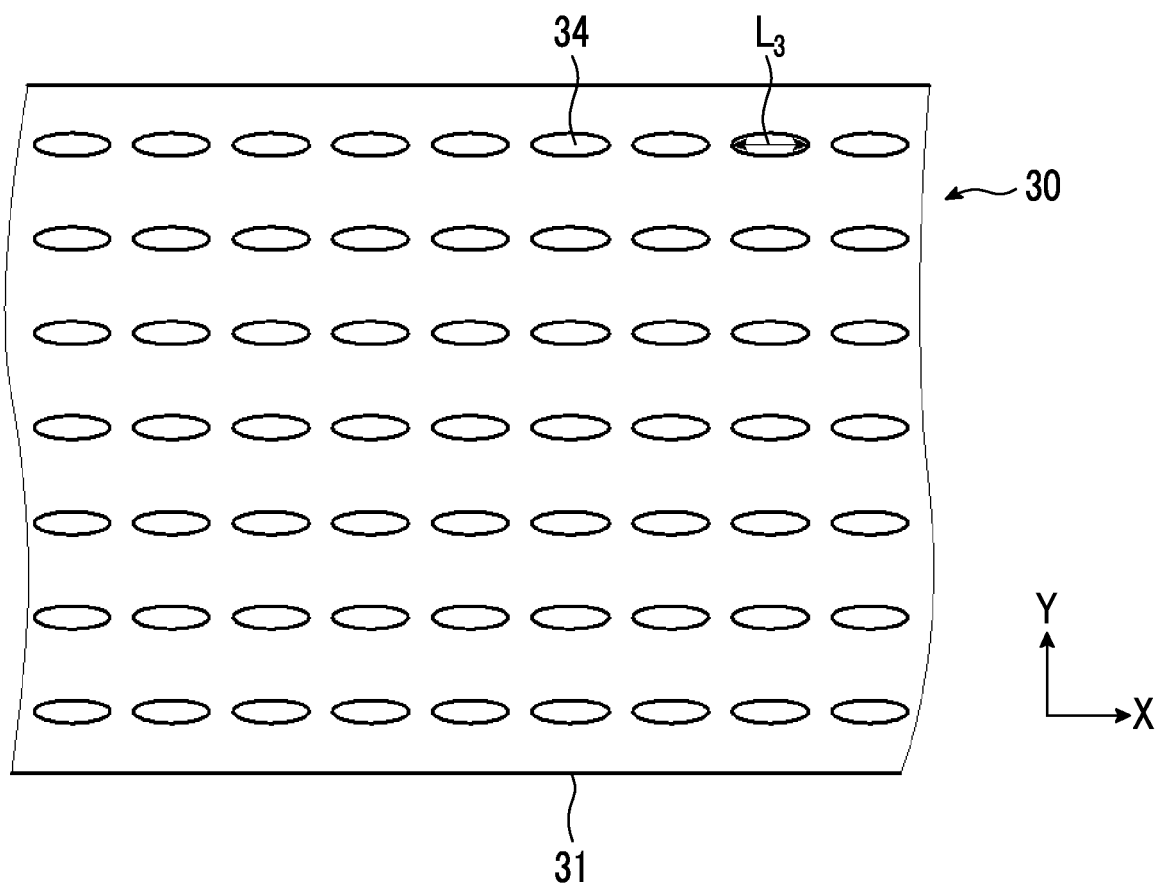
FIG. 13 is a schematic view of an X-Y plane of an inclined cholesteric liquid crystal layer 30.

As an example, as shown in FIG. 13, the inclined cholesteric liquid crystal layer 30 in which the bright portion 35 and the dark portion 36 are wavy in this way is easily formed by aligning the array of a molecular axis $L_3$ of a liquid crystal compound 34 in one main plane 31 to face a certain direction in the plane.

The array of the molecular axis $L_3$ of the liquid crystal compound 34 in the other main plane 32 has the same alignment as the X-Y plane of the inclined cholesteric liquid crystal layer 10 shown in FIG. 10. In addition, an X-Z plane of the inclined cholesteric liquid crystal layer 30 has the same alignment as the X-Z plane of the inclined cholesteric liquid crystal layer 10. That is, in the inclined cholesteric liquid crystal layer 30, the molecular axis $L_3$ of the liquid crystal compound 34 is inclined and aligned in a predetermined direction with respect to the main plane 31 and main plane 32 (X-Y plane), and the helical axis derived from the cholesteric liquid crystalline phase is inclined at a predetermined angle with respect to the main plane 31 and main plane 32 (X-Y plane).

Alternatively, the inclined cholesteric liquid crystal layer 30 in which the bright portion 35 and the dark portion 36 are wavy in this way can be formed by varying one period $\Lambda$ that is a length in the liquid crystal alignment pattern described later, in which the orientation of the molecular axis of the liquid crystal compound rotates 180°, along the array axis.

Alternatively, as another method, a method of adding a surfactant to a liquid crystal composition for forming a cholesteric liquid crystal layer is also used.

Meanwhile, as described above, in the X-Z plane of the inclined cholesteric liquid crystal layer 10, the molecular axis $L_1$ of the liquid crystal compound 14 is inclined and aligned with respect to the main plane 11 and main plane 12 (X-Y plane), and in the main plane 11 and main plane 12 (X-Y plane), the orientation of the molecular axis $L_1$ of the liquid crystal compound 14 changes consecutively while rotating over one direction in the plane along the array axis $D_1$. According to this configuration of the inclined cholesteric liquid crystal layer 10, it is assumed that the bright-dark line consisting of the bright portion and the dark portion derived from the cholesteric liquid crystalline phase, which is observed in the X-Z plane with SEM, exhibits high linearity. As a result, the inclined cholesteric liquid crystal layer 10 has low haze and high transparency.

Here, the example of the inclined cholesteric liquid crystal layer 10 shown in FIG. 11 has a configuration in which the molecular axis of the liquid crystal compound 14 is inclined with respect to the main plane 13 of the inclined cholesteric liquid crystal layer 10, but the present invention is not limited thereto. The molecular axis of the liquid crystal compound may be parallel to the main plane of the inclined cholesteric liquid crystal layer.

Figure 15:
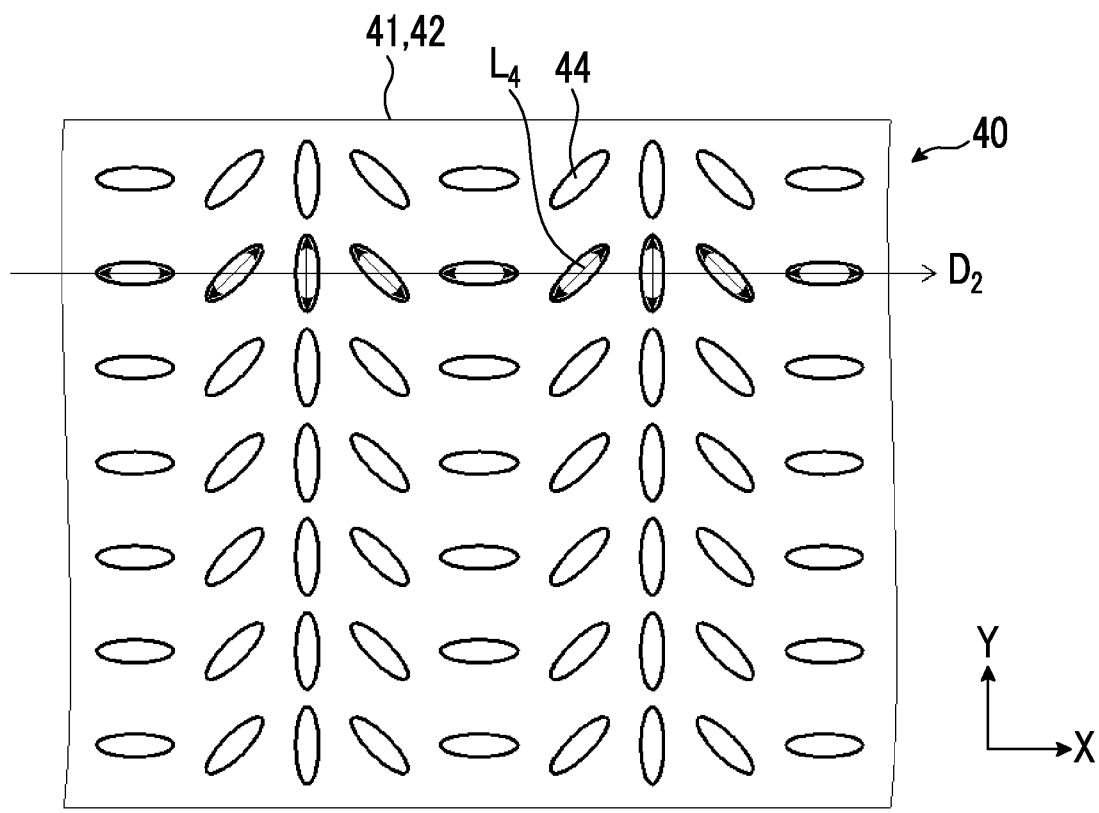
FIG. 15 is a schematic view of an X-Y plane of an inclined cholesteric liquid crystal layer 40.
Figure 16:
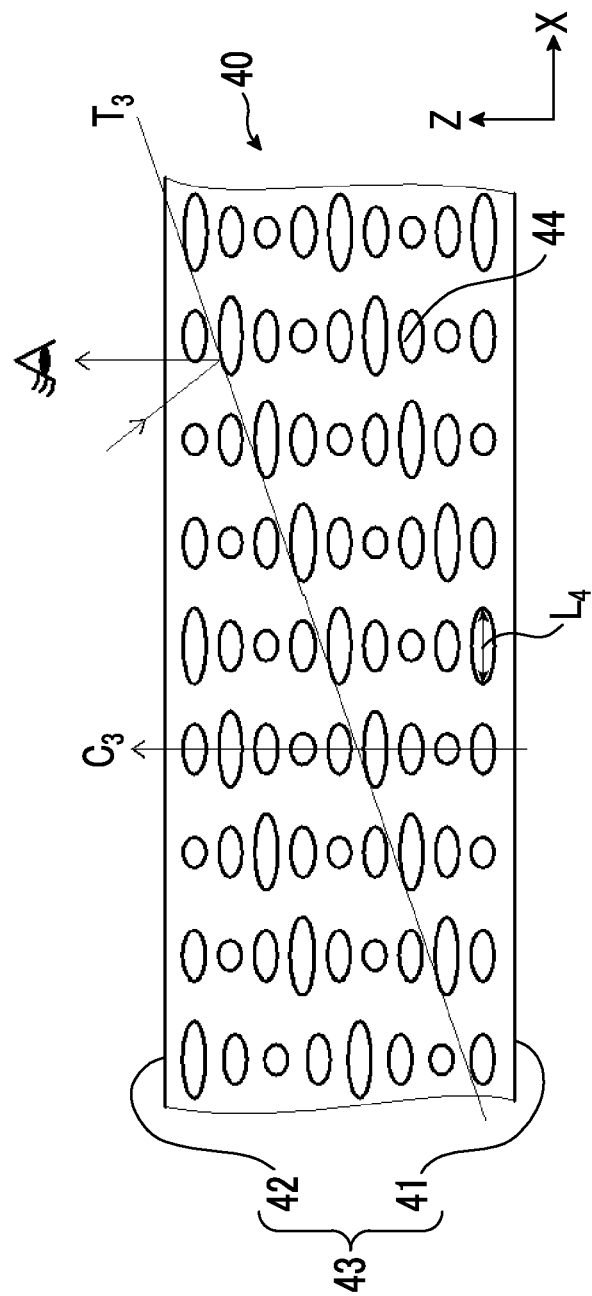
FIG. 16 is a schematic view of an X-Z plane of the inclined cholesteric liquid crystal layer 40.

FIGS. 15 and 16 show schematic views of another example of the inclined cholesteric liquid crystal layer used in the present invention. Specifically, FIG. 15 is a schematic view conceptually showing, in an inclined cholesteric liquid crystal layer 40 having a main plane 43 of a pair of a main plane 41 and a main plane 42, an alignment state of the liquid crystal compound in the main plane 41 and the main plane 42. In addition, FIG. 16 shows a state of the inclined cholesteric liquid crystal layer in a cross section perpendicular to the main plane 43 of the inclined cholesteric liquid crystal layer 40. In the following, the main plane 41 and main plane 42 of the inclined cholesteric liquid crystal layer 40 will be described as an X-Y plane, and a cross section perpendicular to the X-Y plane will be described as an X-Z plane. That is, FIG. 15 is a schematic view of the X-Y plane of the inclined cholesteric liquid crystal layer 40, and FIG. 16 is a schematic view of the X-Z plane of the inclined cholesteric liquid crystal layer 40.

As shown in FIG. 15, in the X-Y plane of the inclined cholesteric liquid crystal layer 40, a liquid crystal compound 44 is arrayed along a plurality of array axes $D_2$ parallel to each X-Y plane, and in each of the array axes $D_2$, an orientation of a molecular axis $L_4$ of the liquid crystal compound 44 changes consecutively while rotating over one direction in the plane along the array axis $D_2$. That is, the alignment state of the liquid crystal compound 44 in the X-Y plane of the inclined cholesteric liquid crystal layer 40 is the same as the alignment state of the liquid crystal compound 14 in the X-Y plane of the inclined cholesteric liquid crystal layer 10 shown in FIG. 10.

As shown in FIG. 16, in the X-Z plane of the inclined cholesteric liquid crystal layer 40, the molecular axis $L_4$ of the liquid crystal compound 44 is not inclined with respect to the main plane 41 and main plane 42 (X-Y plane). In other words, the molecular axis $L_4$ is parallel to the main plane 41 and main plane 42 (X-Y plane).

Since the inclined cholesteric liquid crystal layer 40 has the above-described X-Y plane shown in FIG. 15 and X-Z plane shown in FIG. 16, a helical axis $C_3$ derived from the cholesteric liquid crystalline phase is perpendicular to the main plane 41 and main plane 42 (X-Y plane), and a reflecting plane $T_3$ thereof is inclined in a predetermined direction with respect to the main plane 41 and main plane 42 (X-Y plane). In a case where the X-Z plane of the above-described inclined cholesteric liquid crystal layer 40 is observed with SEM, it is observed that a streak pattern that an array direction in which a bright portion and a dark portion are arrayed alternately is inclined at a predetermined angle with respect to the main plane 41 and main plane 42 (X-Y plane) (same as that of FIG. 12).

As described above, in the inclined cholesteric liquid crystal layer, the molecular axis of the liquid crystal compound may be parallel to the main plane of the inclined cholesteric liquid crystal layer.

In the inclined cholesteric liquid crystal layer 10 shown in FIGS. 10 and 11, the molecular axis $L_1$ is substantially orthogonal to the array direction $P_1$ in which the bright portion 15 and the dark portion 16, which are observed in the X-Z plane with SEM, are arrayed alternately. That is, the direction of the helical axis $C_1$ is substantially parallel to the array direction $P_1$ in which the bright portion 15 and the dark portion 16 are arrayed alternately. As a result, light incident from an oblique direction tends to be more parallel to the helical axis $C_1$, and the reflected light on the reflecting plane has a high degree of circular polarization. On the other hand, in a case of the inclined cholesteric liquid crystal layer 40, since the helical axis $C_3$ is perpendicular to the main plane 41 and main plane 42 (X-Y plane), an angle between an incident direction of light incident from an oblique direction and the direction of the helical axis $C_3$ is larger. That is, the incident direction of the light incident from an oblique direction is more nonparallel to the direction of the helical axis $C_3$. Therefore, in a case of comparing the inclined cholesteric liquid crystal layer 10 with the inclined cholesteric liquid crystal layer 40, the reflected light on the reflecting plane has a higher degree of circular polarization.

Here, in both main planes 11 and 12 of the inclined cholesteric liquid crystal layer 10 shown in FIGS. 10 and 11, the orientation of the molecular axis $L_1$ of the liquid crystal compound 14 changes consecutively while rotating over one direction in the plane along the array axis $D_1$, but on only one main plane, the orientation of the molecular axis of the liquid crystal compound may change consecutively while rotating over one direction in the plane along the array axis.

In addition, in the inclined cholesteric liquid crystal layer, it is preferable that an array axis existing on one main plane and an array axis existing on the other main plane are parallel to each other.

In addition, in the inclined cholesteric liquid crystal layer, areas where intervals of lines (bright lines) formed by bright portions derived from the cholesteric liquid crystalline phase, which are observed in the X-Z plane with SEM, are different from each other may exist more than once. As described above, two bright portions and two dark portions correspond to one pitch of the helix. That is, in each area where intervals of bright lines formed by bright portions derived from the cholesteric liquid crystalline phase are different from each other, since the helical pitch is different for each area, the center wavelength k of selective reflection is also different. By forming the inclined cholesteric liquid crystal layer of the above-described aspect, the reflection wavelength range can be further widened.

Specific examples of this aspect include an aspect in which the cholesteric liquid crystal layer has an area $A_R$ having a center wavelength of selective reflection in the red light wavelength range, an area $A_G$ having a center wavelength of selective reflection in the green light wavelength range, and an area $A_B$ having a center wavelength of selective reflection in the blue light wavelength range. The area $A_R$, area $A_G$, and area $A_B$ can be formed by mask exposure (patterned exposure) which is performed by irradiating light from an oblique direction with respect to the main plane (preferably, performed by irradiating light from a direction substantially parallel to the array direction). In particular, the inclined cholesteric liquid crystal layer preferably has an area where the helical pitch consecutively changes in any direction in the plane of the main plane. Specifically, it is preferable that the area AR, the area $A_G$, and the area $A_B$ are disposed consecutively in any direction in the plane of the main plane. In this case, the inclined cholesteric liquid crystal layer has areas where intervals of lines formed by bright portions derived from the cholesteric liquid crystalline phase, which are observed in the X-Z plane with SEM, consecutively change.

In the above, an aspect in which the inclined cholesteric liquid crystal layer 10 has the area $A_R$, the area $A_G$, and the area $A_B$ has been described, but the present invention is not limited thereto. The inclined cholesteric liquid crystal layer may have two or more areas having different selective reflection wavelengths. In addition, the center wavelength of selective reflection may be infrared or ultraviolet.

The above-described one period Λ corresponds to the interval of the bright-dark line in the reflection polarizing microscope observation. Therefore, it is sufficient that the coefficient (standard deviation/mean value) of variation of the one period Λ is calculated by measuring the interval of the bright-dark line in the reflection polarizing microscope observation at 10 points on both main planes of the inclined cholesteric liquid crystal layer.

<<Method for Manufacturing Inclined Cholesteric Liquid Crystal Layer>>

Examples of a manufacturing method for manufacturing the inclined cholesteric liquid crystal layer used in the present invention include a method of using a predetermined liquid crystal layer as an alignment substrate of the inclined cholesteric liquid crystal layer, and using a liquid crystal composition including a chiral agent X in which helical twisting power (HTP) changes due to irradiation with light or including a chiral agent Y in which the helical twisting power changes due to change in temperature.

Hereinafter, the method for manufacturing the inclined cholesteric liquid crystal layer will be described in detail.

One embodiment of the method for manufacturing the inclined cholesteric liquid crystal layer has the following step 1 and the following step 2:

a step 1 of forming, using a composition including a disk-like liquid crystal compound, a liquid crystal layer in which, in at least one surface, a molecular axis of the disk-like liquid crystal compound is inclined with respect to the surface; and a step 2 of forming an inclined cholesteric liquid crystal layer on the liquid crystal layer using a composition including a liquid crystal compound.

Hereinafter, the steps 1 and 2 will be described in detail by exemplifying the above-described inclined cholesteric liquid crystal layer 10 as an example.

[Step 1]

The step 1 is a step of forming a liquid crystal layer using a composition including a disk-like liquid crystal compound.

In at least one surface of the liquid crystal layer, the molecular axis of the disk-like liquid crystal compound is inclined with respect to the surface. In other words, in at least one surface of the liquid crystal layer, the disk-like liquid crystal compound is aligned such that the molecular axis thereof is inclined with respect to the surface. In the present manufacturing method, the inclined cholesteric liquid crystal layer is formed on a surface (hereinafter, also referred to as an "inclined alignment surface") of the liquid crystal layer, in which the disk-like liquid crystal compound is inclined and aligned.

The specific method of the step 1 is not particularly limited, and it is preferable to include the following step 1-1 and the following step 1-2. In the following, as a method of inclining and aligning the disk-like liquid crystal compound, a method (step 1-1) of forming a composition layer using a substrate in which a rubbing alignment film having a pretilt angle is disposed on a surface will be shown, but the method of inclining and aligning the disk-like liquid crystal compound is not limited thereto. For example, the method of inclining and aligning the disk-like liquid crystal compound may be a method (for example, the following step 1-1') of adding a surfactant to a composition for forming a liquid crystal layer. In this case, in the step 1, the following step 1-1' may be performed instead of the step 1-1.

Step 1-1': step of forming a composition layer on a substrate (a rubbing alignment film may not be disposed on the surface) using a composition including a disk-like liquid crystal compound and a surfactant In addition, in a case where the disk-like liquid crystal compound has a polymerizable group, in the step 1, it is preferable that a curing treatment is performed on the composition layer as described later.

Step 1-1: step of forming, using a composition (composition for forming a liquid crystal layer) including a disk-like liquid crystal compound, a composition layer on a substrate in which a rubbing alignment film having a pretilt angle is disposed on a surface Step 1-2: step of aligning the disk-like liquid crystal compound in the composition layer The step 1 will be described below.

<Substrate>

The substrate is a plate supporting the composition layer described later. Among these, a transparent substrate is preferable. The transparent substrate is intended to be a substrate in which the transmittance of visible light is 60% or more, and the transmittance is preferably 80% or more and more preferably 90% or more.

The material constituting the substrate is not particularly limited, and examples thereof include a cellulose-based polymer, a polycarbonate-based polymer, a polyester-based polymer, a (meth)acrylic polymer, a styrene-based polymer, a polyolefin-based polymer, a vinyl chloride-based polymer, an amide-based polymer, an imide-based polymer, a sulfone-based polymer, a polyethersulfone-based polymer, and a polyetheretherketone-based polymer.

The substrate may include various additives such as an ultraviolet (UV) absorber, matting fine particles, a plasticizer, a deterioration inhibitor, and a release agent.

The substrate preferably has low birefringence in the visible light region. For example, the phase difference of the substrate at a wavelength of 550 nm is preferably 50 nm or less and more preferably 20 nm or less.

The thickness of the substrate is not particularly limited, but from the viewpoint of thinning and handleability, is preferably 10 to 200 μm and more preferably 20 to 100 μm.

The thickness means an average thickness, and is obtained by measuring thicknesses at any 5 points on the substrate and arithmetically averaging these values. The method of measuring this thickness is also applied to the thickness of the liquid crystal layer and thickness of the inclined cholesteric liquid crystal layer described later.

The type of the rubbing alignment film having a pretilt angle is not particularly limited, and for example, a polyvinyl alcohol alignment film, a polyimide alignment film, or the like can be used.

<Composition for Forming a Liquid Crystal Layer>

Hereinafter, the composition for forming a liquid crystal layer will be described.

(Disk-Like Liquid Crystal Compound)

The composition for forming a liquid crystal layer includes a disk-like liquid crystal compound.

The disk-like liquid crystal compound is not particularly limited, and a known compound can be used. Among these, a compound having a triphenylene skeleton is preferable.

The disk-like liquid crystal compound may have a polymerizable group. The type of the polymerizable group is not particularly limited, and the polymerizable group is preferably a functional group capable of an addition polymerization reaction and more preferably a polymerizable ethylenically unsaturated group or a ring polymerizable group. More specifically, as the polymerizable group, a (meth)acryloyl group, a vinyl group, a styryl group, an allyl group, an epoxy group, or an oxetane group is preferable, and a (meth)acryloyl group is more preferable.

(Polymerization Initiator)

The composition for forming a liquid crystal layer may include a polymerization initiator. In particular, in a case where the disk-like liquid crystal compound has a polymerizable group, it is preferable that the composition for forming a liquid crystal layer includes a polymerization initiator.

As the polymerization initiator, a photopolymerization initiator capable of initiating a polymerization reaction with ultraviolet irradiation is preferable. Examples of the photopolymerization initiator include α-carbonyl compounds (described in U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of triarylimidazole dimer and p-aminophenyl ketone (described in U.S. Pat. No. 3,549,367A), acridine and phenazine compounds (described in JP1985-105667A (JP-S60-105667A) and U.S. Pat. No. 4,239,850A), and oxadiazole compounds (described in U.S. Pat. No. 4,212,970A).

The content (in a case where a plurality of kinds of polymerization initiators are included, the total content thereof) of the polymerization initiator in the composition for forming a liquid crystal layer is not particularly limited, but is preferably 0.1 to 20 mass % and more preferably 1.0 to 8.0 mass % with respect to the total mass of the disk-like liquid crystal compound.

(Surfactant)

The composition for forming a liquid crystal layer may include a surfactant which can be unevenly distributed on the substrate side surface of the composition layer and/or the surface opposite to the substrate of the composition layer. In a case where the composition for forming a liquid crystal layer includes a surfactant, the disk-like liquid crystal compound is easily aligned at a desired inclination angle.

Examples of the surfactant include onium salt compounds (described in JP2012-208397A), boronic acid compounds (described in JP2013-054201A), perfluoroalkyl compounds (described in JP4592225B; FTERGENT manufactured by NEOS COMPANY LIMITED), and polymers including a functional group thereof.

The surfactant may be used alone or in combination of two or more kinds thereof.

The content (in a case where a plurality of kinds of surfactants are included, the total content thereof) of the surfactant in the composition for forming a liquid crystal layer is not particularly limited, but is preferably 0.01 to 10 mass %, more preferably 0.01 to 5.0 mass %, and still more preferably 0.01 to 2.0 mass % with respect to the total mass of the disk-like liquid crystal compound.

(Solvent)

The composition for forming a liquid crystal layer may include a solvent.

Examples of the solvent include water and organic solvents. Examples of the organic solvent include amides such as N,N-dimethylformamide; sulfoxides such as dimethyl sulfoxide; heterocyclic compounds such as pyridine; hydrocarbons such as benzene and hexane; alkyl halides such as chloroform and dichloromethane; esters such as methyl acetate, butyl acetate, and propylene glycol monoethyl ether acetate; ketones such as acetone, methyl ethyl ketone, cyclohexanone, and cyclopentanone; ethers such as tetrahydrofuran and 1,2-dimethoxyethane; and 1,4-butanediol diacetate. These may be used alone or in combination of two or more kinds thereof.

(Other Additives)

The composition for forming a liquid crystal layer may include other additives such as one or two or more kinds of antioxidants, ultraviolet absorbers, sensitizers, stabilizers, plasticizers, chain transfer agents, polymerization inhibitors, anti-foaming agents, leveling agents, thickeners, flame retardants, surface active substances, dispersants, and colorants such as a dye and a pigment.

<Procedure of Step 1-1>

In the step 1-1, as the step of forming a composition layer on the substrate, a step of forming a coating film of the above-described composition for forming a liquid crystal layer on the above-described substrate is preferable.

The coating method is not particularly limited, and examples thereof include a wire bar coating method, an extrusion coating method, a direct gravure coating method, a reverse gravure coating method, and a die-coating method.

After the application of the composition for forming a liquid crystal layer, a treatment of drying the coating film applied to the substrate may be performed as necessary. By performing the drying treatment, the solvent can be removed from the coating film.

The thickness of the coating film is not particularly limited, but is preferably 0.1 to 20 µm, more preferably 0.2 to 15 µm, and still more preferably 0.5 to 10 m.

<Procedure of Step 1-2>

The step 1-2 is preferably a step of aligning the disk-like liquid crystal compound in the composition layer by heating the above-described coating film.

As a preferred heating condition, it is preferable to heat the composition layer at 40° C. to 150° C. (preferably 60° C. to 100° C.) for 0.5 to 5 minutes (preferably 0.5 to 2 minutes). In a case of heating the composition layer, it is preferable that the composition layer is not heated to a temperature at which the liquid crystal compound exhibits an isotropic phase (Iso). In a case where the composition layer is heated to higher than a temperature at which the disk-like liquid crystal compound exhibits an isotropic phase, defects in the inclined and aligned liquid crystal phase increase, which is not preferable.

[Curing Treatment]

In a case where the disk-like liquid crystal compound has a polymerizable group, it is preferable that a curing treatment is performed on the composition layer.

The method of the curing treatment is not particularly limited, and examples thereof include photo-curing treatment and thermosetting treatment. Among these, a light irradiation treatment is preferable and an ultraviolet irradiation treatment is more preferable. In a case where the disk-like liquid crystal compound has a polymerizable group, the curing treatment is preferably a polymerization reaction by light irradiation (particularly ultraviolet irradiation), and more preferably a radical polymerization reaction by light irradiation (particularly ultraviolet irradiation).

A light source such as an ultraviolet lamp is used for the ultraviolet irradiation.

The irradiation energy amount of the ultraviolet rays is not particularly limited, but generally, is preferably approximately 100 to 800 mJ/cm$^2$. The time for irradiation with ultraviolet rays is not particularly limited, but may be appropriately determined from the viewpoint of both the sufficient strength and productivity of the layer to be obtained.

[Average Inclination Angle of Disk-Like Liquid Crystal Compound and Azimuthal Angle Controlling Ability of Inclined Alignment Surface of Liquid Crystal Layer]

In the above-described inclined alignment surface of the above-described liquid crystal layer, an average inclination angle (average tilt angle) of the disk-like liquid crystal compound with respect to the surface of the liquid crystal layer is, for example, preferably 20° to 90°, more preferably 20° to 80°, still more preferably 30° to 80°, and still more preferably 30° to 65°.

The above-described average inclination angle is a value obtained by measuring, in the polarizing microscope observation of the cross section of the liquid crystal layer, the angle between the molecular axis of the disk-like liquid crystal compound and the surface of the liquid crystal layer at any five or more points, and arithmetically averaging these values.

In the above-described inclined alignment surface of the above-described liquid crystal layer, the average inclination angle of the disk-like liquid crystal compound with respect to the surface of the liquid crystal layer can be measured by observing the cross section of the liquid crystal layer with a polarizing microscope.

In addition, in the above-described inclined alignment surface of the above-described liquid crystal layer, an azimuthal angle controlling ability is, for example, 0.00030 J/m$^2$ or less, preferably less than 0.00020 J/m$^2$, more preferably 0.00010 J/m$^2$ or less, and still more preferably 0.00005 J/m$^2$ or less. The lower limit is not particularly limited, but is, for example, 0.00000 J/m$^2$ or more.

The azimuthal angle controlling ability in the above-described inclined alignment surface of the above-described liquid crystal layer can be measured by a method described in J. Appl. Phys. 1992, 33, L1242.

By adjusting the inclination angle of the disk-like liquid crystal compound in the above-described inclined alignment surface of the above-described liquid crystal layer, there is an advantage that the inclination angle with respect to the main plane of the molecular axis of the liquid crystal compound in the inclined cholesteric liquid crystal layer can be easily adjusted to a predetermined angle. That is, as an example of the above-described inclined cholesteric liquid crystal layer 10 (see FIGS. 10 and 11), there is an advantage that an average angle $\theta_3$ with respect to the main plane 11 of the molecular axis L of the liquid crystal compound 14 in the inclined cholesteric liquid crystal layer 10 can be easily adjusted.

By adjusting the azimuthal angle controlling ability in the above-described inclined alignment surface of the above-described liquid crystal layer, in the main plane of the inclined cholesteric liquid crystal layer, the orientation of the molecular axis of the liquid crystal compound easily changes consecutively while rotating over one direction in the plane. That is, as an example of the above-described inclined cholesteric liquid crystal layer 10 (see FIGS. 10 and 11), by adjusting the azimuthal angle controlling ability in the above-described inclined alignment surface of the above-described liquid crystal layer, the liquid crystal compound 14 is arrayed along a plurality of array axes $D_1$ parallel to each X-Y plane, and in each of the array axes $D_1$, the orientation of the molecular axis $L_1$ of the liquid crystal compound 14 easily changes consecutively while rotating over one direction in the plane along the array axis $D_1$.

[Step 2]

Step 2 is a step of forming an inclined cholesteric liquid crystal layer on the liquid crystal layer using a composition including a liquid crystal compound. The step 2 will be described below.

The step 2 preferably has the following step 2-1 and the following step 2-2.

Step 2-1:

step of forming a composition layer satisfying Requirement 1 or Requirement 2 on the liquid crystal layer formed in the step 1

Requirement 1: at least a part of the above-described liquid crystal compound in the above-described composition layer is inclined and aligned with respect to the surface of the above-described composition layer.

Requirement 2: above-described liquid crystal compound is aligned such that a tilt angle of the above-described liquid crystal compound in the above-described composition layer changes consecutively along the thickness direction.

Step 2-2:

step of forming an inclined cholesteric liquid crystal layer by performing a treatment for cholesteric alignment of the above-described liquid crystal compound in the above-described composition layer The step 2-1 and the step 2-2 will be described below.

<Working Mechanism of Step 2-1>

Figure 17:
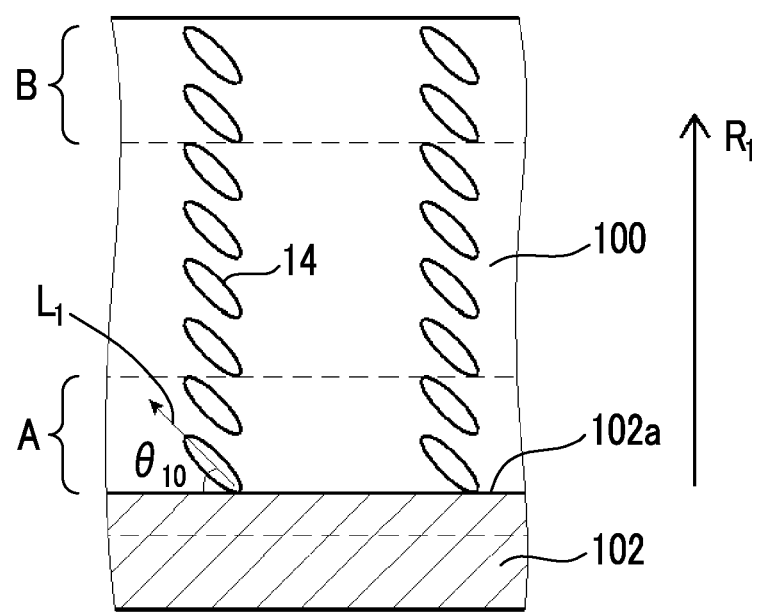
FIG. 17 is a schematic cross-sectional view for explaining an example of an embodiment of a composition layer satisfying Requirement 1 in a step 2-1.

First, FIG. 17 shows a schematic cross-sectional view of a composition layer satisfying Requirement 1 obtained in the step 2-1. A liquid crystal compound 14 shown in FIG. 17 is a rod-like liquid crystal compound.

As shown in FIG. 17, a composition layer 100 is formed on a liquid crystal layer 102 formed of the disk-like liquid crystal compound. In the surface on the side in contact with the composition layer 100, the liquid crystal layer 102 has an inclined alignment surface 102a in which the molecular axis of the disk-like liquid crystal compound is inclined with respect to the surface of the liquid crystal layer 102 (see FIG. 18).

As shown in FIG. 17, in the composition layer 100 disposed on the inclined alignment surface 102a of the liquid crystal layer 102, since the liquid crystal compound 14 is loosely aligned and restricted by the inclined alignment surface 102a, the liquid crystal compound 14 is aligned so as to be inclined with respect to the inclined alignment surface 102a. In other words, in the composition layer 100, the liquid crystal compound 14 is aligned in a certain direction (uniaxial direction) so that an angle between the molecular axis $L_1$ of the liquid crystal compound 14 and the surface of the composition layer 100 is a predetermined angle $\theta_{10}$.

In FIG. 17, an embodiment in which the liquid crystal compound 14 is aligned such that the angle between the molecular axis $L_1$ and the inclined alignment surface 102a is a predetermined angle $\theta_{10}$ over the entire area of the composition layer 100 in a thickness direction $R_1$ has been shown, but as the composition layer satisfying Requirement 1 obtained in the step 2-1, it is sufficient that a part of the liquid crystal compound 14 is inclined and aligned. It is preferable that, in at least one of a surface (corresponding to an area A in FIG. 17) on a side of inclined alignment surface 102a of the composition layer 100 or a surface (corresponding to an area B in FIG. 17) opposite to the side of inclined alignment surface 102a of the composition layer 100, the liquid crystal compound 14 is aligned such that the angle between the molecular axis $L_1$ and the surface of the composition layer 100 is the predetermined angle $\theta_{10}$, and it is more preferable that, in the surface on the side of inclined alignment surface 102a, the liquid crystal compound 14 is inclined and aligned such that the angle between the molecular axis $L_1$ and the surface of the composition layer 100 is the predetermined angle $\theta_{10}$. In a case where, in at least one of the area A or the area B, the liquid crystal compound 14 is aligned such that the angle between the molecular axis $L_1$ and the surface of the composition layer 100 is a predetermined angle $\theta_{10}$, the cholesteric alignment of the liquid crystal compound 14 in the other area can be induced due to the orientation restriction power based on the aligned liquid crystal compound 14 in the area A and/or the area B, in a case where the liquid crystal compound 14 is in a state of cholesteric liquid crystalline phase in the subsequent step 2-2.

In addition, although not shown, a composition layer satisfying Requirement 2 described above corresponds to a composition layer in which, in the composition layer 100 shown in FIG. 17, the liquid crystal compound 14 is hybrid-aligned with respect to the surface of the composition layer 100. That is, in the above description of FIG. 17, the angle $\theta_{10}$ changes consecutively in the thickness direction. Specifically, the liquid crystal compound 14 is aligned such that a tilt angle $\theta_{20}$ (angle between the molecular axis $L_1$ and the surface of the composition layer 100) thereof changes consecutively along a thickness direction $R_1$ of the composition layer 100.

As the composition layer satisfying Requirement 2 obtained in the step 2-1, it is sufficient that a part of the liquid crystal compound 14 is hybrid-aligned. It is preferable that, in at least one of a surface (corresponding to an area A in FIG. 17) on a side of inclined alignment surface 102a of the composition layer 100 or a surface (corresponding to an area B in FIG. 17) opposite to the side of inclined alignment surface 102a of the composition layer 100, the liquid crystal compound 14 is hybrid-aligned with respect to the inclined alignment surface 102a, and it is more preferable that, in the surface on the side of inclined alignment surface 102a, the liquid crystal compound 14 is hybrid-aligned with respect to the surface of the composition layer 100.

The angles $\theta_{10}$ and $\theta_{20}$ are not particularly limited as long as the angles are not 0° over the entire composition layer (in a case where the angle $\theta_{10}$ is 0° over the entire composition layer, the molecular axis $L_1$ of the liquid crystal compound 14 is parallel to the inclined alignment surface 102a in a case where the liquid crystal compound 14 is a rod-like liquid crystal compound). In other words, in some areas of the composition layer, the angles $\theta_{10}$ and $\theta_{20}$ may be 0°.

The angles $\theta_{10}$ and $\theta_{20}$ are, for example, 0° to 90°. Among these, the angles $\theta_{10}$ and $\theta_{20}$ are preferably 0° to 50°, and more preferably 0° to 10°.

From the viewpoint that reflection anisotropy of the inclined cholesteric liquid crystal layer is more excellent, the composition layer obtained in the step 2-1 is preferably a composition layer satisfying Requirement 1 or Requirement 2, and more preferably a composition layer satisfying Requirement 2.

<Working Mechanism of Step 2-2>

After obtaining, in the above-described step 2-1, the composition layer satisfying Requirement 1 or Requirement 2, in the step 2-2, the liquid crystal compound in the above-described composition layer is cholesterically aligned (in other words, the above-described liquid crystal compound is used as a cholesteric liquid crystalline phase) to form an inclined cholesteric liquid crystal layer.

Figure 18:
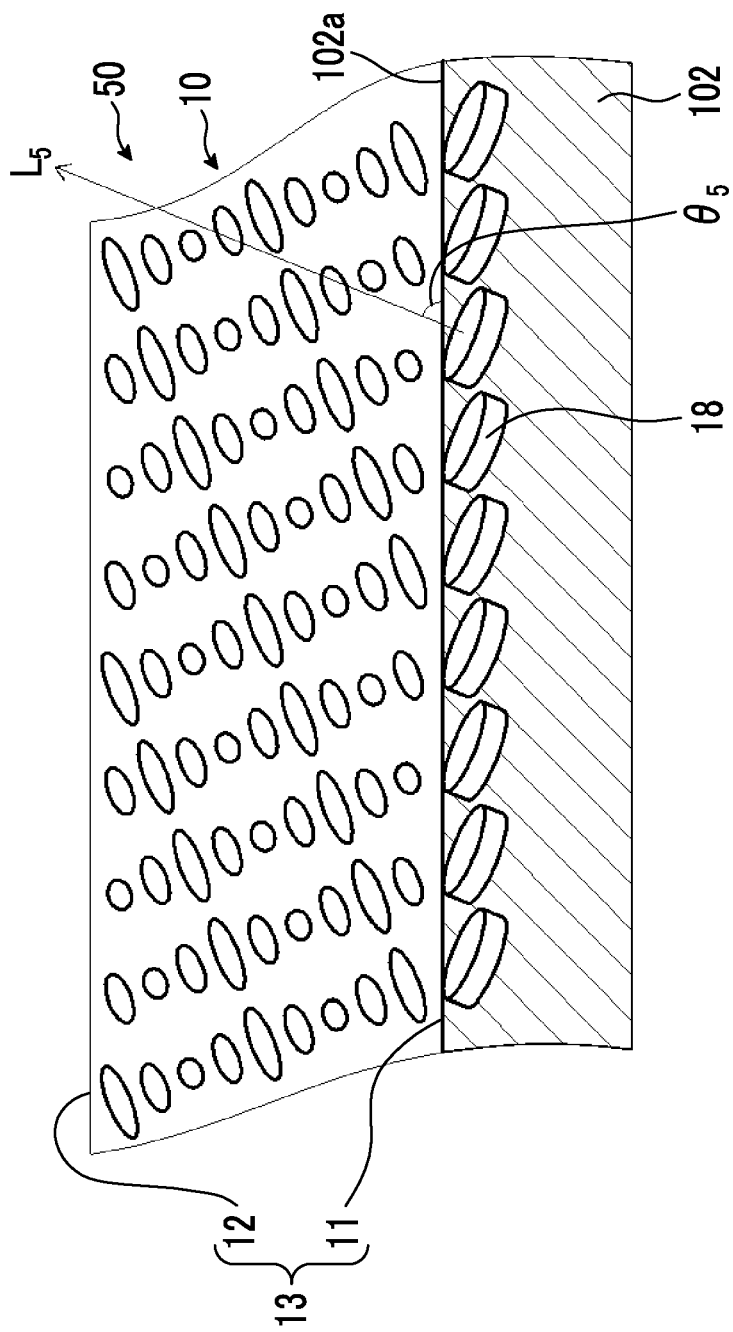
FIG. 18 is a schematic cross-sectional view of a laminate 50.

As a result, an inclined cholesteric liquid crystal layer as shown in FIG. 18 (inclined cholesteric liquid crystal layer 10 shown in FIGS. 10 and 11) is obtained.

A laminate 50 shown in FIG. 18 includes a liquid crystal layer 102 formed of a disk-like liquid crystal compound 18, and an inclined cholesteric liquid crystal layer 10 disposed so as to be in contact with the liquid crystal layer 102.

In the surface on the side in contact with the inclined cholesteric liquid crystal layer 10, the liquid crystal layer 102 has an inclined alignment surface 102a in which a molecular axis $L_5$ of the disk-like liquid crystal compound 18 is inclined with respect to the surface of the liquid crystal layer 102 (also corresponding to a main plane 11 and main plane 12 (X-Y plane) of the inclined cholesteric liquid crystal layer 10). That is, in the inclined alignment surface 102a, the disk-like liquid crystal compound 18 is aligned such that the molecular axis $L_5$ thereof is inclined with respect to the surface of the liquid crystal layer 102.

In the above-described inclined alignment surface 102a of the above-described liquid crystal layer 102, an average inclination angle $\theta_4$ (average value of angles $\theta_5$ between the surface of the above-described liquid crystal layer 102 and the disk-like liquid crystal compound 18) of the disk-like liquid crystal compound 18 with respect to the surface of the above-described liquid crystal layer 102 is, for example, preferably 20° to 90°, more preferably 20° to 80°, still more preferably 30° to 80°, and particularly preferably 30° to 65°.

In the above-described inclined alignment surface 102a of the above-described liquid crystal layer 102, the average inclination angle $\theta_4$ of the disk-like liquid crystal compound 18 with respect to the surface of the liquid crystal layer 102 can be measured by observing the cross section of the liquid crystal layer with a polarizing microscope. The above-described average inclination angle is a value obtained by measuring, in the polarizing microscope observation of the cross section of the liquid crystal layer, the angle between the molecular axis $L_5$ of the disk-like liquid crystal compound 18 and the surface of the liquid crystal layer 102 at any five or more points, and arithmetically averaging these values.

In addition, in the above-described inclined alignment surface 102a of the above-described liquid crystal layer 102, an azimuthal angle controlling ability is, for example, 0.00030 J/m² or less, preferably less than 0.00020 J/m², more preferably 0.00010 J/m² or less, and more preferably 0.00005 J/m² or less. The lower limit is not particularly limited, but is, for example, 0.00000 J/m² or more.

The azimuthal angle controlling ability in the above-described inclined alignment surface 102a of the above-described liquid crystal layer 102 can be measured by a method described in J. Appl. Phys. 1992, 33, L1242.

In FIG. 18, it is described that the helical axis of the inclined cholesteric liquid crystal layer and the molecular axis of the disk-like liquid crystal compound are inclined in opposite directions, but the inclined directions may be the same.

In addition, in the laminate 50, it is sufficient that the alignment state of the disk-like liquid crystal compound 18 is maintained in the layer, and the composition in the layer no longer needs to exhibit liquid crystallinity at last.

The inclined cholesteric liquid crystal layer 10 is as described above.

<Working Mechanism of Liquid Crystal Composition>

As described above, as one method for achieving the above-described method for manufacturing the inclined cholesteric liquid crystal layer, the present inventors have found a method of using a liquid crystal composition including a chiral agent X in which helical twisting power (HTP) changes due to irradiation with light or including a chiral agent Y in which the helical twisting power changes due to change in temperature. In the following, the working mechanism of a liquid crystal composition including a chiral agent X and the working mechanism of a liquid crystal composition including a chiral agent Y will be described in detail.

The helical twisting power (HTP) of the chiral agent is a factor indicating a helical alignment ability represented by Expression (1A).

$$HTP[\mu m^{-1}]=1/(\text{length (unit: }\mu m\text{) of helical pitch} \times \text{concentration (mass \%) of chiral agent in liquid crystal composition}) \quad \text{Expression (1A)}$$

The length of the helical pitch refers to a length of a pitch P (=helical period) of the helical structure of the cholesteric liquid crystalline phase, and can be measured by a method described in page 196 of Liquid Crystal Handbook (published by Maruzen Publishing Co., Ltd.).

The above-described HTP value is affected not only by the type of the chiral agent, but also by the type of the liquid crystal compound included in the composition. Therefore, for example, in a case where a composition including a predetermined chiral agent X and a liquid crystal compound A and a composition including a predetermined chiral agent X and a liquid crystal compound B different from the liquid crystal compound A are prepared, and HTP of both compositions are measured at the same temperature, the values thereof may differ.

The helical twisting power (HTP) of the chiral agent is also expressed by Expression (1B).

$$HTP[\mu m^{-1}] = (\text{average refractive index of liquid crystal compound})/\{(\text{concentration (mass \%) of chiral agent in liquid crystal composition}) \times (\text{center reflection wavelength } (nm))\} \quad \text{Expression (1B)}$$

In a case where the liquid crystal composition includes two or more kinds of chiral agents, the "concentration of chiral agent in liquid crystal composition" in Expressions (1A) and (1B) corresponds to the total concentration of all chiral agents.

(Working Mechanism of Liquid Crystal Composition Including Chiral Agent X)

In the following, a method for forming an inclined cholesteric liquid crystal layer using a liquid crystal composition including a chiral agent X will be described.

In a case of forming an inclined cholesteric liquid crystal layer using a liquid crystal composition including a chiral agent X, after forming, in the step 2-1, the composition layer satisfying Requirement 1 or Requirement 2, in the step 2-2, the liquid crystal compound in the above-described composition layer is cholesterically aligned by performing a light irradiation treatment on the above-described composition layer. That is, in the above-described step 2-2, by changing the helical twisting power of the chiral agent X in the composition layer by a light irradiation treatment, the liquid crystal compound in the composition layer is cholesterically aligned.

Here, in a case where the liquid crystal compound in the composition layer is aligned to be a cholesteric liquid crystalline phase, it is considered that the helical twisting power inducing the helix of the liquid crystal compound generally corresponds to the weighted-average helical twisting power of chiral agents included in the composition layer. For example, in a case where two types of chiral agents (chiral agent A and chiral agent B) are used in combination, the "weighted-average helical twisting power" is expressed by Expression (1C).

$$\text{Weighted-average helical twisting power } (\mu m^{-1}) = \\ (\text{helical twisting power } (\mu m^{-1}) \text{ of chiral agent } A \times \text{concentration (mass \%) of chiral agent } A \text{ in liquid crystal composition} + \text{helical twisting power } (\mu m^{-1}) \text{ of chiral agent } B \times \text{concentration (mass \%) of chiral agent } B \text{ in liquid crystal composition})/(\text{concentration (mass \%) of chiral agent } A \text{ in liquid crystal composition} + \text{concentration (mass \%) of chiral agent } B \text{ in liquid crystal composition}) \quad \text{Expression (1C)}$$

In Expression (1C), in a case where the helical direction of the chiral agent is right-handed, the helical twisting power thereof is a positive value. In addition, in a case where the helical direction of the chiral agent is left-handed, the helical twisting power thereof is a negative value. That is, for example, in a case of a chiral agent having a helical twisting power of 10 $\mu m^{-1}$, the helical twisting power is expressed as 10 $\mu m^{-1}$ in a case where the helical direction of the helix induced by the chiral agent is right-handed. On the other hand, the helical twisting power is expressed as $-10$ $\mu m^{-1}$ in a case where the helical direction of the helix induced by the chiral agent is left-handed.

The weighted-average helical twisting power ($\mu m^{-1}$) obtained by Expression (1C) can also be calculated from Expression (1A) and Expression (1B) described above.

Hereinafter, a weighted-average helical twisting power, for example, in a case where the composition layer includes a chiral agent A and chiral agent B having the following characteristics will be described.

Figure 19:
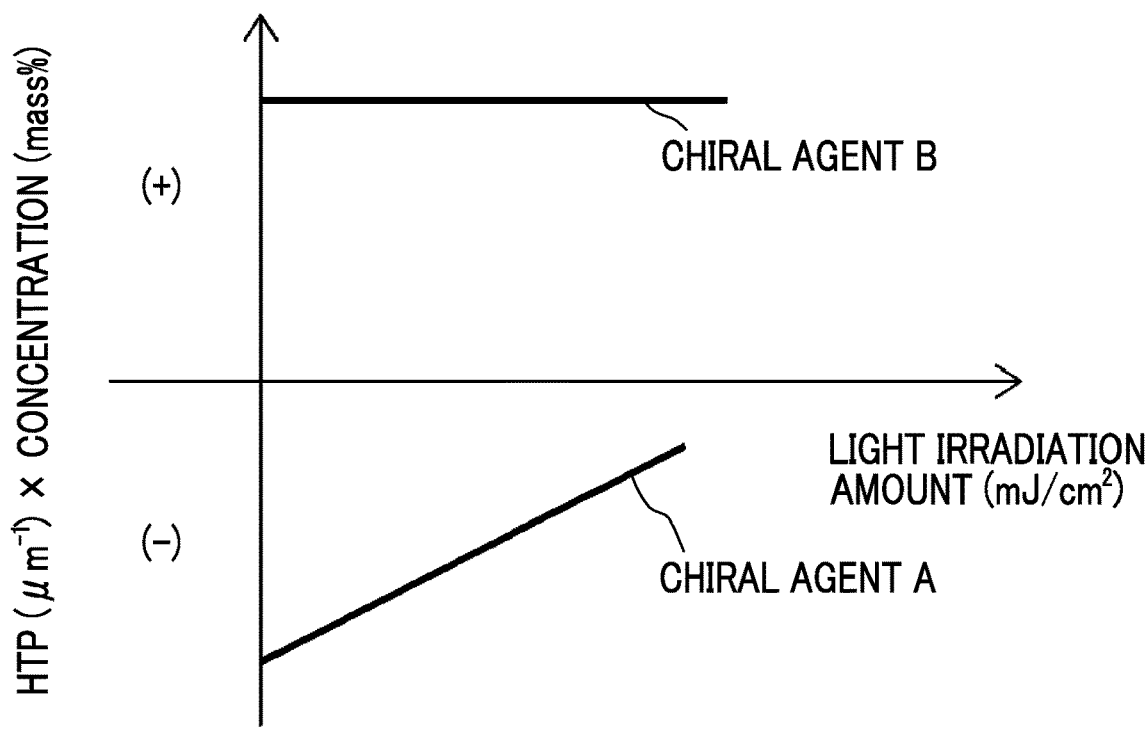
FIG. 19 is a schematic diagram of a graph plotting a relationship between helical twisting power (HTP) ($\mu m^{-1}$)× concentration (mass %) and light irradiation amount (mJ/cm$^2$) in each of a chiral agent A and a chiral agent B.

As shown in FIG. 19, the above-described chiral agent A is the chiral agent X, and is a chiral agent which has a left-handed (−) helical twisting power and reduces helical twisting power due to irradiation with light.

In addition, as shown in FIG. 19, the above-described chiral agent B is a chiral agent which has a right-handed (+) helical twisting power, which is opposite direction to the chiral agent A, and in which the helical twisting power does not change due to irradiation with light. Here, the "helical twisting power ($\mu m^{-1}$) of chiral agent A×concentration (mass %) of chiral agent A" and "helical twisting power ($m^{-1}$) of chiral agent B×concentration (mass %) of chiral agent B" in a case of non-light irradiation is assumed to be equal. In the "helical twisting power ($\mu m^{-1}$) of chiral agent× concentration (mass %) of chiral agent" of the vertical axis in FIG. 19, as the value thereof is farther from 0, the helical twisting power is greater.

Figure 20:
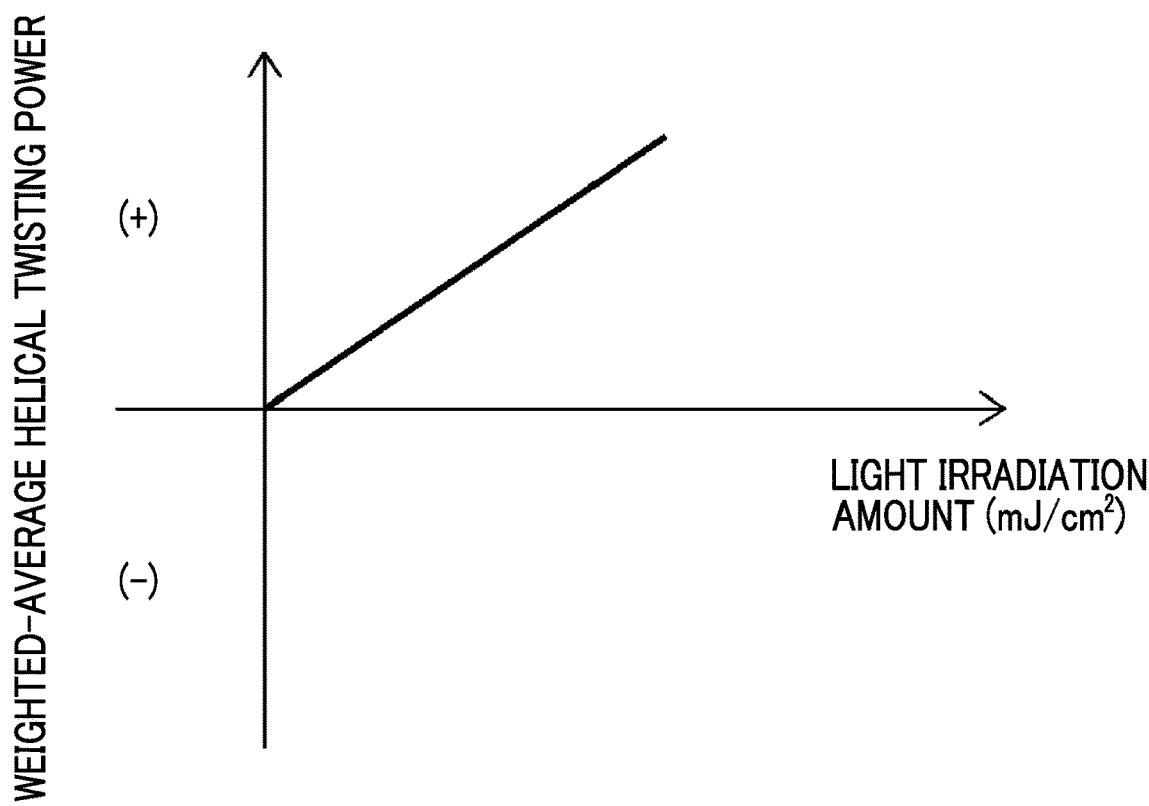
FIG. 20 is a schematic diagram of a graph plotting a relationship between weighted-average helical twisting power ($\mu m^{-1}$) and light irradiation amount (mJ/cm$^2$) in a system in which the chiral agent A and the chiral agent B are used in combination.

In a case where the composition layer includes the above-described chiral agent A and chiral agent B, the helical twisting power inducing the helix of the liquid crystal compound corresponds to the weighted-average helical twisting power of the chiral agent A and the chiral agent B. As a result, in a system in which the above-described chiral agent A and the above-described chiral agent B are used in combination, as shown in FIG. 20, it is considered that, in the helical twisting power inducing the helix of the liquid crystal compound, as the amount of light irradiated is larger, the helical twisting power increases in the direction (+) of the helix induced by the chiral agent B (corresponding to the chiral agent Y).

In the method for manufacturing the inclined cholesteric liquid crystal layer according to the present embodiment, the absolute value of the weighted-average helical twisting power of chiral agents in the composition layer formed by the step 2-1 is not particularly limited, but from the viewpoint that the composition layer is easily formed, for example, preferably 0.0 to 1.9 $\mu m^{-1}$, more preferably 0.0 to 1.5 $\mu m^{-1}$, still more preferably 0.0 to 0.5 $\mu m^{-1}$, and most preferably 0 (see FIG. 19). On the other hand, in a case of the light irradiation treatment in the step 2-2, the absolute value of the weighted-average helical twisting power of chiral agents in the composition layer is not particularly limited as long as the liquid crystal compound can be cholesterically aligned, but for example, the absolute value thereof is preferably 10.0 $\mu m^{-1}$ or more, more preferably 10.0 to 200.0 $\mu m^{-1}$, and still more preferably 20.0 to 200.0 $\mu m^{-1}$.

That is, in a case where the helical twisting power of the chiral agent X in the composition layer in the step 2-1 is offset to approximately 0, the liquid crystal compound in the composition layer can be aligned to be inclined alignment or hybrid alignment. Next, by changing the helical twisting power of chiral agents X due to the light irradiation treatment in the step 2-2 so as to increase the weighted-average helical twisting power of chiral agents in the composition layer in either the right direction (+) or left direction (−), an inclined cholesteric liquid crystal layer (for example, the inclined cholesteric liquid crystal layer 10) is obtained.

(Working Mechanism of Liquid Crystal Composition Including Chiral Agent Y)

Next, a method for forming an inclined cholesteric liquid crystal layer using a liquid crystal composition including a chiral agent Y will be described.

In a case of forming an inclined cholesteric liquid crystal layer using a liquid crystal composition including a chiral agent Y, after forming, in the step 2-1, the composition layer satisfying Requirement 1 or Requirement 2, in the step 2-2, the liquid crystal compound in the above-described composition layer is cholesterically aligned by performing a cooling treatment or a heating treatment on the above-described composition layer. That is, in the above-described step 2-2, by changing the helical twisting power of the chiral agent Y in the composition layer by a cooling treatment or a heating treatment, the liquid crystal compound in the composition layer is cholesterically aligned.

As described above, in a case where the liquid crystal compound in the composition layer is aligned to be a cholesteric liquid crystalline phase, it is considered that the helical twisting power inducing the helix of the liquid crystal compound generally corresponds to the weighted-average helical twisting power of chiral agents included in the composition layer. The "weighted-average helical twisting power" is as described above.

Hereinafter, the working mechanism of the chiral agent Y will be described, taking as an example an embodiment in which, in the step 2-2, the liquid crystal compound of the above-described composition layer is cholesterically aligned by performing a cooling treatment.

First, in the following, a weighted-average helical twisting power, for example, in a case where the composition layer includes a chiral agent A and chiral agent B having the following characteristics will be described.

Figure 21:
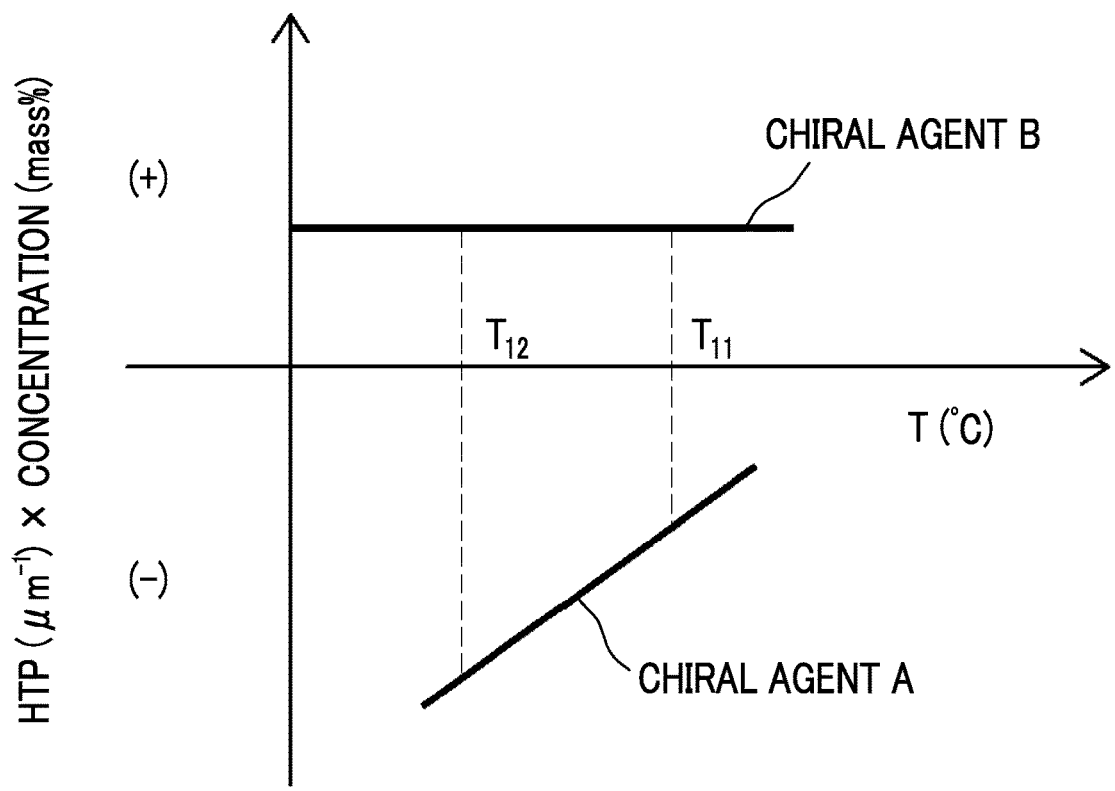
FIG. 21 is a schematic diagram of a graph plotting a relationship between HTP ($\mu m^{-1}$)×concentration (mass %) and temperature (C) in each of the chiral agent A and the chiral agent B.

As shown in FIG. 21, the above-described chiral agent A corresponds to the chiral agent Y, and is a chiral agent that has a left-handed (−) helical twisting power in a temperature $T_{11}$ at which the alignment treatment of the liquid crystal compound is performed for forming the composition layer satisfying Requirement 1 or Requirement 2 in the step 1, and a temperature $T_{12}$ at which the cooling treatment of the step 2-2 is performed, and increases helical twisting power to the left direction (−) in the lower temperature region. In addition, as shown in FIG. 21, the above-described chiral agent B is a chiral agent which has a right-handed (+) helical twisting power, which is opposite direction to the chiral agent A, and in which the helical twisting power does not change due to change in temperature. Here, the "helical twisting power ($\mu m^{-1}$) of chiral agent A×concentration (mass %) of chiral agent A" and "helical twisting power ($\mu m^{-1}$) of chiral agent B×concentration (mass %) of chiral agent B" in a case of the temperature $T_{11}$ is assumed to be equal.

In a case where the composition layer includes the above-described chiral agent A and chiral agent B, the helical twisting power inducing the helix of the liquid crystal compound corresponds to the weighted-average helical twisting power of the chiral agent A and the chiral agent B. As a result, in a system in which the above-described chiral agent A and the above-described chiral agent B are used in combination, as shown in FIG. 22, it is considered that, in the helical twisting power inducing the helix of the liquid crystal compound, the helical twisting power increases, in the lower temperature region, in the direction (−) of the helix induced by the chiral agent A (corresponding to the chiral agent Y).

In the method for manufacturing the inclined cholesteric liquid crystal layer according to the present embodiment, the absolute value of the weighted-average helical twisting power of chiral agents in the composition layer is not particularly limited, but from the viewpoint that the composition layer is easily formed in a case of forming the composition layer satisfying Requirement 1 or Requirement 2 in the step 2-1 (that is, in the present embodiment, at the temperature $T_{11}$ at which the alignment treatment of the liquid crystal compound is performed for forming the composition layer satisfying Requirement 1 or Requirement 2), for example, preferably 0.0 to 1.9 $\mu m^{-1}$, more preferably 0.0 to 1.5 $\mu m^{-1}$, still more preferably 0.0 to 0.5 $\mu m^{-1}$, and most preferably 0.

Figure 22:
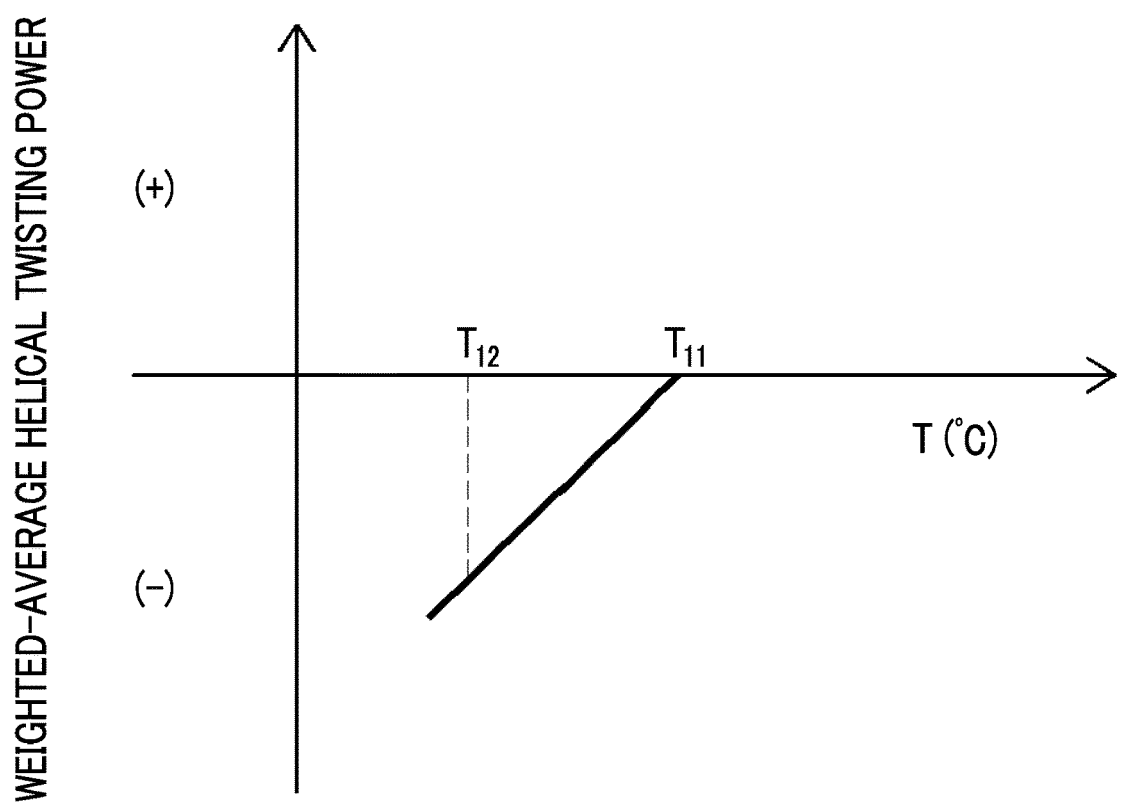
FIG. 22 is a schematic diagram of a graph plotting a relationship between weighted-average helical twisting power ($\mu m^{-1}$) and temperature (° C.) in a system in which the chiral agent A and the chiral agent B are used in combination.

On the other hand, in a case of the temperature $T_{12}$ at which the cooling treatment of the step 2-2 is performed, the absolute value of the weighted-average helical twisting power of chiral agents in the composition layer is not particularly limited as long as the liquid crystal compound can be cholesterically aligned, but the absolute value thereof is preferably 10.0 $\mu m^{-1}$ or more, more preferably 10.0 to 200.0 $\mu m^{-1}$, and still more preferably 20.0 to 200.0 $\mu m^{-1}$ (see FIG. 22).

That is, since the helical twisting power of the chiral agent Y at the temperature $T_{11}$ is offset to approximately 0, the liquid crystal compound can be aligned to be inclined alignment or hybrid alignment. Next, by increasing the helical twisting power of the chiral agent Y due to the cooling treatment or heating treatment (change in temperature to the temperature $T_{12}$) in the step 2-2 so as to increase the weighted-average helical twisting power of chiral agents in the composition layer in either the right direction (+) or left direction (−), an inclined cholesteric liquid crystal layer (for example, the inclined cholesteric liquid crystal layer 10) is obtained.

<Procedure of Step 2>

Hereinafter, the procedure of the step 2 will be described in detail. In the following, an aspect of using a liquid crystal composition including the chiral agent X and an aspect of using a liquid crystal composition including the chiral agent Y will be respectively described in detail.

(Aspect of Using Liquid Crystal Composition Including Chiral Agent X)

Hereinafter, the procedure of the step 2 (hereinafter, also referred to as a "step 2x") of using a liquid crystal composition including the chiral agent X will be described.

The step 2X has at least the following steps 2X-1 and 2X-2.

Step 2X-1: step of forming a composition layer satisfying Requirement 1 or Requirement 2 on the liquid crystal layer using a liquid crystal composition including the chiral agent X and a liquid crystal compound Step 2X-2: step of forming an inclined cholesteric liquid crystal layer by performing a light irradiation treatment to the above-described composition layer so as to cholesterically align the above-described liquid crystal compound in the above-described composition layer Requirement 1: at least a part of the above-described liquid crystal compound in the above-described composition layer is inclined and aligned with respect to the surface of the above-described composition layer.

Requirement 2: above-described liquid crystal compound is aligned such that a tilt angle of the above-described liquid crystal compound in the above-described composition layer changes consecutively along the thickness direction.

In addition, in a case where the liquid crystal compound has a polymerizable group, in the step 2X, it is preferable that a curing treatment is performed on the composition layer as described later.

Hereinafter, the materials used in each step, and the procedure of each step will be described in detail.

<<Step 2X-1>>

Step 2X-1 is a step of forming a composition layer satisfying Requirement 1 or Requirement 2 on the liquid crystal layer using a liquid crystal composition (hereinafter, also referred to as a "composition X") including the chiral agent X and a liquid crystal compound.

In the following, the composition X will be described in detail, and then the procedure of the step will be described in detail.

<<<<Composition X>>>>

The composition X includes a liquid crystal compound and a chiral agent X in which the helical twisting power changes due to irradiation with light. Hereinafter, each component will be described.

As described above, from the viewpoint that the composition layer is easily formed, the absolute value of the weighted-average helical twisting power of chiral agents in the composition layer obtained by the step 2X-1 is preferably 0.0 to 1.9 $\mu m^{-1}$, more preferably 0.0 to 1.5 $\mu m^{-1}$, still more preferably 0.0 to 0.5 $\mu m^{-1}$, and most preferably 0. Therefore, in a case where the chiral agent X has a helical twisting power exceeding the above-described predetermined range in a state of non-light irradiation treatment, it is preferable that the composition X includes a chiral agent (hereinafter, also referred to as a "chiral agent XA") which induces a helix in the opposite direction to the chiral agent X, so that the helical twisting power of the chiral agent X is offset to approximately 0 in the step 2X-1 (that is, the weighted-average helical twisting power of chiral agents in the composition layer obtained in the step 2X-1 is within the above-described predetermined range). The chiral agent XA is preferably a compound which does not change the helical twisting power due to the light irradiation treatment.

In addition, in a case where the liquid crystal composition includes, as the chiral agent, a plurality of kinds of chiral agents X, and where the weighted-average helical twisting power of the plurality of kinds of chiral agents X in the state of non-light irradiation treatment has a helical twisting power outside the above-described predetermined range, the "other chiral agents XA which induce a helix in the opposite direction to the chiral agent X" are intended to be a chiral agent which induces a helix in the opposite direction to the weighted-average helical twisting power of the above-described plurality of kinds of chiral agents X.

In a case where the chiral agent X alone does not have the helical twisting power in the state of non-light irradiation treatment and has a property of increasing the helical twisting power due to irradiation with light, the chiral agent XA may not be used in combination.

Liquid Crystal Compound

The type of the liquid crystal compound is not particularly limited.

In general, the types of the liquid crystal compound are classified into a rod-shaped type (rod-like liquid crystal compound) and a disk-shaped type (discotic liquid crystal compound, disk-like liquid crystal compound) from the shapes thereof. Furthermore, the rod-shaped type and the disk-shaped type include a low molecular type and a high molecular type. A high molecule generally refers to a molecule having a polymerization degree of 100 or more (Masao Doi; Polymer Physics-Phase Transition Dynamics, 1992, IWANAMI SHOTEN, PUBLISHERS, page 2). In the present invention, any liquid crystal compound can be used. In addition, two or more kinds of liquid crystal compounds may be used in combination.

The liquid crystal compound may have a polymerizable group. The type of the polymerizable group is not particularly limited, and the polymerizable group is preferably a functional group capable of an addition polymerization reaction and more preferably a polymerizable ethylenically unsaturated group or a ring polymerizable group. More specifically, as the polymerizable group, a (meth)acryloyl group, a vinyl group, a styryl group, an allyl group, an epoxy group, or an oxetane group is preferable, and a (meth)acryloyl group is more preferable.

As the liquid crystal compound, a liquid crystal compound represented by Formula (I) is suitably used.

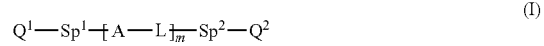

(I)

In the formula,

A represents a phenylene group which may have a substituent or a trans-1,4-cyclohexylene group which may have a substituent, in which at least one of A represents a trans-1,4-cyclohexylene group which may have a substituent, L represents a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=N—N=CH—, —CH=CH—, —C≡C—, —NHC(=O)—, —C(=O)NH—, —CH=N—, —N=CH—, —CH=CH—C(=O)O—, and —OC(=O)—CH=CH—, m represents an integer of 3 to 12, Sp$^1$ and Sp$^2$ each independently represent a single bond or a linking group selected from the group consisting of a linear or branched alkylene group having 1 to 20 carbon atoms and a group of a linear or branched alkylene group having 1 to 20 carbon atoms, in which one or two or more of —CH$_2$— are replaced with —O—, —S—, —NH—, —N(CH$_3$)—, —C(=O)—, —OC(=O)—, or —C(=O)O—, and Q$^1$ and Q$^2$ each independently represent a hydrogen atom or a polymerizable group selected from the group consisting of groups represented by Formulae (Q-1) to (Q-5), in which any one of Q$^1$ or Q$^2$ represents a polymerizable group.

(Q-1)

(Q-2)

(Q-3)

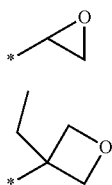
(Q-4)

(Q-5)

A is a phenylene group which may have a substituent or a trans-1,4-cyclohexylene group which may have a substituent. In the present specification, the phenylene group is preferably a 1,4-phenylene group.

At least one of A is a trans-1,4-cyclohexylene group which may have a substituent.

m A's may be the same or different from each other.

m represents an integer of 3 to 12, and is preferably an integer of 3 to 9, more preferably an integer of 3 to 7, and still more preferably an integer of 3 to 5.

In Formula (I), the substituent which may be included in the phenylene group or the trans-1,4-cyclohexylene group is not particularly limited, and examples thereof include an alkyl group, a cycloalkyl group, an alkoxy group, an alkylether group, an amide group, an amino group, a halogen atom, and a substituent selected from the group consisting of groups composed of a combination of two or more of these substituents. In addition, examples of the above-described substituent include a substituent represented by —C(=O)—$X^3$-$Sp^3$-$Q^3$ described later. The phenylene group and trans-1,4-cyclohexylene group may have 1 to 4 substituents. In a case of having two or more substituents, the two or more substituents may be the same or different from each other.

In the present specification, the alkyl group may be linear or branched. The number of carbon atoms in the alkyl group is preferably 1 to 30, more preferably 1 to 10, and still more preferably 1 to 6. Examples of the alkyl group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a 1,1-dimethylpropyl group, an n-hexyl group, an isohexyl group, a heptyl group, an octyl group, a nonyl group, a decyl group, an undecyl group, and a dodecyl group. The description of an alkyl group in the alkoxy group is the same as the above description of the alkyl group. In addition, in the present specification, specific examples of the alkylene group in a case of being referred to as an alkylene group include a divalent group obtained by removing one arbitrary hydrogen atom from each of the alkyl group exemplified. Examples of the halogen atom include a fluorine atom, a chlorine atom, a bromine atom, and an iodine atom.

In the present specification, the number of carbon atoms in the cycloalkyl group is preferably 3 or more and more preferably 5 or more, and is preferably 20 or less, more preferably 10 or less, still more preferably 8 or less, and particularly preferably 6 or less. Examples of the cycloalkyl group include a cyclopropyl group, a cyclobutyl group, a cyclopentyl group, a cyclohexyl group, a cycloheptyl group, and a cyclooctyl group.

As the substituent which may be included in the phenylene group or the trans-1,4-cyclohexylene group, an alkyl group, an alkoxy group, or a substituent selected from the group consisting of —C(=O)—$X^3$-$Sp^3$-$Q^3$ is preferable. Here, $X^3$ represents a single bond, —O—, —S—, —N($Sp^4$-$Q^4$)-, or a nitrogen atom forming a ring structure with $Q^3$ and $Sp^3$. $Sp^3$ and $Sp^4$ each independently represent a single bond or a linking group selected from the group consisting of a linear or branched alkylene group having 1 to 20 carbon atoms and a group of a linear or branched alkylene group having 1 to 20 carbon atoms, in which one or two or more of —$CH_2$— are replaced with —O—, —S—, —NH—, —N($CH_3$)—, —C(=O)—, —OC(=O)—, or —C(=O)O—.

$Q^3$ and $Q^4$ each independently represent a hydrogen atom, a cycloalkyl group, a cycloalkyl group in which one or two or more of —$CH_2$— are replaced with —O—, —S—, —NH—, —N($CH_3$)—, —C(=O)—, —OC(=O)—, or —C(=O)O—, or any polymerizable group selected from the group consisting of the groups represented by Formulae (Q-1) to (Q-5).

Specific examples of the cycloalkyl group in which one or two or more of —$CH_2$— are replaced with —O—, —S—, —NH—, —N($CH_3$)—, —C(=O)—, —OC(=O)—, or —C(=O)O— include a tetrahydrofuranyl group, a pyrrolidinyl group, an imidazolidinyl group, a pyrazolidinyl group, a piperidyl group, a piperazinyl group, and a morphornyl group. Among these, a tetrahydrofuranyl group is preferable, and a 2-tetrahydrofuranyl group is more preferable.

In Formula (I), L represents a single bond or a linking group selected from the group consisting of —$CH_2$O—, —O$CH_2$—, —($CH_2$)$_2$OC(=O)—, —C(=O)O($CH_2$)$_2$—, —C(=O)O—, —OC(=O)—, —OC(=O)O—, —CH=CH—C(=O)O—, and —OC(=O)—CH=CH—. L is preferably —C(=O)O— or —OC(=O)—. m L's may be the same or different from each other.

$Sp^1$ and $Sp^2$ each independently represent a single bond or a linking group selected from the group consisting of a linear or branched alkylene group having 1 to 20 carbon atoms and a group of a linear or branched alkylene group having 1 to 20 carbon atoms, in which one or two or more of —$CH_2$— are replaced with —O—, —S—, —NH—, —N($CH_3$)—, —C(=O)—, —OC(=O)—, or —C(=O)O—. It is preferable that $Sp^1$ and $Sp^2$ are each independently a linear alkylene group having 1 to 10 carbon atoms, in which linking groups selected from the group consisting of —O—, —OC(=O)—, and —C(=O)O— are respectively bonded to both terminals, —OC(=O)—, —C(=O)O—, —O—, and a linking group composed of one or a combination of two or more groups selected from the group consisting of linear alkylene groups having 1 to 10 carbon atoms, and it is more preferable that $Sp^1$ and $Sp^2$ are each independently a linear alkylene group having 1 to 10 carbon atoms, in which —O—'s are respectively bonded to both terminals.

$Q^1$ and $Q^2$ each independently represent a hydrogen atom or a polymerizable group selected from the group consisting of groups represented by Formulae (Q-1) to (Q-5). However, any one of $Q^1$ or $Q^2$ represents a polymerizable group.

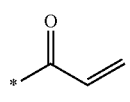
(Q-1)

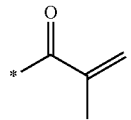
(Q-2)

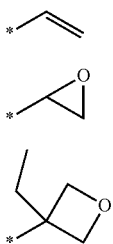

(Q-3)

(Q-4)

(Q-5)

As the polymerizable group, an acryloyl group (Formula (Q-1)) or a methacryloyl group (Formula (Q-2)) is preferable.

Specific examples of the above-described liquid crystal compound include a liquid crystal compound represented by Formula (I-11), a liquid crystal compound represented by Formula (I-21), and a liquid crystal compound represented by Formula (I-31). In addition to the above, examples thereof include known compounds such as a compound represented by Formula (I) described in JP2013-112631A, a compound represented by Formula (I) described in JP2010-070543A, a compound represented by Formula (I) described in JP2008-291218A, a compound represented by Formula (I) described in JP4725516B, a compound represented by General Formula (II) described in JP2013-087109A, a compound described in paragraph 0043 of JP2007-176927A, a compound represented by Formula (I-1) described in JP2009-286885A, a compound represented by General Formula (I) described in WO2014/010325A, a compound represented by Formula (1) described in JP2016-081035A, and compounds represented by Formula (2-1) and Formula (2-2) described in JP2016-121339A.

Liquid crystal compound represented by Formula (I-11)

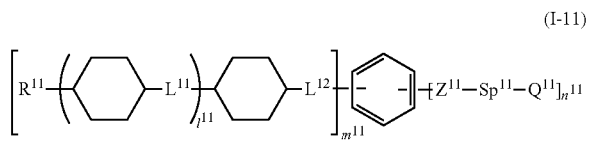

(I-11)

In the formula, $R^{11}$ represents a hydrogen atom, a linear or branched alkyl group having 1 to 12 carbon atoms, or $-Z^1-Sp^2-Q^2$, $L^{11}$ represents a single bond, $-C(=O)O-$, or $-OC(=O)-$, $L^{12}$ represents $-C(=O)O-$, $-OC(=O)-$, or $-CONR^2-$, $R^2$ represents a hydrogen atom or an alkyl group having 1 to 3 carbon atoms, $Z^{11}$ and $Z^{12}$ each independently represent a single bond, $-O-$, $-NH-$, $-N(CH_3)-$, $-S-$, $-C(=O)O-$, $-OC(=O)-$, $-OC(=O)O-$, or $-C(=O)NR^{12}-$, $R^{12}$ represents a hydrogen atom or $Sp^{12}-Q^{12}$, $Sp^{11}$ and $Sp^{12}$ each independently represent a single bond, a linear or branched alkylene group which has 1 to 12 carbon atoms and may be substituted with $Q^{11}$, or a linking group of a linear or branched alkylene group which has 1 to 12 carbon atoms and may be substituted with $Q^{11}$, in which any one or more of $-CH_2-$ is replaced with $-O-$, $-S-$, $-NH-$, $-N(Q^{11})-$, or $-C(=O)-$, $Q^{11}$ represents a hydrogen atom, a cycloalkyl group, a cycloalkyl group in which one or two or more of $-CH_2-$ are replaced with $-O-$, $-S-$, $-NH-$, $-N(CH_3)-$, $-C(=O)-$, $-OC(=O)-$, or $-C(=O)O-$, or a polymerizable group selected from the group consisting of the groups represented by Formulae (Q-1) to (Q-5), $Q^{12}$ represents a hydrogen atom or a polymerizable group selected from the group consisting of the groups represented by Formulae (Q-1) to (Q-5), $l^{11}$ represents an integer of 0 to 2, $m^{11}$ represents an integer of 1 or 2, $n^{11}$ represents an integer of 1 to 3, and a plurality of $R^{11}$'s, a plurality of $L^{11}$'s, a plurality of $L^2$'s, a plurality of $l^{11}$'s, a plurality of $Z^{11}$'s, a plurality of $Sp^{11}$'s, and a plurality of $Q^{11}$'s may be respectively the same or different from each other.

In addition, the liquid crystal compound represented by Formula (I-11) includes, as $R^{11}$, at least one $-Z^{12}-Sp^{12}-Q^{12}$ in which $Q^{12}$ is a polymerizable group selected from the group consisting of the groups represented by Formulae (Q-1) to (Q-5).

In addition, the liquid crystal compound represented by Formula (I-11) preferably has $-Z^{11}-Sp^{11}-Q^{11}$ in which $Z^{11}$ is $-C(=O)O-$ or $C(=O)NR^2-$ and $Q^{11}$ is a polymerizable group selected from the group consisting of the groups represented by Formulae (Q-1) to (Q-5). In addition, the liquid crystal compound represented by Formula (I-11) preferably includes, as $R^{11}$, $-Z^2-Sp^{12}-Q^2$ in which $Z^{12}$ is $-C(=O)O-$ or $C(=O)NR^{12}-$, and $Q^{12}$ is a polymerizable group selected from the group consisting of the groups represented by Formulae (Q-1) to (Q-5).

The 1,4-cyclohexylene groups included in the liquid crystal compound represented by Formula (I-11) are all trans-1,4-cyclohexylene groups.

Examples of a suitable aspect of the liquid crystal compound represented by Formula (I-11) include a compound in which $L^{11}$ is a single bond, $l^{11}$ is 1 (dicyclohexyl group), and Q is a polymerizable group selected from the group consisting of the groups represented by Formulae (Q-1) to (Q-5).

Examples of another suitable aspect of the liquid crystal compound represented by Formula (I-11) include a compound in which $m^{11}$ is 2, $l^{11}$ is 0, both $R^{11}$'s represent $-Z^{12}-Sp^{12}-Q^2$, and $Q^{12}$ is a polymerizable group selected from the group consisting of the groups represented by Formulae (Q-1) to (Q-5).

Liquid crystal compound represented by Formula (I-21)

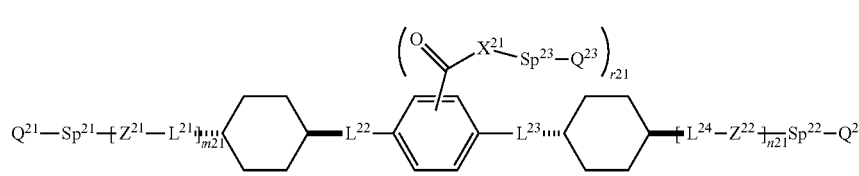

(I-21)

In the formula, $Z^{21}$ and $Z^{22}$ each independently represent a trans-1,4-cyclohexylene group which may have a substituent or a phenylene group which may have a substituent, all of the above-described substituents are each independently 1 to 4 substituents selected from the group consisting of —CO—$X^{21}$-$Sp^{23}$-$Q^{23}$, an alkyl group, and an alkoxy group, m21 represents an integer of 1 or 2 and n21 represents an integer of 0 or 1, in a case where m21 represents 2, n21 represents 0, in a case where m21 represents 2, two $Z^{21}$'s may be the same or different from each other, at least one of $Z^{21}$ or $Z^{22}$ is a phenylene group which may have a substituent, $L^{21}$, $L^{22}$, $L^{23}$, and $L^{24}$ each independently represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, $X^{21}$ represents —O—, —S—, —N(Sp$^{25}$-Q$^{25}$)-, or a nitrogen atom forming a ring structure with $Q^{23}$ and $Sp^{23}$, r21 represents an integer of 1 to 4, $Sp^{21}$, $Sp^{22}$, $Sp^{23}$, and $Sp^{25}$ each independently represent a single bond or a linking group selected from the group consisting of a linear or branched alkylene group having 1 to 20 carbon atoms and a group of a linear or branched alkylene group having 1 to 20 carbon atoms, in which one or two or more of —CH$_2$— are replaced with —O—, —S—, —NH—, —N(CH$_3$)—, —C(=O)—, —OC(=O)—, or —C(=O)O—, $Q^2$ and $Q^{22}$ each independently represent any polymerizable group selected from the group consisting of groups represented by Formulae (Q-1) to (Q-5), $Q^{23}$ represents a hydrogen atom, a cycloalkyl group, a cycloalkyl group in which one or two or more of —CH$_2$— are replaced with —O—, —S—, —NH—, —N(CH$_3$)—, —C(=O)—, —OC(=O)—, or —C(=O)O—, any polymerizable group selected from the group consisting of the groups represented by Formulae (Q-1) to (Q-5), or a single bond in a case where $X^2$ is a nitrogen atom forming a ring structure with $Q^{23}$ and $Sp^{23}$, and $Q^{25}$ represents a hydrogen atom, a cycloalkyl group, a cycloalkyl group in which one or two or more of —CH$_2$— are replaced with —O—, —S—, —NH—, —N(CH$_3$)—, —C(=O)—, —OC(=O)—, or —C(=O)O—, or any polymerizable group selected from the group consisting of the groups represented by Formulae (Q-1) to (Q-5), in which, in a case where $Sp^{25}$ is a single bond, $Q^{25}$ is not a hydrogen atom.

The liquid crystal compound represented by Formula (I-21) is also preferably a structure in which 1,4-phenylene groups and trans-1,4-cyclohexylene groups are present alternately, and preferred examples thereof include a structure in which m21 is 2, n21 is 0, and $Z^{21}$'s are respectively, from the $Q^{21}$ side, a trans-1,4-cyclohexylene group which may have a substituent and an arylene group which may have a substituent, and a structure in which m21 is 1, n21 is 1, $Z^{21}$ is an arylene group which may have a substituent, and $Z^{22}$ is an arylene group which may have a substituent.

Liquid crystal compound represented by Formula (I-31);

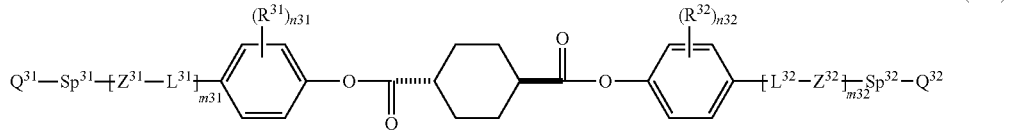

(I-31)

In the formula, $R^{31}$ and $R^{32}$ each independently represent an alkyl group, an alkoxy group, or a group selected from the group consisting of —C(=O)—$X^{31}$-$Sp^{33}$-$Q^{33}$, n31 and n32 each independently represent an integer of 0 to 4, $X^3$ represents a single bond, —O—, —S—, —N(Sp$^{34}$-Q$^{34}$)-, or a nitrogen atom forming a ring structure with $Q^{33}$ and $Sp^{33}$, $Z^{31}$ represents a phenylene group which may have a substituent, $Z^{32}$ represents a trans-1,4-cyclohexylene group which may have a substituent or a phenylene group which may have a substituent, all of the above-described substituents are each independently 1 to 4 substituents selected from the group consisting of an alkyl group, an alkoxy group, and —C(=O)—$X^{31}$-$Sp^{33}$-$Q^{33}$, m31 represents an integer of 1 or 2 and m32 represents an integer of 0 to 2, in a case where m31 and m32 represent 2, two $Z^{31}$'s and two $Z^{32}$'s may be respectively the same or different from each other, $L^{31}$ and $L^{32}$ each independently represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, $Sp^{31}$, $Sp^{32}$, $Sp^{33}$, and $Sp^{34}$ each independently represent a single bond or a linking group selected from the group consisting of a linear or branched alkylene group having 1 to 20 carbon atoms and a group of a linear or branched alkylene group having 1 to 20 carbon atoms, in which one or two or more of —CH$_2$— are replaced with —O—, —S—, —NH—, —N(CH$_3$)—, —C(=O)—, —OC(=O)—, or —C(=O)O—, $Q^{31}$ and $Q^{32}$ each independently represent any polymerizable group selected from the group consisting of groups represented by Formulae (Q-1) to (Q-5), and $Q^{33}$ and $Q^{34}$ each independently represent a hydrogen atom, a cycloalkyl group, a cycloalkyl group in which one or two or more of —CH$_2$— are replaced with —O—, —S—, —NH—, —N(CH$_3$)—, —C(=O)—, —OC(=O)—, or —C(=O)O—, or any polymerizable group selected from the group consisting of the groups represented by Formulae (Q-1) to (Q-5), in which, in a case where $Q^{33}$ forms a ring structure with $X^3$ and $Sp^{33}$, $Q^{33}$ may represent a single bond, and in a case where $Sp^{34}$ is a single bond, $Q^{34}$ is not a hydrogen atom.

Examples of a particularly preferred compound as the liquid crystal compound represented by Formula (I-31) include a compound in which $Z^{32}$ is a phenylene group, and a compound in which m32 is 0.

The compound represented by Formula (I) also preferably has a partial structure represented by Formula (II).

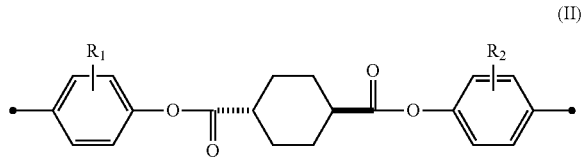
(II)

In Formula (II), a black circle represents a bonding position to other parts of Formula (I). It is sufficient that the partial structure represented by Formula (II) is included as a part of a partial structure represented by Formula (III) in Formula (I).

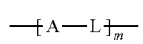
(III)

In the formula, $R^1$ and $R^2$ each independently represent a hydrogen atom, an alkyl group, an alkoxy group, or a group selected from the group consisting of groups represented by —C(=O)—$X^3$-$Sp^3$-$Q^3$. Here, $X^3$ represents a single bond, —O—, —S—, —N($Sp^4$-$Q^4$)-, or a nitrogen atom forming a ring structure with $Q^3$ and $Sp^3$. $X^3$ is preferably a single bond or O—. $R^1$ and $R^2$ are preferably —C(=O)—$X^3$-$Sp^3$-$Q^3$. In addition, it is preferable that $R^1$ and $R^2$ are the same as each other. The bonding position of $R^1$ and $R^2$ to each phenylene group is not particularly limited.

$Sp^3$ and $Sp^4$ each independently represent a single bond or a linking group selected from the group consisting of a linear or branched alkylene group having 1 to 20 carbon atoms and a group of a linear or branched alkylene group having 1 to 20 carbon atoms, in which one or two or more of —CH$_2$— are replaced with —O—, —S—, —NH—, —N(CH$_3$)—, —C(=O)—, —OC(=O)—, or —C(=O)O—. $Sp^3$ and $Sp^4$ are each independently preferably a linear or branched alkylene group having 1 to 10 carbon atoms, more preferably a linear alkylene group having 1 to 5 carbon atoms, and still more preferably a linear alkylene group having 1 to 3 carbon atoms.

$Q^3$ and $Q^4$ each independently represent a hydrogen atom, a cycloalkyl group, a cycloalkyl group in which one or two or more of —CH$_2$— are replaced with —O—, —S—, —NH—, —N(CH$_3$)—, —C(=O)—, —OC(=O)—, or —C(=O)O—, or any polymerizable group selected from the group consisting of the groups represented by Formulae (Q-1) to (Q-5).

The compound represented by Formula (I) also preferably has, for example, a structure represented by Formula (II-2).

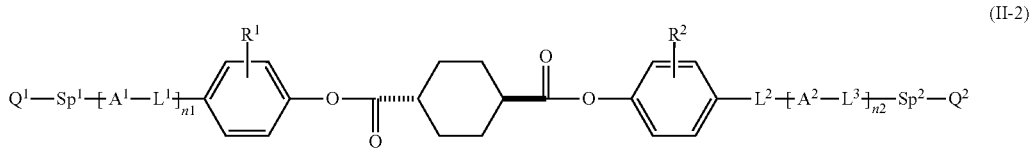
(II-2)

In the formula, $A^1$ and $A^2$ each independently represent a phenylene group which may have a substituent or a trans-1,4-cyclohexylene group which may have a substituent, in which all of the substituents are each independently 1 to 4 substituents selected from the group consisting of an alkyl group, an alkoxy group, and —C(=O)—$X^3$-$Sp^3$-$Q^3$, $L^1$, $L^2$, and $L^3$ represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, and n1 and n2 each independently represent an integer of 0 to 9, and n1+n2 is 9 or less.

The definitions of $Q^1$, $Q^2$, $Sp^1$, and $Sp^2$ are the same as the definitions of each group in Formula (I) described above. The definitions of $X^3$, $Sp^3$, $Q^3$, $R^1$, and $R^2$ have the same meanings as the definitions of each group in Formula (II) described above.

As the liquid crystal compound used in the present invention, a compound represented by Formula (IV) and described in JP2014-198814A, particularly a polymerizable liquid crystal compound represented by Formula (IV) in which one (meth)acrylate group is included, is also suitably used.

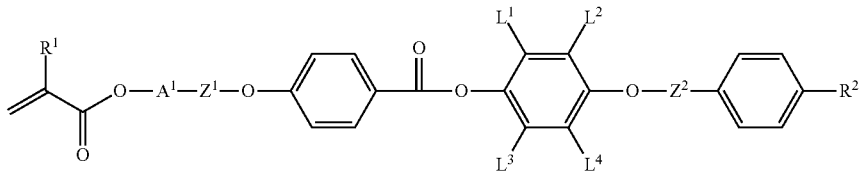
Formula (IV)

In Formula (IV), $A^1$ represents an alkylene group having 2 to 18 carbon atoms, where, in the alkylene group, one $CH_2$ or two or more $CH_2$'s which are not adjacent to each other may be replaced with —O—, $Z^1$ represents —C(=O)—, —O—C(=O)—, or a single bond, $Z^2$ represents —C(=O)— or C(=O)—CH=CH—, $R^1$ represents a hydrogen atom or a methyl group, $R^2$ represents a hydrogen atom, a halogen atom, a linear alkyl group having 1 to 4 carbon atoms, a methoxy group, an ethoxy group, a phenyl group which may have a substituent, a vinyl group, a formyl group, a nitro group, a cyano group, an acetyl group, an acetoxy group, an N-acetylamide group, an acryloylamino group, an N,N-dimethylamino group, a maleimide group, a methacryloylamino group, an allyloxy group, an allyloxycarbamoyl group, an N-alkyloxycarbamoyl group in which the alkyl group has 1 to 4 carbon atoms, an N-(2-methacryloyloxyethyl) carbamoyloxy group, an N-(2-acryloyloxyethyl) carbamoyloxy group, or a structure represented by Formula (IV-2), and $L^1$, $L^2$, $L^3$, and $L^4$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, in which at least one of $L^1$, $L^2$, $L^3$, or $L^4$ represents a group other than the hydrogen atom.

—$Z^5$-T-Sp-P     Formula (IV-2)

In Formula (IV-2), P represents an acryloyl group, a methacryloyl group, or a hydrogen atom, $Z^5$ represents a single bond, —C(=O)O—, —OC(=O)—, —C(=O)NR$^1$— ($R^1$ represents a hydrogen atom or a methyl group), —NR$^1$C(=O)—, —C(=O)S—, or —SC(=O)—, T represents 1,4-phenylene group, and Sp represents a divalent aliphatic group having 1 to 12 carbon atoms, which may have a substituent, where, in the aliphatic group, one $CH_2$ or two or more $CH_2$'s which are not adjacent to each other may be replaced with —O—, —S—, —OC(=O)—, —C(=O)O—, or OC(=O)O—.

The compound represented by Formula (IV) is preferably a compound represented by Formula (V).

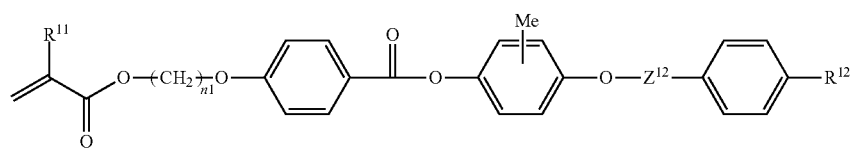

Formula (V)

In Formula (V), n1 represents an integer of 3 to 6, $R^{11}$ represents a hydrogen atom or a methyl group, $Z^{12}$ represents —C(=O)— or C(=O)—CH=CH—, and $R^{12}$ represents a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3).

—$Z^{51}$-T-Sp-P     Formula (IV-3)

In Formula (IV-3), P represents an acryloyl group or a methacryloyl group, $Z^5$ represents —C(=O)O— or —OC(=O)—, T represents 1,4-phenylene group, and Sp represents a divalent aliphatic group having 2 to 6 carbon atoms, which may have a substituent. In the aliphatic group, one $CH_2$ or two or more $CH_2$'s which are not adjacent to each other may be replaced with —O—, —OC(=O)—, —C(=O)O—, or OC(=O)O—.

n1 represents an integer of 3 to 6, and is preferably 3 or 4.

$Z^{12}$ represents —C(=O)— or C(=O)—CH=CH—, and preferably represents —C(=O)—.

$R^{12}$ represents a hydrogen atom, a linear alkyl group having 1 to 4 carbon atoms, a methoxy group, an ethoxy group, a phenyl group, an acryloylamino group, a methacryloylamino group, an allyloxy group, or the structure represented by Formula (IV-3), and preferably represents a methyl group, an ethyl group, a propyl group, a methoxy group, an ethoxy group, a phenyl group, and acryloylamino group, a methacryloylamino group, or the structure represented by Formula (IV-3), more preferably represents a methyl group, an ethyl group, a methoxy group, an ethoxy group, a phenyl group, an acryloylamino group, a methacryloylamino group, or the structure represented by Formula (IV-3).

As the liquid crystal compound used in the present invention, a compound represented by Formula (VI) and described in JP2014-198814A, particularly a liquid crystal compound represented by Formula (VI), which does not have a (meth)acrylate group, is also suitably used.

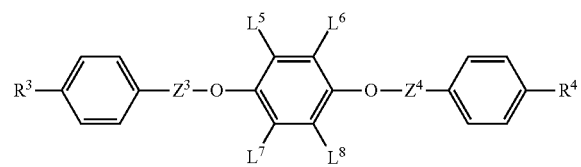

Formula (VI)

In Formula (VI), $Z^3$ represents —C(=O)— or CH=CH—C(=O)—, $Z^4$ represents —C(=O)— or C(=O)—CH=CH—, $R^3$ and $R^4$ each independently represent a hydrogen atom, a halogen atom, a linear alkyl group having 1 to 4 carbon atoms, a methoxy group, an ethoxy group, an aromatic ring which may have a substituent, a cyclohexyl group, a vinyl group, a formyl group, a nitro group, a cyano group, an acetyl group, an acetoxy group, an acryloylamino group, an N,N-dimethylamino group, a maleimide group, a methacryloylamino group, an allyloxy group, an allyloxycarbamoyl group, an N-alkyloxycarbamoyl group in which the alkyl group has 1 to 4 carbon atoms, an N-(2-methacryloyloxyethyl) carbamoyloxy group, an N-(2-acryloyloxyethyl) carbamoyloxy group, or a structure represented by Formula (VI-2), and $L^5$, $L^6$, $L^7$, and $L^8$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, in which at least one of $L^5$, $L^6$, $L^7$, or $L^8$ represents a group other than the hydrogen atom.

—$Z^5$-T-Sp-P      Formula (VI-2)

In Formula (VI-2), P represents an acryloyl group, a methacryloyl group, or a hydrogen atom, $Z^5$ represents —C(=O)O—, —OC(=O)—, —C(=O)NR$^1$— (R$^1$ represents a hydrogen atom or a methyl group), —NRC(=O)—, —C(=O)S—, or SC(=O)—, T represents 1,4-phenylene group, and Sp represents a divalent aliphatic group having 1 to 12 carbon atoms, which may have a substituent. However, in the aliphatic group, one CH$_2$ or two or more CH$_2$'s which are not adjacent to each other may be replaced with —O—, —S—, —OC(=O)—, —C(=O)O—, or OC(=O)O—.

The compound represented by Formula (VI) is preferably a compound represented by Formula (VII).

Formula (VII)

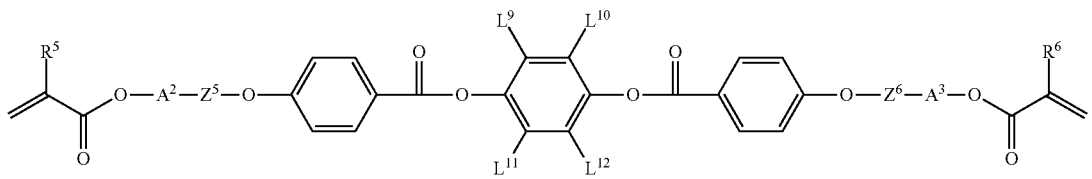

In Formula (VII), $Z^{13}$ represents —C(=O)— or C(=O)—CH=CH—, $Z^{14}$ represents —C(=O)— or CH=CH—C(=O)—, R$^{13}$ and R$^{14}$ each independently represent a hydrogen atom, a linear alkyl group having 1 to 4 carbon atoms, a methoxy group, an ethoxy group, a phenyl group, an acryloylamino group, methacryloylamino group, an allyloxy group, or the structure represented by Formula (IV-3) described above.

$Z^{13}$ represents —C(=O)— or C(=O)—CH=CH—, and is preferably —C(=O)—.

group, a phenyl group, and acryloylamino group, a methacryloylamino group, or the structure represented by Formula (IV-3) described above, more preferably represents a methyl group, an ethyl group, a methoxy group, an ethoxy group, a phenyl group, an acryloylamino group, a methacryloylamino group, or the structure represented by Formula (IV-3) described above.

As the liquid crystal compound used in the present invention, a compound represented by Formula (VIII) and described in JP2014-198814A, particularly a polymerizable liquid crystal compound represented by Formula (VIII) in which two (meth)acrylate groups are included, is also suitably used.

Formula (VIII)

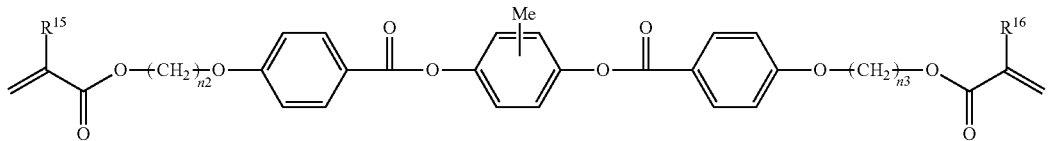

In Formula (VIII), A$^2$ and A$^3$ each independently represent an alkylene group having 2 to 18 carbon atoms, where, in the alkylene group, one CH$_2$ or two or more CH$_2$'s which are not adjacent to each other may be replaced with —O—, $Z^5$ represents —C(=O)—, —OC(=O)—, or a single bond, $Z^6$ represents —C(=O)—, —C(=O)O—, or a single bond, R$^5$ and R$^6$ each independently represent a hydrogen atom or a methyl group, and L$^9$, L$^{10}$, L$^{11}$, and L$^{12}$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, in which at least one of L$^9$, L$^{10}$, L$^1$, or L$^{12}$ represents a group other than the hydrogen atom.

The compound represented by Formula (VIII) is preferably a compound represented by Formula (IX).

Formula (IX)

R$^{13}$ and R$^{14}$ each independently represent a hydrogen atom, a linear alkyl group having 1 to 4 carbon atoms, a methoxy group, an ethoxy group, a phenyl group, an acryloylamino group, a methacryloylamino group, an allyloxy group, or the structure represented by Formula (IV-3) described above, and preferably represents a methyl group, an ethyl group, a propyl group, a methoxy group, an ethoxy In Formula (IX), n2 and n3 each independently represent an integer of 3 to 6, and R$^{15}$ and R$^{16}$ each independently represent a hydrogen atom or a methyl group.

In Formula (IX), n2 and n3 each independently represent an integer of 3 to 6, and are preferably 4.

In Formula (IX), R$^{15}$ and R$^{16}$ each independently represent a hydrogen atom or a methyl group, preferably represent a hydrogen atom.

These liquid crystal compounds can be produced by a known method.

In order to obtain the composition layer satisfying Requirement 1 or Requirement 2 described above, it is preferable to use a liquid crystal compound having a large pretilt angle at the interface.

Chiral Agent X in which Helical Twisting Power Changes Due to Irradiation with Light The chiral agent X is a compound which induces the helix of the liquid crystal compound, and is not particularly limited as long as it is a chiral agent in which the helical twisting power (HTP) changes due to irradiation with light.

In addition, the chiral agent X may be liquid crystalline or non-liquid crystalline. In general, the chiral agent X includes an asymmetric carbon atom. However, an axially asymmetric compound or a surface asymmetric compound not having the asymmetric carbon atom can also be used as the chiral agent X. The chiral agent X may include a polymerizable group.

Examples of the chiral agent X include so-called photoreactive chiral agents. The photoreactive chiral agent is a compound which has a chiral site and has a photoreactive site in which structure changes due to irradiation with light, and for example, which greatly changes the twisting power of the liquid crystal compound according to the amount of light irradiated.

Examples of the photoreactive site in which structure changes due to irradiation with light include photochromic compounds (Kingo Uchida and Masahiro Irie, Chemical Industry, vol. 64, p. 640, 1999, and Kingo Uchida and Masahiro Irie, Fine Chemical, vol. 28(9), p. 15, 1999). In addition, the above-described structural change means decomposition, addition reaction, isomerization, dimerization reaction, and the like, which are caused by irradiation of the photoreactive site with light, and the structural change may be irreversible. In addition, the chiral site corresponds to, for example, the asymmetric carbon described in Hiroyuki Nohira, Chemical Review, No. 22, Chemistry of Liquid Crystals, p. 73, 1994.

Examples of the above-described photoreactive chiral agent include photoreactive chiral agents described in paragraphs 0044 to 0047 of JP2001-159709A, optically active compounds described in paragraphs 0019 to 0043 of JP2002-179669A, optically active compounds described in paragraphs 0020 to 0044 of JP2002-179633A, optically active compounds described in paragraphs 0016 to 0040 of JP2002-179670A, optically active compounds described in paragraphs 0017 to 0050 of JP2002-179668A, optically active compounds described in paragraphs 0018 to 0044 of JP2002-180051A, optically active compounds described in paragraphs 0016 to 0055 of JP2002-338575A, and optically active compounds described in paragraphs 0020 to 0049 of JP2002-179682A.

Among these, the chiral agent X is preferably a compound having at least one photoisomerization site. As the above-described photoisomerization site, from the viewpoint that absorption of visible light is small, photoisomerization is likely to occur, and difference in helical twisting power before and after irradiation with light is large, a cinnamoyl site, a chalcone site, an azobenzene site, a stilbene site, or a coumarin site is preferable, and a cinnamoyl site or a chalcone site is more preferable. The photoisomerization site corresponds to the above-described photoreactive site in which structure changes due to irradiation with light.

In addition, from the viewpoint that the difference in helical twisting power before and after irradiation with light is large, the chiral agent X is preferably an isosorbide-based optically active compound, an isomannide-based optically active compound, or a binaphthol-based optically active compound. That is, the chiral agent X preferably has, as the above-described chiral site, an isosorbide skeleton, an isomannide skeleton, or a binaphthol skeleton. Among these, from the viewpoint that the difference in helical twisting power before and after irradiation with light is larger, as the chiral agent X, an isosorbide-based optically active compound or a binaphthol-based optically active compound is more preferable, and an isosorbide-based optically active compound is still more preferable.

The helical pitch of the cholesteric liquid crystalline phase largely depends on the type of the chiral agent X and the concentration thereof added, a desired pitch can be obtained by adjusting these.

The chiral agent X may be used alone or in combination of a plurality of kinds thereof.

The total content of chiral agents in the composition X (total content of all chiral agents in the composition X) is preferably 2.0 mass % or more and more preferably 3.0 mass % or more with respect to the total mass of the liquid crystal compound. In addition, from the viewpoint of suppressing haze of the inclined cholesteric liquid crystal layer, the upper limit of the total content of chiral agents in the composition X is preferably 15.0 mass % or less and more preferably 12.0 mass % or less with respect to the total mass of the liquid crystal compound.

Arbitrary Component

The composition X may include other components in addition to the liquid crystal compound and the chiral agent X.

Chiral Agent XA

The chiral agent XA is a compound which induces the helix of the liquid crystal compound, and is preferably a chiral agent in which the helical twisting power (HTP) does not change due to irradiation with light.

In addition, the chiral agent XA may be liquid crystalline or non-liquid crystalline. In general, the chiral agent XA includes an asymmetric carbon atom. However, an axially asymmetric compound or a surface asymmetric compound not having the asymmetric carbon atom can also be used as the chiral agent XA. The chiral agent XA may include a polymerizable group.

As the chiral agent XA, a known chiral agent can be used.

In a case where the liquid crystal composition includes the chiral agent X alone, and a case where the chiral agent X has a helical twisting power exceeding a predetermined range (for example, 0.0 to 1.9 $\mu m^{-1}$) in the state of non-light irradiation treatment, the chiral agent XA is preferably a chiral agent which induces a helix in the opposite orientation to the above-described chiral agent X. That is, for example, in a case where the helix induced by the chiral agent X is right-handed, the helix induced by the chiral agent XA is left-handed.

In addition, in a case where the liquid crystal composition includes a plurality of kinds of chiral agents X as the chiral agent, and a case where the weighted-average helical twisting power thereof in the state of non-light irradiation treatment exceeds the above-described predetermined range, the chiral agent XA is preferably a chiral agent which induces a helix in the opposite direction to the weighted-average helical twisting power.

Polymerization Initiator

The composition X may include a polymerization initiator. In particular, in a case where the liquid crystal compound has a polymerizable group, it is preferable that the composition X includes a polymerization initiator.

Examples of the polymerization initiator include the same polymerization initiators which can be included in the liquid crystal layer. The polymerization initiator which can be included in the liquid crystal layer is as described above.

The content (in a case where a plurality of kinds of polymerization initiators are included, the total content thereof) of the polymerization initiator in the composition X is not particularly limited, but is preferably 0.1 to 20 mass % and more preferably 1.0 to 8.0 mass % with respect to the total mass of the liquid crystal compound.

Surfactant

The composition X may include a surfactant which can be unevenly distributed on the surface of the composition layer on the inclined alignment surface 102a side and/or the surface of the composition layer opposite to the inclined alignment surface 102a.

In a case where the composition X includes a surfactant, it is easy to obtain a composition layer satisfying Requirement 1 or Requirement 2 described above, and it is possible to form a cholesteric liquid crystalline phase stably or rapidly.

Examples of the surfactant include the same surfactants which can be included in the liquid crystal layer. The surfactant which can be included in the liquid crystal layer is as described above.

Among these, the composition X preferably includes a surfactant (for example, onium salt compounds (described in JP2012-208397A)) capable of controlling, in the composition layer formed in the step 2X-1, the inclination angle (see FIG. 16) of the molecular axis $L_1$ of the liquid crystal compound 14 with respect to the inclined alignment surface 102a in the surface on the inclined alignment surface 102a side, or a surfactant (for example, a polymer having a perfluoroalkyl group in the side chain) capable of controlling the inclination angle (see FIG. 16) of the molecular axis $L_1$ of the liquid crystal compound 14 with respect to the inclined alignment surface 102a in the surface opposite to the inclined alignment surface 102a side. In addition, in a case where the composition X includes the above-described surfactant, the obtained inclined cholesteric liquid crystal layer also has the advantage of low haze.

The surfactant may be used alone or in combination of two or more kinds thereof.

The content (in a case where a plurality of kinds of surfactants are included, the total content thereof) of the surfactant in the composition X is not particularly limited, but is preferably 0.01 to 10 mass %, more preferably 0.01 to 5.0 mass %, and still more preferably 0.01 to 2.0 mass % with respect to the total mass of the liquid crystal compound.

Solvent

The composition X may include a solvent.

Examples of the solvent include the same solvents which can be included in the liquid crystal layer. The solvent which can be included in the liquid crystal layer is as described above.

Other Additives

The composition X may include other additives such as one or two or more kinds of antioxidants, ultraviolet absorbers, sensitizers, stabilizers, plasticizers, chain transfer agents, polymerization inhibitors, anti-foaming agents, leveling agents, thickeners, flame retardants, surface active substances, dispersants, and colorants such as a dye and a pigment.

It is preferable that one or more of the compounds constituting the composition X are compounds (polyfunctional compounds) having a plurality of polymerizable groups. Furthermore, in the composition X, it is preferable that the total content of compounds having a plurality of polymerizable groups is 80 mass % or more with respect to the total solid content of the composition X. The above-described solid content includes component forming the inclined cholesteric liquid crystal layer, and does not include the solvent.

In a case where 80 mass % or more of the total solid content of the composition X is a compound having a plurality of polymerizable groups, durability can be imparted by firmly immobilizing the structure of the cholesteric liquid crystalline phase, which is preferable.

The compound having a plurality of polymerizable groups is a compound having two or more immobilizable groups in one molecule. In the present invention, the polyfunctional compound included in the composition X may have liquid crystallinity or may not have liquid crystallinity.

<<<<Procedure of Step 2X-1>>>>

The step 2X-1 preferably has the following step 2X-1-1 and the following step 2X-1-2.

Step 2X-1-1: step of forming a coating film on the above-described liquid crystal layer by bringing the composition X into contact with the above-described liquid crystal layer Step 2X-1-2: step of forming a composition layer satisfying Requirement 1 or Requirement 2 described above by heating the above-described coating film Step 2X-1-1: Coating Film Forming Step In the step 2X-1-1, first, the above-described composition X is applied to the liquid crystal layer. The coating method is not particularly limited, and examples thereof include a wire bar coating method, an extrusion coating method, a direct gravure coating method, a reverse gravure coating method, and a die-coating method. Prior to the application of the composition X, the above-described liquid crystal layer may be subjected to a known rubbing treatment.

After the application of the composition X, a treatment of drying the coating film applied to the above-described liquid crystal layer may be performed as necessary. By performing the drying treatment, the solvent can be removed from the coating film.

The thickness of the coating film is not particularly limited, but from the viewpoint that reflection anisotropy and haze of the inclined cholesteric liquid crystal layer is better, is preferably 0.1 to 20 µm, more preferably 0.2 to 15 µm, and still more preferably 0.5 to 10 µm.

Step 2X-1-2: Composition Layer Forming Step

From the viewpoint of manufacturing suitability, the liquid crystal phase transition temperature of the composition X is preferably in a range of 10° C. to 250° C. and more preferably in a range of 10 to 150° C.

As a preferred heating condition, it is preferable to heat the composition layer at 40° C. to 100° C. (preferably 60° C. to 100° C.) for 0.5 to 5 minutes (preferably 0.5 to 2 minutes).

In a case of heating the composition layer, it is preferable that the composition layer is not heated to a temperature at which the liquid crystal compound exhibits an isotropic phase (Iso). In a case where the composition layer is heated to higher than a temperature at which the liquid crystal compound exhibits an isotropic phase, defects in the inclined and aligned liquid crystal phase or the hybrid-aligned liquid crystal phase increase, which is not preferable.

By the above-described step 2X-1-2, a composition layer satisfying Requirement 1 or Requirement 2 described above is obtained.

In order to incline and align, or hybrid-align the liquid crystal compound, it is effective to give a pretilt angle to the interface, and specific examples thereof include the following methods.

(1) alignment control agent is added in the composition X to control the alignment of the liquid crystal compound by being unevenly distributed at the air interface and/or the liquid crystal layer interface.

(2) as a liquid crystal compound, a liquid crystalline compound having a large pretilt angle at the interface is added in the composition X.

<<Step 2X-2>>

Step 2X-2 is a step of forming an inclined cholesteric liquid crystal layer by performing a light irradiation treatment to the composition layer obtained in the step 2X-1 so as to change the helical twisting power of the chiral agent X and to cholesterically align the liquid crystal compound in the composition layer.

By dividing the light irradiation area into a plurality of domains and adjusting the amount of light irradiated for each domain, areas having different helical pitches (areas having different selective reflection wavelengths) can be further formed.

The irradiation intensity of light irradiation in the step 2X-2 is not particularly limited, and can be appropriately determined based on the helical twisting power of the chiral agent X. In general, the irradiation intensity of light irradiation in the step 2X-2 is preferably approximately 0.1 to 200 mW/cm$^2$. In addition, the time for irradiation with light is not particularly limited, but may be appropriately determined from the viewpoint of both the sufficient strength and productivity of the layer to be obtained.

In addition, the temperature of the composition layer in a case of light irradiation is, for example, 0° to 100° C., preferably 10° C. to 60° C.

The light used for light irradiation is not particularly limited as long as it is an actinic ray or radiation, which changes the helical twisting power of the chiral agent X, and means, for example, a bright line spectrum of a mercury lamp, far ultraviolet rays typified by an excimer laser, extreme ultraviolet rays (EUV light), X-rays, ultraviolet rays, electron beam (EB), and the like. Among these, ultraviolet rays are preferable.

Here, in the method for manufacturing the inclined cholesteric liquid crystal layer described above, in a case where the composition layer is exposed to the wind, the surface of the inclined cholesteric liquid crystal layer to be formed may be uneven. In consideration of this point, in all steps of the step 2X in the method for manufacturing the inclined cholesteric liquid crystal layer described above, it is preferable that the wind speed of the environment to which the composition layer is exposed is low. Specifically, in all steps of the step 2X in the method for manufacturing the inclined cholesteric liquid crystal layer described above, the wind speed of the environment to which the composition layer is preferably exposed is 1 m/s or less.

<<Curing Treatment>>

In a case where the liquid crystal compound has a polymerizable group, it is preferable that a curing treatment is performed on the composition layer. Examples of the procedure for subjecting the composition layer to the curing treatment include (1) and (2) shown below.

(1) in a case of the step 2X-2, a curing treatment is performed to immobilize the cholesteric alignment state, so as to form an inclined cholesteric liquid crystal layer in which the cholesteric alignment state is immobilized (that is, the curing treatment is performed at the step 2X-2), or (2) after the step 2X-2, a step 3X is further included by performing a curing treatment to immobilize the cholesteric alignment state, so as to form an inclined cholesteric liquid crystal layer in which the cholesteric alignment state is immobilized.

That is, the inclined cholesteric liquid crystal layer obtained by performing the curing treatment corresponds to a layer obtained by immobilizing the cholesteric liquid crystalline phase.

Here, in the state of the "immobilized" cholesteric liquid crystalline phase, a state in which the alignment of the liquid crystal compound as the cholesteric liquid crystalline phase is maintained is the most typical and preferred aspect. The state is not limited thereto, and specifically, it means that, in a temperature range of usually 0° C. to 50° C. and under more severe conditions in a temperature range of −30° C. to 70° C., a state in which the layer has no fluidity and the immobilized alignment form can be maintained stably without causing a change in alignment form due to an external field or an external force. In the present invention, as described later, it is preferable to immobilize the alignment state of the cholesteric liquid crystalline phase by a curing reaction which proceeds by irradiation with ultraviolet rays.

In the layer obtained by immobilizing the cholesteric liquid crystalline phase, it is sufficient that the optical properties of the cholesteric liquid crystalline phase are retained in the layer, and the composition in the layer no longer needs to exhibit liquid crystallinity at last.

The method of the curing treatment is not particularly limited, and examples thereof include photo-curing treatment and thermosetting treatment. Among these, a light irradiation treatment is preferable and an ultraviolet irradiation treatment is more preferable. In addition, as described above, it is preferable that the liquid crystal compound is a liquid crystal compound having a polymerizable group. In a case where the liquid crystal compound has a polymerizable group, the curing treatment is preferably a polymerization reaction by light irradiation (particularly ultraviolet irradiation), and more preferably a radical polymerization reaction by light irradiation (particularly ultraviolet irradiation).

A light source such as an ultraviolet lamp is used for the ultraviolet irradiation.

The irradiation energy amount of the ultraviolet rays is not particularly limited, but generally, is preferably approximately 100 to 800 mJ/cm$^2$. The time for irradiation with ultraviolet rays is not particularly limited, but may be appropriately determined from the viewpoint of both the sufficient strength and productivity of the layer to be obtained.

(Aspect of Using Liquid Crystal Composition Including Chiral Agent Y)

Hereinafter, the method (hereinafter, also referred to as a "step 2Y") for manufacturing the inclined cholesteric liquid crystal layer using a liquid crystal composition including the chiral agent Y will be described.

The manufacturing method 2Y has at least the following steps 2Y-1 and 2Y-2.

Step 2Y-1: step of forming a composition layer satisfying Requirement 1 or Requirement 2 on the above-described liquid crystal layer using a liquid crystal composition including the chiral agent Y and a liquid crystal compound Step 2Y-2: step of forming an inclined cholesteric liquid crystal layer by performing a cooling treatment or a heating treatment to the above-described composition layer so as to cholesterically align the above-described liquid crystal compound in the above-described composition layer Requirement 1: at least a part of the above-described liquid crystal compound in the above-described composition layer is inclined and aligned with respect to the surface of the above-described composition layer.

Requirement 2: above-described liquid crystal compound is aligned such that a tilt angle of the above-described liquid crystal compound in the above-described composition layer changes consecutively along the thickness direction.

In addition, in a case where the liquid crystal compound has a polymerizable group, in the step 2Y, it is preferable that a curing treatment is performed on the composition layer as described later.

Hereinafter, the materials used in each step, and the procedure of each step will be described in detail.

<<Step 2Y-1>>

Step 2Y-1 is a step of forming a composition layer satisfying Requirement 1 or Requirement 2 described above on the liquid crystal layer using a liquid crystal composition (hereinafter, also referred to as a "composition Y") including the chiral agent Y and a liquid crystal compound.

In the step 2Y-1, the procedure of all steps is the same as that in the step 2X-1 described above, except that the composition Y is used instead of the composition X, and the description thereof will be omitted.

<<<<Composition Y>>>>

The composition Y includes a liquid crystal compound and a chiral agent Y in which the helical twisting power changes due to change in temperature. Hereinafter, each component will be described.

As described above, from the viewpoint that the composition layer is easily formed at the temperature $T_1$ at which the alignment treatment of the liquid crystal compound is performed in the step 2Y-1 for forming the composition layer satisfying Requirement 1 or Requirement 2 described above, the absolute value of the weighted-average helical twisting power of chiral agents in the composition layer is, for example, 0.0 to 1.9 $\mu m^{-1}$, preferably 0.0 to 1.5 $\mu m^{-1}$, still more preferably 0.0 to 0.5 $\mu m^{-1}$, and particularly preferably 0. Therefore, in a case where the chiral agent Y has a helical twisting power exceeding the above-described predetermined range at the temperature $T_{11}$, it is preferable that the composition Y includes a chiral agent (hereinafter, also referred to as a "chiral agent YA") which induces a helix in the opposite direction to the chiral agent Y at the temperature $T_{11}$, so that the helical twisting power of the chiral agent Y is offset to approximately 0 in the step 2Y-1 (that is, the weighted-average helical twisting power of chiral agents in the composition layer is within the above-described predetermined range). It is preferable that the chiral agent YA does not change the helical twisting power due to change in temperature.

In addition, in a case where the liquid crystal composition includes, as the chiral agent, a plurality of kinds of chiral agents Y, and where the weighted-average helical twisting power of the plurality of kinds of chiral agents Y at the temperature $T_{11}$ has a helical twisting power outside the above-described predetermined range, the "other chiral agents YA which induce a helix in the opposite direction to the chiral agent Y" are intended to be a chiral agent which induces a helix in the opposite direction to the weighted-average helical twisting power of the above-described plurality of kinds of chiral agents Y.

In a case where the chiral agent Y alone does not have the helical twisting power at the temperature $T_{11}$ and has a property of increasing the helical twisting power due to change in temperature, the chiral agent YA may not be used in combination.

Hereinafter, various materials included in the composition Y will be described. Among the materials included in the composition Y, components other than the chiral agent are the same as the materials included in the composition X, and thus the description thereof will be omitted.

Chiral Agent Y in which Helical Twisting Power Changes Due to Cooling or Heating The chiral agent Y is a compound which induces the helix of the liquid crystal compound, and is not particularly limited as long as it is a chiral agent in which the helical twisting power increases due to cooling or heating. The term "cooling or heating" means the cooling treatment or heating treatment performed in the step 2Y-1. In addition, the upper limit of the cooling or heating temperature is usually approximately ±150° C. (in other words, a chiral agent in which the helical twisting power increases by cooling or heating within ±150° C. is preferable). Among these, a chiral agent in which the helical twisting power increases by cooling is preferable.

The chiral agent Y may be liquid crystalline or non-liquid crystalline. The chiral agent can be selected from various known chiral agents (for example, a chiral agent for twisted nematic (TN) and super twisted nematic (STN), described in Liquid Crystal Device Handbook, Chapter 3, Section 4-3, p. 199, Japan Society for the Promotion of Science edited by the 142nd committee, 1989). In general, the chiral agent Y includes an asymmetric carbon atom. However, an axially asymmetric compound or a surface asymmetric compound not having the asymmetric carbon atom can also be used as the chiral agent Y. Examples of the axially asymmetric compound or the surface asymmetric compound include binaphthyl, helicene, paracyclophane, and derivatives thereof. The chiral agent Y may include a polymerizable group.

Among these, from the viewpoint that the difference in helical twisting power after change in temperature is large, as the chiral agent Y, an isosorbide-based optically active compound, an isomannide-based optically active compound, or a binaphthol-based optically active compound is preferable, and a binaphthol-based optically active compound is more preferable.

The total content of chiral agents in the composition Y (total content of all chiral agents in the composition Y) is preferably 2.0 mass % or more and more preferably 3.0 mass % or more with respect to the total mass of the liquid crystal compound. In addition, from the viewpoint of suppressing haze of the inclined cholesteric liquid crystal layer, the upper limit of the total content of chiral agents in the composition Y is preferably 15.0 mass % or less and more preferably 12.0 mass % or less with respect to the total mass of the liquid crystal compound.

As the amount of the chiral agent Y to be used is smaller, the chiral agent Y tends not to affect liquid crystallinity, which is preferable. Therefore, the above-described chiral agent Y is preferably a compound having a strong twisting power, so that a desired twisted alignment of a helical pitch can be achieved even in a small amount.

Chiral Agent YA

The chiral agent YA is a compound which induces the helix of the liquid crystal compound, and is preferably a chiral agent in which the helical twisting power (HTP) does not change due to change in temperature.

In addition, the chiral agent YA may be liquid crystalline or non-liquid crystalline. In general, the chiral agent YA includes an asymmetric carbon atom. However, an axially asymmetric compound or a surface asymmetric compound not having the asymmetric carbon atom can also be used as the chiral agent YA. The chiral agent YA may include a polymerizable group.

As the chiral agent YA, a known chiral agent can be used.

In a case where the liquid crystal composition includes the chiral agent Y alone, and a case where the chiral agent Y has a helical twisting power exceeding a predetermined range (for example, 0.0 to 1.9 $\mu m^{-1}$) at the temperature $T_{11}$, the chiral agent YA is preferably a chiral agent which induces a helix in the opposite orientation to the above-described chiral agent Y. That is, for example, in a case where the helix induced by the chiral agent Y is right-handed, the helix induced by the chiral agent YA is left-handed.

In addition, in a case where the liquid crystal composition includes a plurality of kinds of chiral agents Y as the chiral agent, and a case where the weighted-average helical twisting power thereof at the temperature $T_{11}$ exceeds the above-described predetermined range, the chiral agent YA is preferably a chiral agent which induces a helix in the opposite direction to the weighted-average helical twisting power.

<<Step 2Y-2>>

Step 2Y-2 is a step of forming an inclined cholesteric liquid crystal layer by performing a cooling treatment or a heating treatment to the composition layer obtained in the step 2Y-1 so as to change the helical twisting power of the chiral agent Y and to cholesterically align the liquid crystal compound in the composition layer. Among these, in this step, it is preferable to cool the composition layer.

From the viewpoint that reflection anisotropy of the inclined cholesteric liquid crystal layer is more excellent, in a case of cooling the composition layer, it is preferable to cool the composition layer so that the temperature of the composition layer is lowered by 30° C. or higher. Among these, from the viewpoint that the above-described effect is more excellent, it is preferable to cool the composition layer so that the temperature of the composition layer is lowered by 40° C. or higher, and it is more preferable to cool the composition layer so that the temperature of the composition layer is lowered by 50° C. or higher. The upper limit value of the reduced temperature range of the above-described cooling treatment is not particularly limited, but is usually approximately 150° C.

In other words, the above-described cooling treatment is intended that, in a case where the temperature of the composition layer satisfying Requirement 1 or Requirement 2 described above, which is obtained in the step 1 before cooling, is defined as T° C., the composition layer is cooled to T−30° C. or lower (that is, in a case of the aspect shown in FIG. 21, $T_{12} \leq T_{11}-30°$ C.).

The cooling method is not particularly limited, and examples thereof include a method of allowing the liquid crystal layer on which the composition layer is disposed to stand in an atmosphere of a predetermined temperature.

The cooling rate in the cooling treatment is not limited, but from the viewpoint that reflection anisotropy of the inclined cholesteric liquid crystal layer is more excellent, it is preferable that the cooling rate is set to a certain rate.

Specifically, the maximum value of the cooling rate in the cooling treatment is preferably 1° C. or higher per second, more preferably 2° C. or higher per second, and still more preferably 3° C. or higher per second. The upper limit of the cooling rate is not particularly limited, but is usually 10° C. or lower per second.

Here, in the method for manufacturing the inclined cholesteric liquid crystal layer described above, in a case where the composition layer is exposed to the wind, the surface of the inclined cholesteric liquid crystal layer to be formed may be uneven. In consideration of this point, in all steps of the step 2Y in the method for manufacturing the inclined cholesteric liquid crystal layer described above, it is preferable that the wind speed of the environment to which the composition layer is exposed is low. Specifically, in all steps of the step 2Y in the method for manufacturing the inclined cholesteric liquid crystal layer described above, the wind speed of the environment to which the composition layer is exposed is preferably 1 m/s or less.

In a case of heating the composition layer, the upper limit value of the increased temperature range of the heating treatment is not particularly limited, but is usually approximately 150° C.

<<Curing Treatment>>

In a case where the liquid crystal compound has a polymerizable group, it is preferable that a curing treatment is performed on the composition layer. The procedure for performing the curing treatment on the composition layer is the same as the method described in the manufacturing method 2X, and the suitable aspect is also the same.

<<Other Aspects of Method for Manufacturing Inclined Cholesteric Liquid Crystal Layer>>

Examples of another manufacturing method for manufacturing the inclined cholesteric liquid crystal layer used in the present invention include a method of using an alignment film in which a pattern is formed so as to arrange the liquid crystal compound in the inclined cholesteric liquid crystal layer, as a base layer in a case of forming the inclined cholesteric liquid crystal layer, to the above-described liquid crystal alignment pattern.

By forming the alignment film on the support, applying the composition to the alignment film, and curing the composition, it is possible to obtain an inclined cholesteric liquid crystal layer which is formed of a cured layer of the liquid crystal composition and in which a predetermined liquid crystal alignment pattern is immobilized.

As the support, a transparent support is preferable, and the same transparent substrate as described above can be used.

<Alignment Film>

As the alignment film, a so-called photo-alignment film obtained by irradiating a photo-alignable material with polarized light or non-polarized light can also be used. That is, the photo-alignment film may be produced by applying the photo-alignable material to the support. The irradiation of polarized light can be performed in a direction perpendicular or oblique to the photo-alignment film, and the irradiation of non-polarized light can be performed in a direction oblique to the photo-alignment film. In particular, in a case of irradiation from an oblique direction, a pretilt angle can be imparted to the liquid crystal.

Preferable examples of the photo-alignable material used in the photo-alignment film which can be used in the present invention include azo compounds described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B, aromatic ester compounds described in JP2002-229039A, maleimide- and/or alkenyl-substituted nadiimide compounds having a photo-alignable unit described in JP2002-265541A and JP2002-317013A, photo-crosslinking silane derivatives described in JP4205195B and JP4205198B, photo-crosslinking polyimide, polyamide, or ester described in JP2003-520878A, JP2004-529220A, and JP4162850B, and photo-dimerizable compounds, in particular, cinnamate compounds, chalcone compounds, or coumarin compounds described in JP1997-118717A (JP-H09-118717A), JP1998-506420A (JP-H10-

506420A), JP2003-505561A, WO2010/150748A, JP2013-177561A, and JP2014-012823A. Among these, an azo compound, a photo-crosslinking polyimide, polyamide, or ester, a cinnamate compound, or a chalcone compound is particularly preferable.

Figure 23:
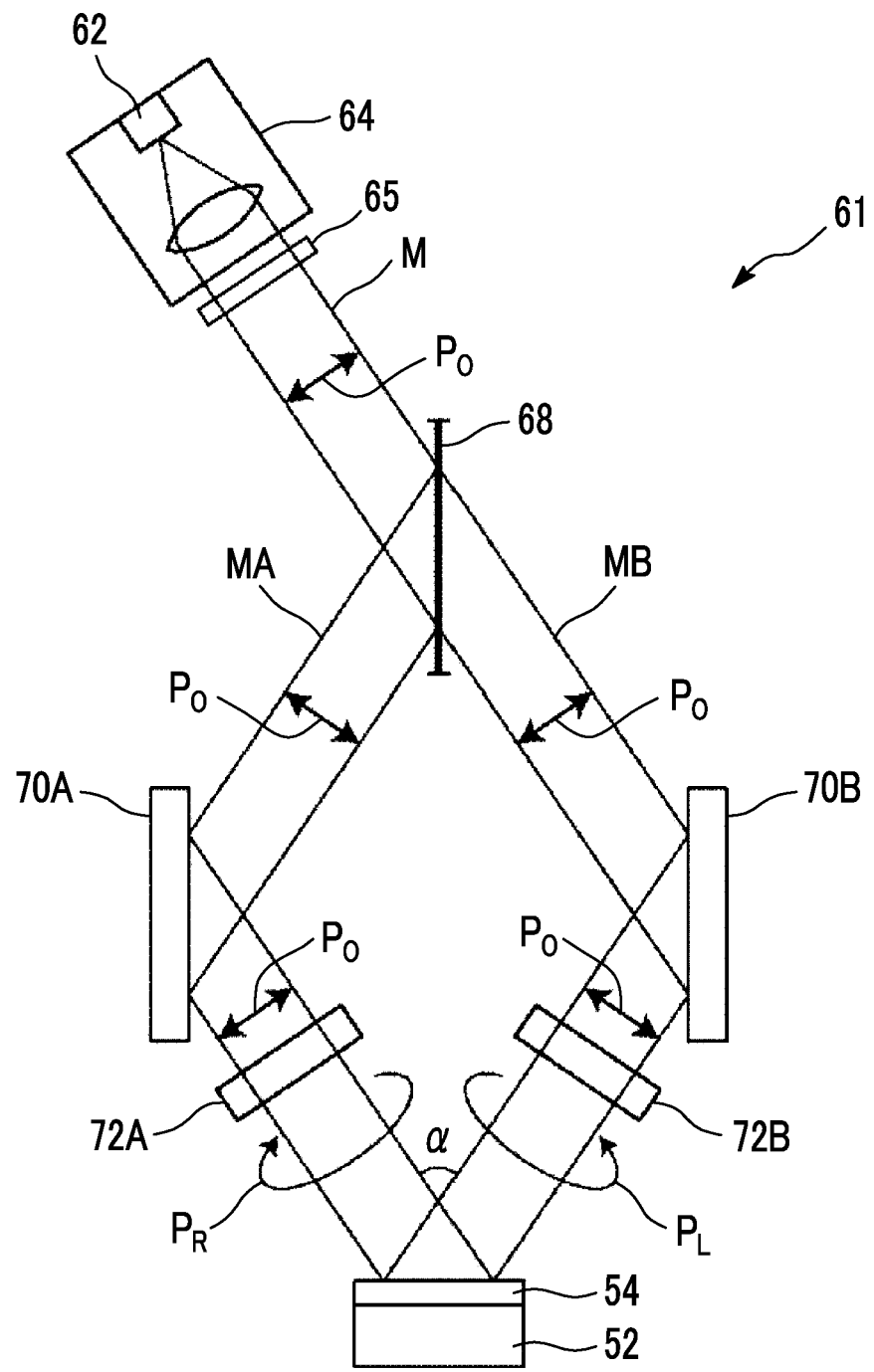
FIG. 23 is a schematic configuration view of an exposure apparatus which irradiates an alignment film with interference light.

After the alignment film is applied to the support and dried, the alignment film is exposed to laser to form the alignment pattern. FIG. 23 is a schematic view illustrating an exposure apparatus for the alignment film. An exposure apparatus 61 includes a light source 64 including a laser 62 and a λ/2 plate 65, a polarization beam splitter 68 splitting laser light M emitted from the laser 62 (light source 64) into two beams, mirrors 70A and 70B respectively disposed on optical paths of split two beams MA and MB, and λ/4 plates 72A and 72B. The λ/4 plates 72A and 72B have optical axes perpendicular to each other, the λ/4 plate 72A converts linearly polarized light $P_0$ into right-handed circular polarization $P_R$, and the λ/4 plate 72B converts the linearly polarized light $P_0$ into left-handed circular polarization $P_L$.

The light source 64 has the λ/2 plate 65, and the linearly polarized light $P_0$ is emitted by changing the polarization direction of the laser light M emitted by the laser 62. The λ/4 plate 72A converts the linearly polarized light $P_0$ (beam MA) into right-handed circular polarization $P_R$, and the λ/4 plate 72B converts the linearly polarized light $P_0$ (beam MB) into left-handed circular polarization $P_L$.

A support 52 including an alignment film 54 before the alignment pattern is formed is disposed on an exposed portion, the two beams MA and MB intersect and interfere with each other on the alignment film 54, and the alignment film 54 is irradiated with the interference light to be exposed. Due to the interference at this time, the polarization state of light with which the alignment film 54 is irradiated periodically changes according to interference fringes. As a result, an alignment film 54 (hereinafter, also referred to as a pattern alignment film) having an alignment pattern in which the alignment state changes periodically is obtained. In the exposure apparatus 61, by changing an intersecting angle α between the two beams MA and MB, the pitch of the alignment pattern can be changed. By forming the optically anisotropic layer described later on the pattern alignment film having an alignment pattern in which the alignment state changes periodically, an inclined cholesteric liquid crystal layer including a liquid crystal alignment pattern corresponding to this period can be formed.

In addition, by rotating the optical axes of the λ/4 plates 72A and 72B by 90° respectively, the direction of rotation of the optical axis of the liquid crystal compound in the liquid crystal alignment pattern can be reversed.

As described above, the pattern alignment film has an alignment pattern which aligns the liquid crystal compound, such that the orientation of the optical axis of the liquid crystal compound in the inclined cholesteric liquid crystal layer formed on the pattern alignment film changes consecutively while rotating over at least one direction in the plane to form a liquid crystal alignment pattern. Assuming that the axis along the orientation in which the liquid crystal compound is aligned is an alignment axis, it can be said that the pattern alignment film has an alignment pattern in which the orientation of the alignment axis changes consecutively while rotating over at least one direction in the plane. The alignment axis of the pattern alignment film can be detected by measuring absorption anisotropy. For example, in a case where the pattern alignment film is irradiated with linearly polarized light while rotating the pattern alignment film and the amount of light transmitted through the pattern alignment film is measured, the orientation in which the amount of light is maximum or minimum is observed by gradually changing over one direction in the plane.

<Formation of Inclined Cholesteric Liquid Crystal Layer>

The inclined cholesteric liquid crystal layer can be formed by applying multiple layers of the liquid crystal composition to the pattern alignment film. The application of the multiple layers refers to repetition of the following processes: producing a first liquid crystal immobilized layer by applying the liquid crystal composition to the alignment film, heating the liquid crystal composition, cooling the liquid crystal composition, and irradiating the liquid crystal composition with ultraviolet rays for curing; and producing a second or subsequent liquid crystal immobilized layer by applying the liquid crystal composition to the liquid crystal immobilized layer, heating the liquid crystal composition, cooling the liquid crystal composition, and irradiating the liquid crystal composition with ultraviolet rays for curing as described above. Even in a case where the inclined cholesteric liquid crystal layer is formed by the application of the multiple layers such that the total thickness of the inclined cholesteric liquid crystal layer is increased, the alignment direction of the alignment film can be reflected from a lower surface of the inclined cholesteric liquid crystal layer to an upper surface thereof.

As the liquid crystal compound included in the liquid crystal composition in the present manufacturing method, the above-described rod-like liquid crystal compound and disk-like liquid crystal compound can be used.

The chiral agent included in the liquid crystal composition in the present manufacturing method is not particularly limited, and depending on the purpose, a known compound (for example, a chiral agent for twisted nematic (TN) and super twisted nematic (STN), described in Liquid Crystal Device Handbook, Chapter 3, Section 4-3, p. 199, Japan Society for the Promotion of Science edited by the 142nd committee, 1989), an isosorbide derivative, an isomannide derivative, and the like can be used.

In addition, the liquid crystal composition in the present manufacturing method may include a polymerization initiator, a crosslinking agent, an alignment control agent, and the like, and as necessary, may further include a polymerization inhibitor, an antioxidant, an ultraviolet absorber, a light stabilizer, a colorant, metal oxide fine particles, and the like can be added thereto within a range which does not deteriorate the optical performance and the like.

[Transparent Screen Having Diffuse Reflectivity]

A transparent screen having diffuse reflectivity reflects images projected obliquely in various directions. As a result, the light of projection image guided in the light guide plate is reflected in the front direction of the light guide plate (display) to display the projection image.

As the transparent screen having diffuse reflectivity, known diffuse and reflective transparent screens such as Kaleido Screen (high brightness front type) manufactured by JXTG Energy Corporation and Saivis manufactured by MITSUBISHI PAPER MILLS LIMITED can be used.

Figure 24:
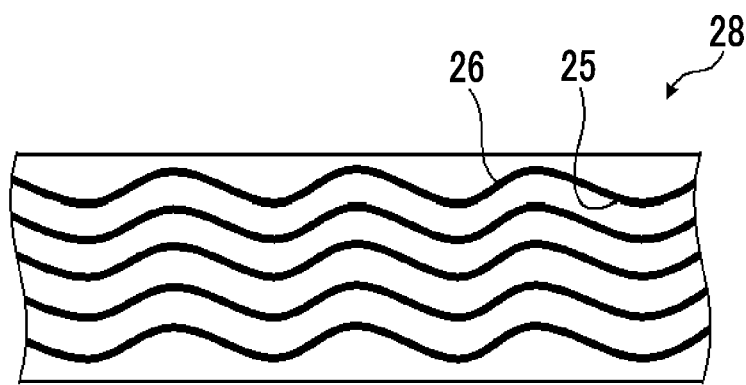
FIG. 24 is a schematic view of an X-Z plane of a cholesteric liquid crystal layer 28 in a case of being observed with SEM.

Alternatively, as the transparent screen having diffuse reflectivity, a cholesteric liquid crystal layer in which, as a cholesteric liquid crystal layer 28 shown in FIG. 24, the shape of the bright-dark line consisting of a bright portion 25 and a dark portion 26 derived from the cholesteric liquid crystalline phase, which is observed in the X-Z plane with SEM, is wavy (flapping structure) can also be used.

The cholesteric liquid crystal layer 28 shown in FIG. 24 has the same configuration as the cholesteric liquid crystal layer 20 shown in FIG. 9, except that the shape of the bright-dark line consisting of the bright portion 25 and the dark portion 26 is wavy.

That is, the cholesteric liquid crystal layer 28 has a cholesteric liquid crystal structure, and is a layer having a structure in which the angle between the helical axis and the surface of the reflective layer changes periodically. In other words, the cholesteric liquid crystal layer has a cholesteric liquid crystal structure which gives a streak pattern of bright portions and dark portions in the cross-sectional view observed by SEM, and is a layer in which the angle between the normal line formed by the dark portion and the surface of the reflective layer changes periodically.

The flapping structure is preferably a structure that, in a continuous line of bright portions or dark portions which forms a streak pattern, at least one area M in which the absolute value of the inclination angle with respect to the plane of the cholesteric liquid crystal layer is 5° or more exists, and a crest or trough having an inclination angle of 0°, which is at the closest position sandwiching the area M in the plane direction, is specified.

The crest or trough having an inclination angle of 0° includes a convex shape and a concave shape, but also includes points having a stair shape or a shelf shape in a case where the inclination angle thereof is 0°. In the flapping structure, it is preferable that, in the continuous line of bright portions or dark portions which forms a streak pattern, the area M in which the absolute value of the inclination angle is 5° or more and the crest or trough sandwiching the area M are repeated multiply.

The cholesteric liquid crystal layer having a flapping structure can be formed by forming a cholesteric liquid crystal layer on a forming surface which is not subjected to an alignment treatment such as rubbing.

<Arrangement and Preferred Aspect of Display>

The arrangement of the display according to the embodiment of the present invention is not particularly limited, but since the visibility of the displayed projection image is improved, it is preferable to arrange the display so that the amount of external light or illumination light reflected by the above-described transparent screen is minimized. Specifically, a case, where the surface of the transparent screen on which the incoming ray of the projection image is specularly reflected is arranged so as to be substantially parallel to a straight line from the external light or the light source of the illumination to the above-described transparent screen, is preferable because the beam from the light source is less likely to be reflected.

Furthermore, it is sufficient that the light of the projection image from the projection device is incident at an angle suitable for reflection characteristics in a case where the transparent screen has reflection anisotropy or no reflection anisotropy, and based on a standing state of the display according to the embodiment of the present invention, for example, image projection from a ceiling side or overhead side, image projection from a wall surface (side surface), and image projection from a floor surface side are all possible.

In a case where the transparent screen has the reflection anisotropy, in a case where an image is projected from the floor surface side, the surface on which the incoming ray from the projection device is specularly reflected is easily substantially parallel to the straight line from the external light or the light source of the illumination on the ceiling side or overhead side to the above-described transparent screen, so that the light reflected from the light source is to be smaller and does not easily affect the visibility of the displayed projection image, which is most preferable.

By arranging the display and the projection device as described above, especially in a bright environment, the image can be clearly seen in a case where the display is lit, and the background visibility can be ensured in a case where the display is not lit.

EXAMPLES

Example 1

<Inclined Liquid Crystal Layer>

(Chiral Agent Compound CD-1)

A compound CD-1 was synthesized by a general method according to the following synthesis procedure.

The compound CD-1 is a chiral agent in which the helical direction is left and the helical twisting power does not change due to change in temperature or irradiation with light.

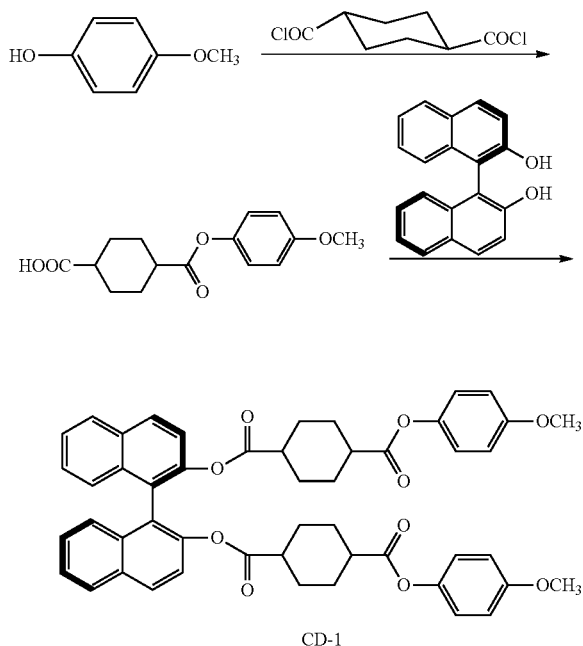

CD-1

(Synthesis of Chiral Agent Compound CD-2)

The following compound CD-2 was synthesized according to JP2002-338575A and used.

The compound CD-2 is a chiral agent in which the helical direction is right and the helical twisting power changes due to irradiation with light (corresponding to the chiral agent X).

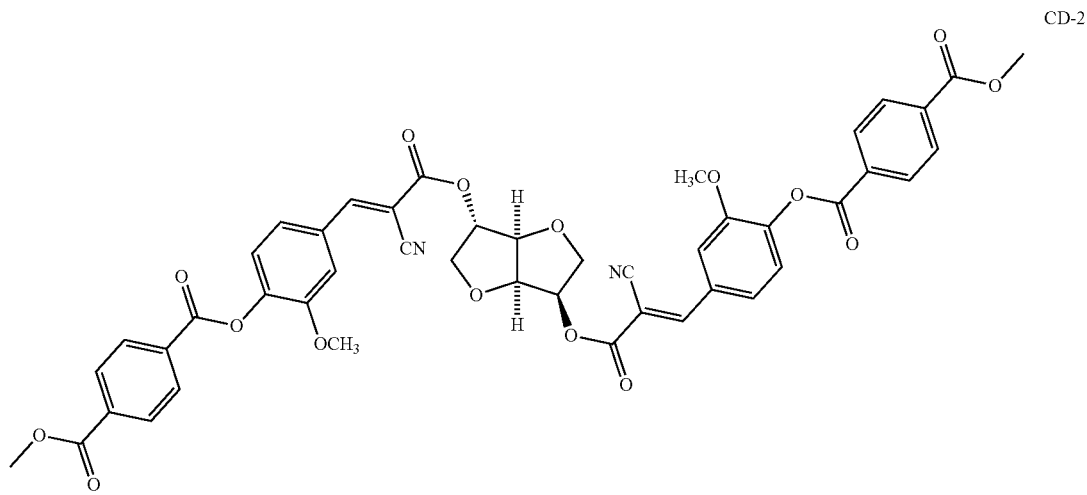

CD-2

(Disk-Like Liquid Crystal Compound D-1)

As a disk-like liquid crystal compound, the following disk-like liquid crystal compound D-1 described in JP2007-131765A was used.

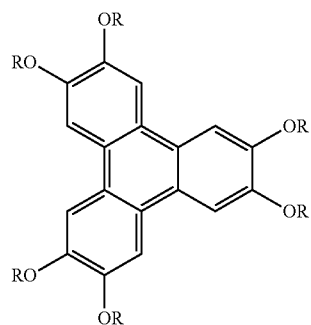

D-1

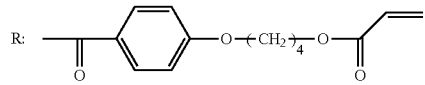

(Surfactant S-1)

A surfactant S-1 is a compound described in JP5774518B, and has the following structure.

Surfactant S-1

<Step 1: Production of Inclined Liquid Crystal Layer 1>

(Composition for Inclined Liquid Crystal Layer)

A sample solution having the following composition was prepared.

| | |
|---|---|
| Compound D-1 | 100 parts by mass |
| Compound S-1 | 0.1 parts by mass |
| Initiator Irg-907 (manufactured by BASF) | 3.0 parts by mass |
| Solvent (methyl ethyl ketone (MEK)/ cyclohexanone = 90/10 (mass ratio)) amount at which the concentration of solute is 30 mass % | |

(Method for Producing Inclined Liquid Crystal Layer 1)

Next, a rectangular glass substrate (12×15 cm) coated with polyimide SE-130 (manufactured by Nissan Chemical Corporation) was subjected to a rubbing treatment in the longitudinal direction to produce a substrate with an alignment film. The rubbing-treated surface of the alignment film was spin-coated with 3 mL of the above-described sample solution under the conditions of a rotation speed of 1000 rpm and 10 seconds, and aged at 120° C. for 1 minute. Subsequently, the above-described coating film was cured by being irradiated with ultraviolet rays (UV) of an irradiation amount of 500 mJ/cm² at 30° C. under a nitrogen atmosphere, thereby obtaining an inclined liquid crystal layer 1.

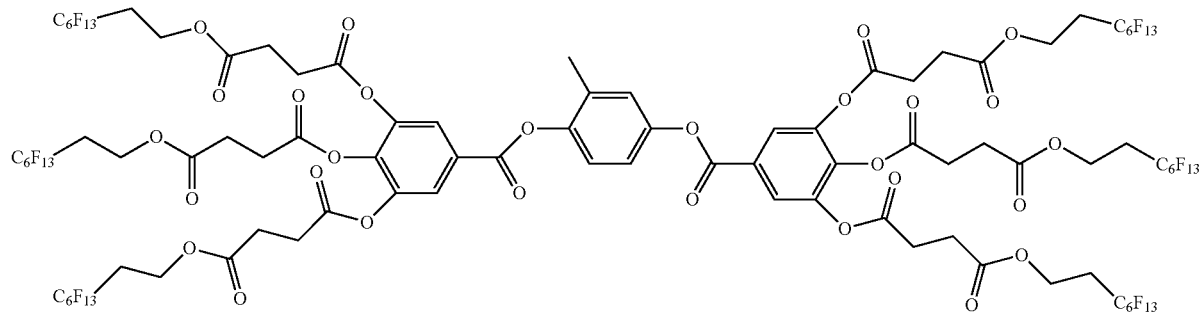

It was confirmed that the alignment of liquid crystal in the inclined liquid crystal layer 1 was inclined by an average of 16° with respect to the longitudinal direction of the substrate.

<Step 2: Production of Cholesteric Liquid Crystal Layer>
(Composition of Cholesteric Liquid Crystal Layer G1)
A sample solution having the following composition was prepared.

| | |
|---|---|
| Liquid crystalline compound LC-1 represented by following structure | 100 parts by mass |
| Compound S-1 | 0.1 parts by mass |
| Compound CD-1 | 5.5 parts by mass |
| Compound CD-2 | 5.5 parts by mass |
| Compound B | 0.03 parts by mass |
| Initiator Irg-907 (manufactured by BASF) | 2.0 parts by mass |
| Solvent (methyl ethyl ketone (MEK)/ cyclohexanone = 90/10 (mass ratio)) amount at which the concentration of solute is 30 mass % | |

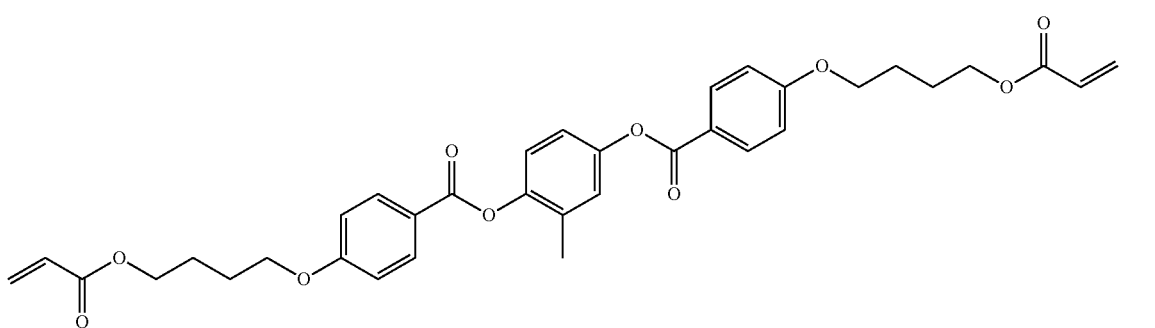

LC-1

(Production of Cholesteric Liquid Crystal Layer G1)
Next, the inclined liquid crystal layer 1 was spin-coated with 4 mL of the above-described sample solution under the conditions of a rotation speed of 1500 rpm and 10 seconds to form a composition layer, and aged at 90° C. for 1 minute. Subsequently, the composition layer after aging was ultraviolet-irradiated at 30° C. with 365 nm light from a light source (manufactured by UVP, LLC, 2UV TRANSILLUMINATOR) at an irradiation intensity of 2 mW/cm$^2$ for 60 seconds. Subsequently, the above-described composition layer was irradiated with ultraviolet rays (UV) of an irradiation amount of 500 mJ/cm$^2$ at 30° C. under a nitrogen atmosphere to perform a polymerization reaction of the liquid crystal compound, thereby obtaining a cholesteric liquid crystal layer G1 in which the cholesteric alignment state is immobilized. The reflection center wavelength was 550 nm.

By the above-described steps, an optical laminate 1 having the inclined liquid crystal layer 1 and the cholesteric liquid crystal layer G1 disposed on the inclined liquid crystal layer 1 was produced.

The cholesteric liquid crystal layer G1 of the obtained optical laminate 1 was evaluated as follows.

<Confirmation of Reflection Anisotropy and Diffuse Reflectivity>

Using a gonio-spectrophotometric color measurement system (manufactured by MURAKAMI COLOR RESEARCH LABORATORY CO., LTD., GCMS-3B), with a cholesteric liquid crystal layer G1 side of the optical laminate 1 as a reflecting plane, polar angle dependence of the measured light incidence angle was measured while the light receiving angle was fixed in the normal direction to the film. The wavelength of the incidence light was 550 nm. Intensity of reflected light on the light receiving side was measured by changing the polar angle in a plane including the direction in which the substrate with the alignment film was rubbed (longitudinal direction of the substrate). As a result, since the intensity of reflected light of the light receiving angle in the normal direction to the optical laminate 1 is the strongest in a case where the measured light incidence angle was approximately 45 to 50 degrees, it was confirmed that, in a case where the normal direction to the optical laminate 1 regarded the light receiving direction as the direction of the specularly reflected ray, the bisector of the angle between the incoming ray from at least one direction onto the optical laminate 1 and a specularly reflected ray thereof was inclined by 5° or more with respect to the normal direction to the plane in the above-described optical laminate 1, where the incoming ray is specularly reflected, and the optical laminate 1 exhibited reflection anisotropy.

Subsequently, with regard to the cholesteric liquid crystal layer G1 of the optical laminate 1, the measured light incidence angle was fixed while keeping the incidence angle at which the intensity of the specularly reflected light in the normal direction was the maximum value, and polar angle dependence of the light receiving angle on the light receiving side was measured.

A light receiving angle at which the intensity of the specularly reflected light was halved from the maximum value was determined, and in a case where it is assumed that there is diffuse reflectivity in a case where the absolute value of the angle difference with respect to the normal direction is 2 degrees or more, it was confirmed that, in the optical laminate 1, the absolute value of the difference in the light receiving angle at which the intensity of the specularly reflected light was halved from the maximum value was 2 degrees or more, and the optical laminate 1 exhibited diffuse reflectivity.

(SEM Observation of Cross Section)

By SEM observation of the cross section (SEM image of the cross section) of the cholesteric liquid crystal layer G1 in the optical laminate 1, it was confirmed that the array direction of the bright portion and dark portion derived from the cholesteric liquid crystalline phase were inclined in one direction with respect to both main planes (surface on the interface side with the inclined liquid crystal layer 1 and surface on the air interface side) of the cholesteric liquid crystal layer G1, and the angle thereof was approximately 15 degrees.

In addition, since the bright portion and dark portion described above were not linear but gently flapping, a cholesteric liquid crystal layer having a non-uniform helical axis was formed in the main plane, which was presumed to be the main cause of the diffuse reflectivity. In addition, the pitch of the bright portion and the dark portion was 365 nm.

<Production of Display Member 01 in which Transparent Screen and Light Guide Plate are Laminated>

Next, cholesteric liquid crystal layers B1 or R1 were produced on the inclined liquid crystal layer 1 in the same manner as the above-described production of the cholesteric liquid crystal layer G1, except that the amounts of compound CD-1 and compound CD-2 added were adjusted such that the reflection center wavelength was 435 nm or 650 nm. These laminates were adhered to each other using a pressure sensitive adhesive (SK pressure sensitive adhesive, manufactured by Soken Chemical & Engineering Co., Ltd.) in the order in which the cholesteric liquid crystal layers B1, G1, and R1 were laminated, thereby producing a transparent screen 01.

From the analysis of cross-sectional SEM image as described above, it was confirmed that the bright portion and dark portion of the cholesteric liquid crystal layer B1 had an inclination angle of 15 degrees and a pitch of 290 nm, and the bright portion and dark portion of the cholesteric liquid crystal layer R1 had an inclination angle of 15 degrees and a pitch of 430 nm.

Furthermore, a transparent and flat acrylic plate having a thickness of 30 mm was adhered, as a sheet-shaped light guide plate, to the produced transparent screen 01 on the surface side of the cholesteric liquid crystal layer using a pressure sensitive adhesive, thereby producing a display member 01. The display member 01 is a member in which the layers are adhered to each other using a pressure sensitive adhesive in the order in which, from the viewing side, the light guide plate, the cholesteric liquid crystal layers B1, G1, and R1 are laminated. In addition, the glass substrate was in a peeled state.

Next, the display member 01 was installed such that the display surface thereof was perpendicular to the floor surface, and using a projector (AXJ 800, manufactured by AIRXEL) as a projection device, the display member 01 was disposed so that the light of the projection image was incident from the end face of the acrylic plate which was the light guide plate of the display member 01, thereby obtaining a display 01 according to the embodiment of the present invention. In a case where an image was projected so as to guide the inside of the acrylic plate, it was confirmed that the projection image was seen brightest from the normal direction of the display member 01. In addition, the hotspot was emitted from an end portion of the acrylic plate opposite to the projected side, and it was confirmed that an AR display without hotspot could be projected by providing an absorbing layer (black paper) at that end portion.

Example 2

<Production of Display Member 02 in which Transparent Screen and Light Guide Plate are Laminated>

With reference to JP2017-083587A, a reflector was provided on the inclined surface of the linear Fresnel-shaped transparent base material schematically shown in FIG. 7, and the uneven surface was covered with a transparent resin layer from above the reflector to produce a transparent screen 02 having a flat surface.

Here, in the cross section of the linear Fresnel shape described above, the angle of the inclined surface having the reflector was 30 degrees (the surface was 0 degrees), and the unit length (1 pitch) of the repeating shape of linear Fresnel shape was 100 µm.

A transparent acrylic plate, which was used in Example 1 as the light guide plate, was adhered to the transparent screen 02 on the surface having the linear Fresnel-shaped transparent base material to produce a display member 02.

Same as Example 1, the projector was disposed so that an image was projected from the end face of the transparent acrylic plate which was the light guide plate, and furthermore, an absorbing layer was provided at the end portion opposite to the acrylic plate, thereby obtaining a display 02 of the present invention.

In a case where, as for the reflection anisotropy of the transparent screen 02 included in the display 02, the polar angle dependence of the measured light incidence angle was measured by the gonio-spectrophotometric color measurement system as in Example 1, it was confirmed that the bisector of the angle between the incoming ray and a specularly reflected ray of the incoming ray was inclined by 5° or more with respect to the normal direction to the plane where the incoming ray is specularly reflected, and the transparent screen 02 had reflection anisotropy.

In addition, in the display 02, in a case where an image was projected so as to guide the inside of the acrylic plate, it was confirmed that a bright reflected image could be viewed from the normal direction of the display member 02.

In addition, the hotspot was not visible.

Example 3

<Support with Alignment Layer>

An alignment layer coating solution Y1 having the following composition was applied to a triacetyl cellulose support (manufactured by FUJIFILM Corporation, TG40) using a #3.6 wire bar coater. Thereafter, the alignment layer coating solution Y1 was dried at 45° C. for 60 seconds, and irradiated with ultraviolet rays of an irradiation amount of 500 mJ/cm$^2$ using an ultraviolet irradiation device at 25° C. to produce a support with an alignment layer Y1.

(Composition of Alignment Layer Coating Solution Y1)

| | |
|---|---|
| KAYARAD PET30 (manufactured by Nippon Kayaku Co., Ltd.) | 100 parts by mass |
| IRGACURE 907 (manufactured by BASF) | 3.0 parts by mass |
| KAYACURE DETX (manufactured by Nippon Kayaku Co., Ltd.) | 1.0 part by mass |
| Fluorine-based horizontal alignment agent F1 | 0.01 parts by mass |
| Methyl isobutyl ketone | 243 parts by mass |

Fluorine-Based Horizontal Alignment Agent F1

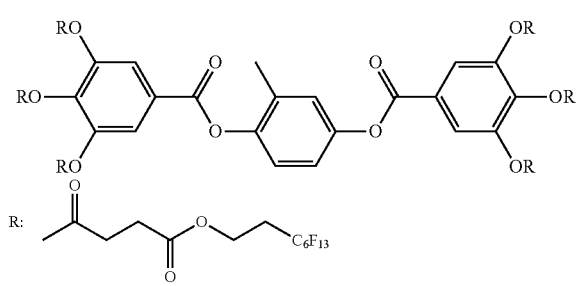

<Production of Cholesteric Liquid Crystal Layer Laminate 02>

(Coating Solutions B2, G2, and R2 for Cholesteric Liquid Crystal Layer)

A coating solution for forming a cholesteric liquid crystal layer, which has the following composition, was prepared by mixing the following components.

| | |
|---|---|
| Mixture 1 of liquid crystal compounds | 100 parts by mass |
| Fluorine-based horizontal alignment agent F1 | 0.08 parts by mass |
| Fluorine-based horizontal alignment agent F2 | 0.20 parts by mass |
| Clockwise chiral agent LC-756 (manufactured by BASF) | amount shown in Table 1 |
| Fluorine-based surfactant B1 | 0.08 parts by mass |
| IRGACURE OXE01 (manufactured by BASF) | 1.5 parts by mass |
| Methyl ethyl ketone | amount shown in Table 1 |

TABLE 1

| Coating solution | LC-756 | Methyl ethyl ketone |
|---|---|---|
| Coating solution B2 | 6.95 parts by mass | 888.8 parts by mass |
| Coating solution G2 | 5.53 parts by mass | 440.2 parts by mass |
| Coating solution R2 | 4.63 parts by mass | 381.7 parts by mass |

Mixture 1 of Liquid Crystal Compounds
A numerical value is mass %.

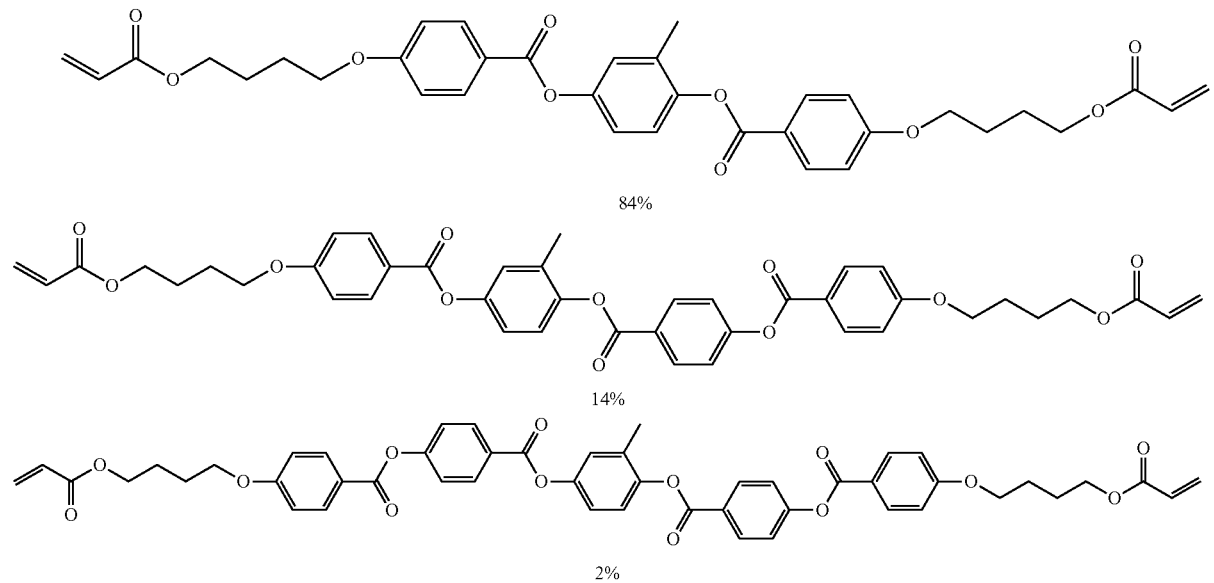

84%

14%

2%

Fluorine-Based Horizontal Alignment Agent F2

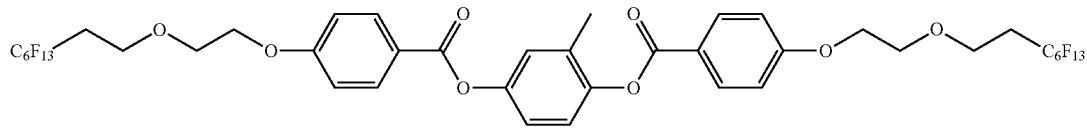

Fluorine-Based Surfactant B1
A numerical value is mass %.

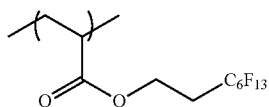

37

-continued

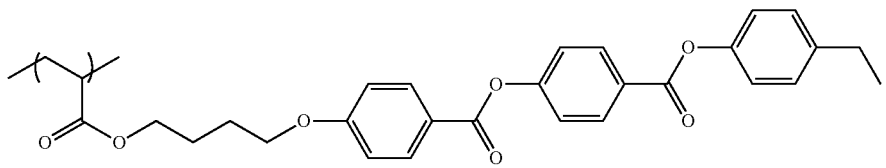

63

Cholesteric liquid crystal coating solutions B2, G2, and R2 each were prepared by adjusting the prescribed amount of the chiral agent LC-756 and amount of methyl ethyl ketone in the coating solution having the above composition.

<Production of Display Member 03 in which Transparent Screen and Light Guide Plate are Laminated>

The coating solution B2 prepared above was applied to a surface of the alignment layer Y1 in the support with an alignment layer Y1 using a #2.6 wire bar coater, dried at 95° C. for 60 seconds, and irradiated with ultraviolet rays of an irradiation amount of 500 mJ/cm$^2$ at 25° C. to produce a cholesteric liquid crystal layer B2. Next, the coating solution G2 was applied to a surface of the cholesteric liquid crystal layer B2 using a #2.0 wire bar coater, dried at 95° C. for 60 seconds, and irradiated with ultraviolet rays of an irradiation amount of 500 mJ/cm$^2$ at 25° C. to laminate a cholesteric liquid crystal layer G2 thereon. Next, the coating solution R2 was applied to a surface of the cholesteric liquid crystal layer G2 using a #2.0 wire bar coater, dried at 95° C. for 60 seconds, and irradiated with ultraviolet rays of an irradiation amount of 500 mJ/cm$^2$ at 25° C. to produce a transparent screen 03 in which a cholesteric liquid crystal layer R2 was laminated on the cholesteric liquid crystal layer G2 so as to be laminated three cholesteric liquid crystal layers.

In addition, using each coating solution, each single-layer cholesteric liquid crystal layer was produced on the support with an alignment layer Y1 by the same method as described above. In a case where the reflection characteristics of each of the produced cholesteric liquid crystal layers B2, G2, and R2 were confirmed, all of the produced cholesteric liquid crystal layers were right-handed circular polarization reflecting layer, and center reflection wavelengths of selective reflection were 435 nm, 545 nm, and 650 nm, respectively in the order of cholesteric liquid crystal layers B2, G2, and R2.

In addition, from the analysis of cross-sectional SEM image, it was confirmed that the bright portion and dark portion of the cholesteric liquid crystal layer B1 had an inclination angle of 0 degrees and a pitch of 283 nm, the bright portion and dark portion of the cholesteric liquid crystal layer G1 had an inclination angle of 0 degrees and a pitch of 355 nm, and the bright portion and dark portion of the cholesteric liquid crystal layer R1 had an inclination angle of 0 degrees and a pitch of 420 nm. In addition, from the analysis of cross-sectional SEM image, it was confirmed that the bright portion and dark portion of each cholesteric liquid crystal layer were wavy (flapping structure).

Here, the center reflection wavelength is a value calculated, using a spectrophotometer (manufactured by JASCO Corporation, V-550) equipped with a large integrating sphere device (manufactured by JASCO Corporation, ILV-471), based on the integrated reflectivity measured without using an optical trap so that light is incident from the cholesteric liquid crystal layer side. Specifically, the center reflection wavelength is a value obtained by obtaining the average reflectivity (arithmetic mean) of the maximum and minimum integrated reflectivity in the integral reflection spectrum which is mountain-shaped (convex upward) wavelength as the horizontal axis, defining, of two wavelengths at two intersections of the waveform and the average reflectivity, wavelength value on the short wave side as λA (nm) and wavelength value on the long wave side as λB (nm), and calculating the center reflection wavelength by the following expression.

Center reflection wavelength=$(\lambda A+\lambda B)/2$

A transparent acrylic plate, which was used in Example 1 as the light guide plate, was adhered to the transparent screen 03 on the cholesteric liquid crystal layer surface using a pressure sensitive adhesive to produce a display member 03.

Same as Example 1, the projector was disposed so that an image was projected from the end face of the transparent acrylic plate which was the light guide plate, and furthermore, an absorbing layer was provided at the end portion opposite to the acrylic plate, thereby obtaining a display 03 according to the embodiment of the present invention.

In the display 03, in a case where an image was projected from the projector, a bright projection image could be viewed from a direction of approximately 50 degrees regardless of the azimuthal angle with reference to the normal direction of the main surface of the display member 03.

In addition, the hotspot was not visible.

In a case where, as for the reflection anisotropy of the display member 03, the polar angle dependence of the measured light incidence angle was measured by the goniospectrophotometric color measurement system as in Example 1, it was confirmed that it was inclined by 5° or less with respect to the normal direction to the plane where the incoming ray is specularly reflected, and the display member 03 did not have reflection anisotropy.

On the other hand, it was confirmed that the display member 03 had diffuse reflectivity.

Example 4

Using a commercially available transparent screen (Kaleido Screen, high brightness front type, manufactured by JXTG Energy Corporation), same as Example 1, a transparent acrylic plate, which was the light guide plate, was adhered to the transparent screen on a reflecting plane side to produce a display member 04.

Furthermore, same as Example 1, the projector was disposed so that an image was projected from the end face of the transparent acrylic plate which was the light guide plate, and furthermore, an absorbing layer was provided at the end portion opposite to the acrylic plate, thereby obtaining a display 04 according to the embodiment of the present invention.

In the display 04, in a case where an image was projected from the projector, a projection image could be viewed from a direction of approximately 50 degrees, which was a direction opposite to the direction of the end face on which the projector is disposed with respect to the normal direction to the main plane of the display member 04, but the projection image was darker than in the display 03.

In addition, the hotspot was not visible.

In a case where, as for the reflection anisotropy of the display member 04, the polar angle dependence of the measured light incidence angle was measured by the gonio-spectrophotometric color measurement system as in Example 1, it was confirmed that it was inclined by 5° or less with respect to the normal direction to the plane where the incoming ray is specularly reflected, and the display member 04 did not have reflection anisotropy.

On the other hand, it was confirmed that the display member 04 had diffuse reflectivity.

Example 5

In a case where the image was displayed in the same manner as in Example 1, except that the light absorbing layer in Example 1 was not disposed at the end portion of the transparent acrylic plate, which was the light guide plate, opposite to the projection device, it was confirmed that light leaked from the end portion opposite to the projection side. Only in a case of observing from almost directly above the end portion, it was confirmed that, although the display had the same glare as the hotspot in the related art, this hotspot was not observed from a position where the image displayed on the display was visible, which is not a problem in practical use.

Comparative Example 1

With regard to Example 1, the display member 01 was installed such that the display surface thereof was perpendicular to the floor surface, and an image was projected by the projector from an elevation angle of 45 degrees with respect to the floor surface, not from the end portion of the transparent acrylic plate. The image looked brightest in the normal direction of the acrylic plate, but in a case of observing from the upper 45-degree direction on the back side of the acrylic plate, which was an extension of the projection direction, the image was dazzling because the hotspot was visible, which is a problem in practical use.

From these, the effect of reducing the hotspot in the display according to the embodiment of the present invention was confirmed.

EXPLANATION OF REFERENCES

10, 30, 40: inclined cholesteric liquid crystal layer
11, 12, 13, 31, 32, 41, 42, 43: main plane
14, 24, 34, 44: liquid crystal compound
$L_1$, $L_3$, $L_4$, $L_5$: molecular axis
$D_1$, $D_2$: array axis
$\theta_2$, $\theta_5$, $\theta_{10}$, $\theta_{20}$, $\theta_{a1}$, $\theta_{a2}$, $\theta_{a3}$, $\theta_{b1}$, $\theta_{b2}$, $\theta_{b3}$: angle
$C_1$, $C_2$, $C_3$: helical axis derived from cholesteric liquid crystalline phase
$T_1$, $T_2$, $T_3$: reflecting plane
15, 25, 35: bright portion
16, 26, 36: dark portion
18: disk-like liquid crystal compound
20, 28: cholesteric liquid crystal layer
$P_1$, $P_2$: array direction in which bright portion and dark portion are arrayed alternately
50: laminate
52: support
54: alignment film
61: exposure apparatus
62: laser
64: light source
65: $\lambda/2$ plate
68: polarization beam splitter
70A, 70B: mirror
72A, 72B: $\lambda/4$ plate
80: display
82: light guide plate
84: transparent screen
86: projection device
88: light absorbing layer
90: transmission diffraction element
92: reflective diffraction element
100: composition layer
102: liquid crystal layer
102a: inclined alignment surface
200: transparent screen
202: transparent base material
204: reflector
206: resin layer
A, B: area
$T_{11}$: temperature at which alignment treatment of liquid crystal compound is performed in step 2-1 (step 2Y-1)
$T_{12}$: temperature at which cooling treatment of step 2-2 (step 2Y-2) is performed
$R_1$: thickness direction
M: laser light
MA: beam
MB: beam
$P_o$: linearly polarized light
$P_R$: right-handed circular polarization
$P_L$: left-handed circular polarization
α: intersecting angle

What is claimed is:

1. A display comprising, at least:
a transparent screen;
a projection device for projecting a projection image on the transparent screen; and
a sheet-shaped light guide plate for guiding the projection image,
wherein the projection device is disposed so that light of the projection image is incident from an end portion of the light guide plate,
the transparent screen is attached to at least one of main surfaces of the light guide plate,
the transparent screen has a cholesteric liquid crystal layer exhibiting selective reflectivity,
the cholesteric liquid crystal layer is a layer formed of a liquid crystal compound,
at least one main plane of a pair of main planes of the cholesteric liquid crystal layer has a liquid crystal alignment pattern in which an orientation of a molecular axis of the liquid crystal compound changes consecutively while rotating over at least one direction in the plane, and
an array direction of a bright portion and a dark portion, which is derived from a cholesteric liquid crystalline phase observed by a scanning electron microscope in a cross section perpendicular to the main plane of the cholesteric liquid crystal layer, is inclined with respect to the main plane of the cholesteric liquid crystal layer.

2. The display according to claim 1, further comprising:
a light absorbing layer disposed at an end portion of the light guide plate, which is opposite to the end portion where the light of the projection image is incident.

3. The display according to claim 1,
wherein a bisector of an angle between an incoming ray from at least one direction onto the transparent screen and a specularly reflected ray of the incoming ray is inclined by 5° or more with respect to a normal direction to a plane in the transparent screen, where the incoming ray is specularly reflected.

4. The display according to claim 1,
wherein the transparent screen has light diffusivity.

5. The display according to claim 1,
wherein, in the cholesteric liquid crystal layer, the molecular axis of the liquid crystal compound is inclined with respect to the main plane of the cholesteric liquid crystal layer.

6. The display according to claim 1,
wherein, in the cholesteric liquid crystal layer, shapes of the bright portion and the dark portion derived from the cholesteric liquid crystalline phase are wavy, and
the cholesteric liquid crystal layer exhibits light diffusivity.

7. A display comprising, at least:
a transparent screen;
a projection device for projecting a projection image on the transparent screen; and
a sheet-shaped light guide plate for guiding the projection image,
wherein the projection device is disposed so that light of the projection image is incident from an end portion of the light guide plate,
the transparent screen is attached to at least one of main surfaces of the light guide plate,
the transparent screen includes
a transparent base material having a linear Fresnel lens-shaped uneven surface,
a reflector disposed on an inclined surface of the linear Fresnel lens-shaped uneven surface of the transparent base material, and
a resin layer covering a surface of the reflector opposite to the inclined surface, and
a surface of the transparent screen is flat.

8. The display according to claim 2,
wherein a bisector of an angle between an incoming ray from at least one direction onto the transparent screen and a specularly reflected ray of the incoming ray is inclined by 5° or more with respect to a normal direction to a plane in the transparent screen, where the incoming ray is specularly reflected.

9. The display according to claim 2,
wherein the transparent screen has light diffusivity.

10. The display according to claim 5,
wherein, in the cholesteric liquid crystal layer, shapes of the bright portion and the dark portion derived from the cholesteric liquid crystalline phase are wavy, and
the cholesteric liquid crystal layer exhibits light diffusivity.

11. The display according to claim 3,
wherein the transparent screen has light diffusivity.

12. The display according to claim 7, further comprising:
a light absorbing layer disposed at an end portion of the light guide plate; which is opposite to the end portion where the light of the projection image is incident.

13. The display according to claim 7,
wherein a bisector of an angle between an incoming ray from at least one direction onto the transparent screen and a specularly reflected ray of the incoming ray is inclined by 5° or more with respect to a normal direction to a plane in the transparent screen, where the incoming ray is specularly reflected.

14. The display according to claim 7,
wherein the transparent screen has light diffusivity.

* * * * *